United States Patent
Liao et al.

(10) Patent No.: US 12,320,682 B2
(45) Date of Patent: Jun. 3, 2025

(54) HIGH-Q WHISPERING GALLERY MODE (WGM) RESONATORS ENCAPSULATED IN POLYDIMETHYLSILOZANE (PDMS) FOR HIGHLY SENSITIVE DISPLACEMENT DETECTION

(71) Applicant: Washington University, St. Louis, MO (US)

(72) Inventors: Jie Liao, St. Louis, MO (US); Lan Yang, St. Louis, MO (US); Abraham Qavi, St. Louis, MO (US); Maxwell Adolphson, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 18/752,301

(22) Filed: Jun. 24, 2024

(65) Prior Publication Data

US 2024/0426641 A1   Dec. 26, 2024

Related U.S. Application Data

(60) Provisional application No. 63/509,855, filed on Jun. 23, 2023.

(51) Int. Cl.
*G01D 5/353* (2006.01)
(52) U.S. Cl.
CPC ................... *G01D 5/3537* (2013.01)
(58) Field of Classification Search
CPC ............. G01D 5/3537; B01L 3/502753
See application file for complete search history.

(56) References Cited

U.S. PATENT DOCUMENTS

| | | | |
|---|---|---|---|
| 4,827,143 A | 5/1989 | Munakata et al. |
| 4,852,117 A | 7/1989 | Po |
| 4,927,232 A | 5/1990 | Griffiths |
| 5,026,141 A | 6/1991 | Griffiths |
| 5,084,614 A | 1/1992 | Berkner |

(Continued)

FOREIGN PATENT DOCUMENTS

| | | |
|---|---|---|
| WO | 2004062053 A2 | 7/2004 |
| WO | 2004070432 A2 | 8/2004 |

(Continued)

OTHER PUBLICATIONS

Colvin, Vicki L., "The potential environmental impact of engineered nanomaterials", Nature Biotechnology, Oct. 2003, pp. 1166-1170, vol. 21, No. 10, Nature Publishing Group.

(Continued)

*Primary Examiner* — Georgia Y Epps
*Assistant Examiner* — Don J Williams
(74) *Attorney, Agent, or Firm* — Armstrong Teasdale LLP

(57) ABSTRACT

A displacement sensor including an optical whispering gallery mode (WGM) microresonator and a package encasing at least a portion of the WGM microresonator, the package comprising polydimethylsiloxane (PDMS). The WGM microresonator can be configured as a sensor and used in a displacement detection system that can detect displacement with high quality. Artificial intelligence can be implemented in the displacement detection system for improved sensing of different variables and/or pinpointing the location of perturbations.

20 Claims, 52 Drawing Sheets
(47 of 52 Drawing Sheet(s) Filed in Color)

(56) References Cited

U.S. PATENT DOCUMENTS

| | | |
|---|---|---|
| 5,742,633 A | 4/1998 | Stone et al. |
| 6,009,115 A | 12/1999 | Ho |
| 6,018,386 A | 1/2000 | Radun |
| 6,052,495 A | 4/2000 | Little et al. |
| 6,490,039 B2 | 12/2002 | Maleki et al. |
| 6,580,532 B1 | 6/2003 | Yao et al. |
| 6,580,851 B1 | 6/2003 | Vahala et al. |
| 6,603,560 B1 | 8/2003 | Islam |
| 6,668,006 B1 | 12/2003 | Margalit et al. |
| 6,741,628 B2 | 5/2004 | Painter et al. |
| 6,751,377 B2 | 6/2004 | Baumann et al. |
| 6,781,690 B2 | 8/2004 | Armstrong et al. |
| 6,831,938 B1 | 12/2004 | Gunn, III |
| 6,865,317 B2 | 3/2005 | Vahala et al. |
| 6,871,025 B2 | 3/2005 | Maleki et al. |
| 6,891,864 B2 | 5/2005 | Vahala et al. |
| 6,891,997 B2 | 5/2005 | Sercel et al. |
| 6,970,619 B2 | 11/2005 | Baumann et al. |
| 6,987,914 B2 | 1/2006 | Savchenkov et al. |
| 7,003,002 B2 | 2/2006 | Vahala et al. |
| 7,005,653 B1 | 2/2006 | Daniel |
| 7,037,554 B2 | 5/2006 | Tao et al. |
| 7,050,212 B2 | 5/2006 | Matsko et al. |
| 7,085,452 B1 | 8/2006 | Lin et al. |
| 7,092,591 B2 | 8/2006 | Savchenkov et al. |
| 7,203,403 B2 | 4/2007 | Gunn, III |
| 7,209,616 B2 | 4/2007 | Welker et al. |
| 7,218,803 B1 | 5/2007 | Sumetsky |
| 7,228,016 B2 | 6/2007 | Beausoleil |
| 7,233,711 B1 | 6/2007 | Beausoleil et al. |
| 7,236,664 B2 | 6/2007 | Martin et al. |
| 7,260,279 B2 | 8/2007 | Gunn et al. |
| 7,292,751 B2 | 11/2007 | Popovic |
| 7,352,468 B2 | 4/2008 | Tarsa |
| 7,376,169 B2 | 5/2008 | Henrichs |
| 7,460,746 B2 | 12/2008 | Maleki et al. |
| 7,474,810 B2 | 1/2009 | Bratkovski et al. |
| 7,480,425 B2 | 1/2009 | Gunn et al. |
| 7,512,298 B2 | 3/2009 | Yi et al. |
| 7,528,959 B2 | 5/2009 | Novotny et al. |
| 7,545,843 B2 | 6/2009 | Armani et al. |
| 7,630,417 B1 | 12/2009 | Maleki et al. |
| 7,693,369 B2 | 4/2010 | Fan et al. |
| 7,738,522 B2 | 6/2010 | Henrichs |
| 7,769,071 B2 | 8/2010 | Vahala et al. |
| 7,781,217 B2 | 8/2010 | Armani et al. |
| 7,783,144 B2 | 8/2010 | Chigrinov et al. |
| 7,796,262 B1 | 9/2010 | Wang et al. |
| 7,869,470 B2 | 1/2011 | Wong et al. |
| 8,033,706 B1 | 10/2011 | Kelly et al. |
| 8,040,132 B2 | 10/2011 | Klein et al. |
| 8,072,606 B2 | 12/2011 | Chau et al. |
| 8,092,855 B2 | 1/2012 | Armani et al. |
| 8,094,359 B1 | 1/2012 | Matsko et al. |
| 8,111,722 B1 | 2/2012 | Maleki et al. |
| 8,154,716 B2 | 4/2012 | Heideman |
| 8,180,421 B2 | 5/2012 | Phillips et al. |
| 8,208,502 B2 | 6/2012 | Srinivasan et al. |
| 8,349,275 B2 | 1/2013 | Wang et al. |
| 8,447,145 B2 | 5/2013 | Goldring et al. |
| 8,483,521 B2 | 7/2013 | Popovic |
| 8,493,560 B2 | 7/2013 | Shopova et al. |
| 8,704,155 B2 | 4/2014 | He et al. |
| 9,012,830 B2 | 4/2015 | Zhu et al. |
| 9,122,004 B1 | 9/2015 | Roth et al. |
| 9,170,371 B2 | 10/2015 | Santori et al. |
| 9,687,847 B1 * | 6/2017 | Lutti ............... B01L 3/502761 |
| 9,766,402 B2 | 9/2017 | Yang et al. |
| 10,782,289 B2 | 9/2020 | Ozdemir et al. |
| 11,131,619 B2 | 9/2021 | Ozdemir et al. |
| 11,754,488 B2 | 9/2023 | Ozdemir et al. |
| 2002/0018504 A1 | 2/2002 | Coldren |
| 2002/0031838 A1 | 3/2002 | Meinhart et al. |
| 2002/0092977 A1 | 7/2002 | Lerber et al. |
| 2002/0097401 A1 | 7/2002 | Maleki et al. |
| 2003/0021301 A1 | 1/2003 | Vahala et al. |
| 2004/0008942 A1 | 1/2004 | Scheuer et al. |
| 2004/0160994 A1 | 8/2004 | Zhang |
| 2004/0247008 A1 | 12/2004 | Scheuer et al. |
| 2004/0263858 A1 | 12/2004 | Song et al. |
| 2004/0264901 A1 | 12/2004 | Tao et al. |
| 2005/0036151 A1 | 2/2005 | Gornick et al. |
| 2005/0073681 A1 | 4/2005 | Sevick-Muraca et al. |
| 2005/0117157 A1 | 6/2005 | Tarsa |
| 2005/0128488 A1 | 6/2005 | Yelin et al. |
| 2005/0128566 A1 | 6/2005 | Savchenkov et al. |
| 2005/0163185 A1 | 7/2005 | Vahala et al. |
| 2005/0168753 A1 | 8/2005 | Butt et al. |
| 2005/0207713 A1 | 9/2005 | Mazur et al. |
| 2005/0220411 A1 | 10/2005 | Ilchenko |
| 2006/0002432 A1 | 1/2006 | Vahala et al. |
| 2006/0062508 A1 | 3/2006 | Guo et al. |
| 2006/0170931 A1 | 8/2006 | Guo et al. |
| 2006/0239617 A1 | 10/2006 | Montgomery et al. |
| 2006/0280406 A1 | 12/2006 | Montgomery et al. |
| 2006/0280407 A1 | 12/2006 | Montgomery et al. |
| 2007/0030492 A1 | 2/2007 | Novotny et al. |
| 2007/0071386 A1 | 3/2007 | Digonnet et al. |
| 2007/0114477 A1 | 5/2007 | Teraoka et al. |
| 2007/0154129 A1 | 7/2007 | Beausoleil et al. |
| 2007/0173718 A1 | 7/2007 | Richards-Kortum et al. |
| 2007/0206203 A1 | 9/2007 | Trainer |
| 2007/0237460 A1 | 10/2007 | Fan et al. |
| 2007/0258088 A1 | 11/2007 | Silberberg et al. |
| 2007/0269901 A1 | 11/2007 | Armani et al. |
| 2008/0089367 A1 | 4/2008 | Srinivasan et al. |
| 2008/0129997 A1 | 6/2008 | Yi et al. |
| 2008/0193133 A1 | 8/2008 | Krug et al. |
| 2008/0204715 A1 | 8/2008 | Klehr et al. |
| 2008/0273828 A1 | 11/2008 | Montgomery et al. |
| 2008/0285606 A1 | 11/2008 | Kippenberg et al. |
| 2008/0285917 A1 | 11/2008 | Bratkovski et al. |
| 2008/0291446 A1 | 11/2008 | Smith et al. |
| 2009/0103099 A1 | 4/2009 | Debackere et al. |
| 2009/0136181 A1 | 5/2009 | Vollmer et al. |
| 2009/0156942 A1 | 6/2009 | Phillips et al. |
| 2009/0169162 A1 | 7/2009 | Kumkar et al. |
| 2009/0190877 A1 | 7/2009 | Wang et al. |
| 2009/0191657 A1 | 7/2009 | Yang et al. |
| 2009/0214755 A1 | 8/2009 | Armani et al. |
| 2009/0256136 A1 | 10/2009 | Tan et al. |
| 2009/0310140 A1 | 12/2009 | Smith et al. |
| 2009/0310902 A1 | 12/2009 | Smith et al. |
| 2010/0026300 A1 | 2/2010 | Klein et al. |
| 2010/0085573 A1 | 4/2010 | Lu et al. |
| 2010/0171958 A1 | 7/2010 | Chau et al. |
| 2010/0182607 A1 | 7/2010 | Chau et al. |
| 2010/0231903 A1 | 9/2010 | Sumetsky |
| 2010/0326200 A1 | 12/2010 | Sheverev et al. |
| 2011/0019186 A1 | 1/2011 | Himmelhaus et al. |
| 2011/0139970 A1 | 6/2011 | He et al. |
| 2011/0208031 A1 | 8/2011 | Wolfe et al. |
| 2011/0253897 A1 | 10/2011 | Saeedkia et al. |
| 2011/0253909 A1 | 10/2011 | Himmelhaus et al. |
| 2011/0267609 A1 | 11/2011 | Wu et al. |
| 2011/0277540 A1 | 11/2011 | Ioppolo et al. |
| 2011/0306854 A1 | 12/2011 | Arnold et al. |
| 2012/0065495 A1 | 3/2012 | Richards-Kortum et al. |
| 2012/0065521 A1 | 3/2012 | Richards-Kortum et al. |
| 2012/0177080 A1 | 7/2012 | Yang et al. |
| 2012/0194893 A1 | 8/2012 | Maleki et al. |
| 2012/0268731 A1 | 10/2012 | Zhu et al. |
| 2012/0308181 A1 | 12/2012 | Hafezi et al. |
| 2012/0321245 A1 | 12/2012 | Vahala et al. |
| 2013/0279849 A1 | 10/2013 | Santori et al. |
| 2013/0330839 A1 | 12/2013 | Suh et al. |
| 2014/0253917 A1 | 9/2014 | Heidrich et al. |
| 2014/0321485 A1 | 10/2014 | Seidel et al. |
| 2014/0360273 A1 | 12/2014 | Zhang et al. |
| 2015/0285728 A1 | 10/2015 | Ozdemir et al. |
| 2015/0295379 A1 | 10/2015 | Ozdemir et al. |
| 2016/0266110 A1 | 9/2016 | Ozdemir et al. |
| 2016/0372885 A1 | 12/2016 | Yang et al. |
| 2017/0371104 A1 | 12/2017 | Yang et al. |

(56) References Cited

U.S. PATENT DOCUMENTS

| | | | |
|---|---|---|---|
| 2018/0109325 | A1 | 4/2018 | Ozdemir et al. |
| 2018/0164307 | A1 | 6/2018 | Ozdemir et al. |
| 2018/0306696 | A1 | 10/2018 | Ozdemir et al. |
| 2021/0255213 | A1* | 8/2021 | Otugen ............... G01P 15/093 |
| 2022/0050043 | A1 | 2/2022 | Ozdemir et al. |
| 2022/0166613 | A1 | 5/2022 | Cruz et al. |
| 2022/0350082 | A1 | 11/2022 | Yang et al. |
| 2023/0010794 | A1 | 1/2023 | Yang et al. |
| 2023/0304916 | A1 | 9/2023 | Ozdemir et al. |

FOREIGN PATENT DOCUMENTS

| | | | |
|---|---|---|---|
| WO | 2004070432 A3 | 7/2005 | |
| WO | 2015050591 A2 | 4/2015 | |
| WO | WO-2016130594 A1 * | 8/2016 | ......... G01N 15/1429 |
| WO | 2021055823 A2 | 3/2021 | |

OTHER PUBLICATIONS

Hoet, Peter HM, et al., "Nanoparticles—known and unknown health risks", Journal of Nanobiotechnology, Dec. 8, 2004, 15 pages, DOI:10.1186/1477-3155-2-12, BioMed Central.

Nie, Shuming, et al., "Probing Single Molecules and Single Nanoparticles by Surface-Enhanced Raman Scattering", Science, Feb. 21, 1997, pp. 1102-1106, DOI: 10.1126/science.275.5303.1102, American Association for the Advancement of Science.

Patolsky, Fernando, et al., "Electrical detection of single viruses", PNAS, Sep. 28, 2004, pp. 14017-14022, vol. 101, No. 39, The National Academy of Sciences of the USA.

Naik, A.K., et al., "Towards single-molecule nanomechanical mass spectrometry", Nature Nanotechnology, Jun. 21, 2009, pp. 445-450, DOI: 10.1038/NNano.2009.152, Macmillan Publishers Limited.

Burg, Thomas P., et al., "Weighing of biomolecules, single cells and single nanoparticles in fluid", Nature, Apr. 26, 2007, pp. 1066-1069, vol. 446, DOI: 10.1038/nature05741, Nature Publishing Group.

Wang, Shaopeng, et al., Label-free imaging, detection, and mass measurement of single viruses by surface plasmon resonance, 5 pages, DOI: 10.1073/pnas.1005264107, PNAS.

Mitra, Anirban, et al., "Nano-optofluidic Detection of Single Viruses and Nanoparticles", ACS Nano, 2010, pp. 1305-1312, vol. 4, No. 3, American Chemical Society.

Vahala, Kerry J. "Optical microcavities", Nature, Aug. 14, 2003, pp. 839-846, vol. 424, Nature Publishing Group.

Armani, D.K., et al., "Ultra-high-Q toroid microcavity on a chip", Nature, Feb. 27, 2003, pp. 925-928, vol. 421, Nature Publishing Group.

Vollmer, Frank, et al., "Whispering-gallery-mode biosensing: label-free detection down to single molecules", Nature Methods, Jun. 27, 2008, pp. 591-596, vol. 5, No. 7, DOI:10.1038/NMETH.1221, Nature Publishing Group.

Shopova, S.I., et al., "Ultrasensitive nanoparticle detection using a portable whispering gallery mode biosensor driven by a periodically poled lithium-niobate frequency doubled distributed feedback laser", Review of Scientific Instruments, Oct. 27, 2010, pp. 103110-1-103110-4, vol. 81, American Institute of Physics.

Yalcin, Ayca, et al., "Optical Sensing of Biomolecules Using Microring Resonators", IEEE Journal of Selected Topics in Quantum Electronics, Jan. 2006, pp. 148-155, vol. 12, No. 1.

White, Ian M., et al., "Liquid-core optical ring-resonator sensors", Optics Letters, Feb. 9, 2006, pp. 1319-1321, vol. 31, No. 9, Optical Society of America.

Zhu, Jiangang, et al., "On-chip single nanoparticle detection and sizing by mode splitting in an ultrahigh-Q microresonator", Nature Photonics, Dec. 13, 2009, pp. 46-49, DOI: 10.1038/NPHOTON.2009.237, Macmillan Publishers Limited.

Weiss, D.S., et al., "Splitting of high-Q Mie modes induced by light backscattering in silica microspheres", Optics Letters, Sep. 15, 1995, pp. 1835-1837, vol. 20, No. 18, Optical Society of America.

Gorodetsky, Michael L., et al., "Rayleigh scattering in high-Q microspheres", Journal of the Optical Society of America, Jun. 2000, pp. 1051-1057, vol. 17, No. 6, Optical Society of America.

Mazzei, A., et al., "Controlled Coupling of Counterpropagating Whispering-Gallery Modes by a Single Rayleigh Scatterer: A Classical Problem in a Quantum Optical Light", Physical Review Letters, Oct. 26, 2007, pp. 173603-1 to 173603-4, PRL 99, 173603, The American Physical Society.

Chantada, L., et al., "Optical resonances in microcylinders: response to perturbations for biosensing", Journal of the Optical Society of America, Aug. 2008, pp. 1312-1321, vol. 25, No. 8, Optical Society of America.

Neelen, R. Centeno, et al., "Frequency splitting of the longitudinal modes of a ring dye laser due to backscattering", Journal of the Optical Society of America, May 1991, pp. 959-969, vol. 8, No. 5, Optical Society of America.

Yang, Lan, et al., A 4-Hz Fundamental Linewidth on-chip Microlaser, 2007, 2 pages, OSA 1-55752-834-9, Optical Society of America.

He, Lina, et al., "Ultrasensitive detection of mode splitting in active optical microcavities", Physical Review, Nov. 11, 2010, pp. 053810-1 to 053810-4, vol. A 82, DOI: 10.1103/PhysRevA.82.053810, The American Physical Society.

Yang, Lan, et al., "Erbium-doped and Raman microlasers on a silicon chip fabricated by the sol-gel process", Applied Physics Letters, Feb. 25, 2005, pp. 091114-1 to 091114-3, vol. 86, 091114, DOI: 10.1063/1.1873043, American Institute of Physics.

Zhu, Jiangang, et al., "Controlled manipulation of mode splitting in an optical microcavity by two Rayleigh scatterers", Optics Express, Oct. 26, 2010, pp. 23535-23543, vol. 18, No. 23, Optical Society of America.

He, Lina, et al., "Scatterer induced mode splitting in poly(dimethylsiloxane) coated microresonators", Applied Physics Letters, Jun. 1, 2010, pp. 221101-1 to 221101-3, vol. 96, 221101, DOI: 10.1063/1.3435480, American Institute of Physics.

Kim, Woosung, et al., "Demonstration of mode splitting in an optical microcavity in aqueous environment", Applied Physics Letters, Aug. 18, 2010, pp. 071111-1 to 071111-3, vol. 97, 071111, DOI: 10.1063/1.3481352, American Institute of Physics.

Hering S. V. et al., "A Laminar-Flow, Water-Based Condensation Particle Counter (WCPC)," Aerosol Science and Technology, 39(7): 659-672 (2005).

He, L. et al., "Whispering Gallery Mode Microresonators for Lasing and Single Nanoparticle Detection," Washington University in St. Louis, May 24, 2012.

Monifi, F et al. "Encapsulation of a fiber taper coupled microtoroid resonator in a polymer matrix"; Publication [online]. Apr. 23, 2013 [retrieved Nov. 6, 2020]. Retrieved from the Internet: <URL: https://arxiv.org/pdf/1304.6423.pdf>; entire document.

Monifi, F et al. "Ultrasound Sensing Using a Fiber Coupled Silica Microtoroid Resonator Encapsulated in a Polymer"; IEEE Photonics Conference; Publication [online]. Nov. 7, 2013 [retrieved Nov. 6, 2020]. Retrieved from the Internet: <URL: https://ieeexploreieee.org/document/6656511>; entire document.

Monifi, F et al. "A Robust and Tunable Add-Drop Filter using Whispering Gallery Mode Microtoroid Resonator"; Journal of Lightwave Technology, vol. 30, Issue 21. Nov. 1, 2012) [retrieved Nov. 9, 2020]. Retrieved from the Internet: <URL: https://ieeexplore.ieee.org/document/6280580>; entire document.

Chistiakova, M et al. "Photoelastic ultrasound detection using ultrahigh-Q silica optical resonators"; Optical Society of America; Publication [online]. 2014 [retrieved Nov. 10, 2020]. Retrieved from the Internet: <URL: https://www.osapublishing.org/DirectPDFAccess/AA1539C5-DD00-4FD7-A218403E9FB2D2B9_303716/OE-22-23-28169.pdf?da=1&id=303716&seq=0&mobile=no>; entire document.

Maxwell, A et al. "Polymer Microring Resonators for High-Frequency Ultrasound Detection and Imaging"; IEEE J Sel Top Quantum Electron.; Publication [online]. Jan. 2008 [retrieved Nov. 10, 2020]. Retrieved from the Internet: <URL: https://www,ncbi.nlm.nih.gov/pmc/articles/PMC2917845/pdf/nihms108929.pdf>; entire document.

Anishchenko, V. S. et al. "Stochastic resonance in chaotic systems," J. Statistical Physics, 70(1-2): 183-196 ;1993).

(56) References Cited

OTHER PUBLICATIONS

Arteaga, M.A. et al., "Experimental evidence of coherence resonance in a time-delayed bistable system," Physical Review Letters, 99(2): 023903.1 to 0239014 (2007).
Bakemeier, L et al., "Route to chaos in optomechanics," Physical Review Letters, 114(1): 013601.1-013601.5 ;2015).
Brambilla, G. et al, "Optical fiber nanowires and microwires: fabrication and applications," Advances in Optics and Photonics, 1(1): 107-161 (2009).
Brambilla, G. et al., "Optical manipulation of microspheres along a subwavelength optical wire," Optics Letters, 32 ;20): 3041-3043 (2007).
Brandstetter, M. et al., "Reversing the pump dependence of a laser at an exceptional point," Nature 3ommunications, 5: 4034, 6 pages (2014).
Cai, M. et al., "Highly Efficient Optical Power Transfer to Whispering-Gallery Modes by Use of a Symmetrical Dual-Thupling Configuration," Optics Letters, 25(4): 260-262 (2000).
Dal Bosco, A.K. et al., "Delay-induced deterministic resonance of chaotic dynamics," Europhysics Letters, 101(2): 24001—p. 1 to p. 5 (2013).
Forstner, S. et al., "Cavity Optomechanical Magnetometer," Physical Review Letters, 108(12): 120801 (2012).
Gammaitoni, L. et al., "Stochastic resonance in bistable systems," Physical Review Letters, 62(4): 349-352 (1989).
Gammaitoni, L. et al., "Stochastic Resonance," Reviews of Modern Physics, 70(1): 223-287 (1998).
Gang, H. et al., "Stochastic resonance without external periodic force," Physical Review Letters, 71(6): 807 (1993).
Gong, Z. R. et al., "Effective Hamiltonian approach to the Kerr nonlinearity in an optomechanical system," Physical Review A, 80(6B): 065801.1 to 065801.4 (2009).
Gucker, F. T. et al., "A photoelectronic instrument for counting and sizing aerosol particles," British Journal of okpplied Physics, 5(S3): S138-S143 (1954).
He, L. et al., "Detecting single viruses and nanoparticles using whispering gallery microlasers," Nature ganotechnology, 6: 428-432 (2011).
Hossein-Zadeh, M. et al., "Characterization of a radiation-pressure-driven micromechanical oscillator," Physical Review A, 74(2): 023813-1 to 023813-15 (2006).
Knittel, J. et al., "Back-scatter based whispering gallery mode sensing," Scientific Reports, 3: 2974, D01:10.1038/srep02974 (2013).
Lee, S-Y. "Geometrical phase imprinted on eigenfunctions near an exceptional point," Physical Review A, 82(6): ) 64101 (2010).
Lemarchand, A. et al., "Temperature-driven coherence resonance and stochastic resonance in a thermochemical system," Physical Review E, 89(2): 022916.1-022916.8 (2014).
Lindner, B. et al., "Analytical approach to the stochastic FitzHugh-Nagumo system and coherence resonance," Physical Review E, 60(6): 7270-7276 (1999).
Liu, Z et al., "Coherence resonance in coupled chaotic oscillators," Physical Review Letters, 86(21): 4737-4740 (2001).
Masoller, C., "Noise-induced resonance in delayed feedback systems," Physical Review Letters, 88(3): 034102.1 to 34102.4 (2002).
McNamara, B. et al., "Observation of stochastic resonance in a ring laser," Physical Review Letters, 60(25): 2626-2629 (1988).
Milner, V. et al., "Photon localization laser: low-threshold lasing in a random amplifying layered medium via wave localization," Physical Review Letters, 94(7): 073901 (2005).

Murugan, G.S. et al., "Optical Propulsion of Individual and Clutered Microspheres along Sub-Micron Optical Wires," Japanese Journal of Applied Physics, 47(8S1): 6716-6718 (2008).
Peng, B. et al., "Loss-induced suppression and revival of lasing," Science 346(6207): 328-332 (2014).
Pikovsky, A. S. et al., "Coherence resonance in a noise-driven excitable system," Physical Review Letters, 78(5): 175-778 (1997).
Rokhsari, H. et al., "Ultralow Loss, High Q, Four Port Resonant Couplers for Quantum Optics and Photonics," Physical Review Letters, 92(25): 253905-1 to 253905-4 (2004).
Saques, F. et al., "Spatiotemporal order out of noise," Reviews of Modem Physics, 79(3): 829-882 (2007).
Schmidt, B.S. et al., "Optofluidic trapping and transport on solid core waveguides within a microfluidic device," Optics Express 15(22): 14322-14334 (2007).
Sheu, F-W et al., "Using a slightly tapered optical fiber to attract and transport microparticles," Optics Express, 18(6): 5574-5579 (2010).
Tureci, H. et al., "Theory of the spatial structure of nonlinear lasing modes," Physical Review A, 76(1): 013813-1 to 313813-4 (2007).
Villatoro J. et al., "Fast detection of hydrogen with nano fiber tapers coated with ultra thin palladium layers," Optics Express, 13(13): 5087-5092 (2005).
Watts, M. R. et al. "Optical resonators: Microphotonic thermal imaging," Nature Photonics, 1(11): 632-634 (2007).
Xie, Z. et al., "Pure optical photoacoustic microscopy," Optics Express, 19(10): 9027-9034 (2011).
Yao, J et al., "Bandwidth-Turnable Add-Drop Filters Based on Micro-Electro-Mechanical-System Actuated Silicon Microtoroidal Resonators," Optics Letters, 34(17): 2557-2559 (2009).
Zhu, J et al., "Infrared light detection using a whispering-gallery-mode optical microcavity," Applied Physics Letters, 104(17): 171114 (2014).
Yong, YE et al., "A Review on Applications of Capacitive Displacement Sensing for Capacitive Proximity Sensor," IEEE Access, vol. 8, pp. 45325-45342 (2022).
Matsumoto, Nobuyuki et al., "Demonstration of Displacement Sensing of a mg-Scalre Pendulum for mm- and mg-Scale Gravity Measurements," Physics Review Letter, 122(071101), 2019, abstract only.
Shen, Changyu et al., "Optical fiber axial micro-displacement sensor based on Mach-Zehnder interferometer," Optics Express, 22(26), 2014, pp. 31984-31992.
Yang, Daquan, "Packaged Microbubble Resonator for Versatile Optical Sensing," IEEE, 38(16), pp. 4555-4559, abstract only.
Kavungal, Vishnu et al., "Packaged inline cascaded optical micro-resonators for multi-parameter sensing," Optial Fiber Technol., vol. 50, 2019, pp. 50-54.
Gao, Zhimin et al., "A facile PDMS coating approach to room-temperature gas sensors with high humidity resistance and long-term stability," Sensors Actuators B. Chem., vol. 325, Article No. 128810, 2020.
Liao, L. et al., "Optical whispering-gallery mode barcodes for high-precision and wide-range temperature measures," Light Sci. Appl., vol. 10, Art. No. 32, 2021, pp. 1-11.
Xu, Yan et al., "Review of machine-vision based methodologies for displacement measurement in civil structures," J. Civil Struct. Health Monitoring, vol. 8, 2018 pp. 91-110.
Jiang Xuefeng et al., "Whispering-Gallery Sensors," Cell Press, Matter 3, Aug. 5, 2020, pp. 371-392.
Fujii, Shun et al., "Dispersion engineering and measurement of whispering gallery modefrequency comb generation," Nanophotonics, 9(5), 2020, pp. 1087-1104.

* cited by examiner

HIGH-Q WHISPERING GALLERY MODE (WGM) RESONATORS ENCAPSULATED IN POLYDIMETHYLSILOZANE (PDMS) FOR HIGHLY SENSITIVE DISPLACEMENT DETECTION

CROSS-REFERENCE TO RELATED APPLICATIONS

This application claims priority from U.S. Provisional Application Ser. No. 63/509,855 filed on Jun. 23, 2023, which is incorporated herein by reference in its entirety.

FIELD OF THE DISCLOSURE

The field of the invention relates generally to device packaging, optical materials, optical sensors, microresonators, whispering gallery modes, and sensing systems empowered by artificial intelligence, for use in a variety of applications, including displacement detection.

BACKGROUND OF THE DISCLOSURE

Optical whispering gallery mode (WGM) microresonators are a class of optical devices with a superior capability to confine light within a small volume. These devices offer the advantages of high Q-factor, small mode volume, and strong light-matter interaction enabling high sensitivity. Fiber tapers have been used as an efficient tool to couple light in and out of WGM resonators, but their instability has limited their practical applications. Conventional packaging methods for WGM resonators rely on UV curable polymers with low refractive indices to improve robustness; however, they are costly and potentially toxic, and the interference from ambient moisture poses a critical issue.

A variety of different optical displacement sensors have been developed over the past decade, including Mach-Zehnder interferometer, Sagnac interferometer, photonic crystal fiber, bent fiber structure, and multimode interference fiber structure. However, these sensors have relatively low sensitivity due to the limited optical path constrained by the physical dimensions of the structures. An optical resonator is a promising candidate as a solution to overcome this limitation. In a high-quality resonator, light could circulate along a closed loop over millions of times, which increases the effective optical path beyond the physical dimension of the structure and significantly enhances the light-matter interactions, leading to significantly improved sensitivity. In addition, the high Q-factor of a resonator leads to a narrow bandwidth in the spectrum, making it easier to resolve subtle changes. Among various kinds of optical resonator sensors, whispering-gallery-mode (WGM) resonators have attracted increasing attention due to their exceptionally high Q-factor, fast dynamic response, and high sensitivity. The advances in WGM resonators have demonstrated their promise for a broad range of applications, including non-Hermitian and topological photonics, optomechanical solitons, cavity quantum electrodynamics, nonlinear optics, low threshold lasers, and optical sensors.

Typically, WGMs are excited and detected via a tapered fiber coupled to a resonator. However, due to the small diameter of tapered fibers, WGM sensors suffer from low stability and robustness. To overcome this challenge and enable field testing outside the laboratory environment, portable WGM sensors have been developed based on packaging technique and their potential is being recognized. To date, only a small group of materials have been successfully demonstrated, including low refractive index UV curable polymer, UV epoxy, and moisture curable polymer. These materials belong to low index polymers, whose refractive indices are around 1.32-1.33.

The role of the packaging material is to protect the coupling condition of WGMs and maintain their function during operation and storage. For sensing purposes such as displacement sensing, the packaging material should also protect the sensor from breaking when large displacement is applied. In this regard, despite their success in providing portability to WGM sensors, these polymers with low refractive indices still have certain issues that limit their capability as a packaging material for sensing devices, including: 1) the rigidity of low index polymers makes them less suitable for displacement sensing applications where flexibility and/or stretchability are desired; 2) moisture diffusion is relatively rapid in these polymers, and packaged devices are still venerable to humidity. They will degrade upon exposure to elevated humidity and temperature, which would cause an extra loss in the system and limit the long-term reliability; and 3) the UV curable polymers utilize photoinitiators for curing, which could potentially be detrimental to human health and the environment. In addition, these polymers are also very expensive and require an inert or moisture environment during curing. Therefore, developing packaging techniques comparable to low index polymer packaging but utilizing flexible and stretchable polymeric materials remains imperative.

Additionally, in numerous physical, chemical, and biological processes, various parameters change simultaneously. To fully understand these complex processes, it's essential to simultaneously gather information on these diverse changes. Multiparameter sensing technologies are pivotal in these scenarios, as they concurrently capture a wide range of parameters at once, offering essential insights into complex process dynamics. For instance, in human health monitoring, parameters like heart rate, blood oxygen levels, and temperature can give vital clues about the body's state. By tracking these parameters together, healthcare professionals can make more accurate diagnoses and treatment plans. In robotics, incorporating multiparameter sensing is key for enabling robots to interact with their environment and humans effectively and safely. Such systems should not only process instructions but also perceive nuanced human motions, akin to showing empathy and natural social behaviors. Multiparameter sensors, by simultaneously detecting a variety of parameters, can mimic human sensory capabilities, enhancing the robot's ability to understand and respond to complex social cues and environmental conditions. Conventionally, multiplexed sensors include multiple individual sensors, each tailored to detect a specific parameter. They can also measure the same parameter at different locations, aiding in spatially mapping variations or providing less uncertainty and better overall sensing capabilities. However, each sensor needs individual calibration and maintenance, which is both time-consuming and resource-intensive. The complex manufacturing process and restricted sensor types limit their further integration and application. Besides developing new integration and multiplexing technology, developments in sensors with high sensitivity, simple and compact design, and more sensing capabilities could play a key role in addressing the complexity and performance challenges of multiparameter sensing.

To address these limitations, several research groups have developed a kind of compact multiparameter sensing platform based on optical fiber and waveguides. These platforms incorporate multiple microstructures like Fabry-Perot interferometers, fiber Bragg gratings, and ring resonators. Different from conventional sensors, these optical micro-structured sensors offer advantages such as a smaller footprint, immunity to electromagnetic interference, and remote sensing capabilities. However, they still depend on stacking multiple sensing elements, posing challenges in further integration. The use of spectrally resolved signal interrogators for interpretation further increases their complexity. Furthermore, as the matrix method is deeply anchored in existing multiparameter sensor designs, which assume linear relationships among sensed optical and measured output parameters, the limitation of the assumption significantly limits their potential in real-world applications. These relationships are often nonlinear, or they exhibit linear behavior only in limited ranges in more complex, real-world scenarios. As a result, it is challenging to combine very different sensing principles into a single-sensor structure, while being able to resolve individual parameters independently with low crosstalk.

Conventionally, displacement sensors, such as accelerometers, linear variable differential transformers, strain gauges, and piezoelectric sensors, are mainly based on electronic and magnetic techniques. While widely used, these sensors pose many economic and practical challenges, including their low spatial sensing resolutions, sparse and discrete point-wise measurements, sensitivity to electromagnetic interference, and vulnerability to humidity and corrosiveness. On the other hand, optical sensors offer significant advantages over conventional ones by providing such features as high precision, small footprint, resistance to electro-magnetic interference, and low cost. What is needed is real-time monitoring of displacement with high precision in many fields, such as imaging, astronautics, robotics, civil engineering, and structural health monitoring.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a displacement sensor that includes an optical whispering gallery mode (WGM) microresonator and a package encasing at least a portion of the WGM microresonator, the package including polydimethylsiloxane (PDMS).

In another aspect, an optical whispering gallery mode (WGM) device that includes a WGM microresonator and a package encasing at least a portion of the WGM microresonator, the package including polydimethylsiloxane (PDMS).

In yet another aspect, a non-transitory computer-readable recording medium having computer executable instructions stored thereon, which when executed by a processor of a sensor system, cause the processor to generate a hyper-information barcode using a multimode sensor. The multimode sensor is configured to capture comprehensive data and multi-faceted information for multiparameter sensing. The processor is configured to analyze, via machine learning models, the hyper-information barcodes generated from multimode spectra. Each mode of resonance of the multimode sensor can sense different variables and/or pinpoint the location of perturbation.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DESCRIPTION OF DRAWINGS

The patent or application file contains at least one drawing executed in color. Copies of this patent or patent application publication with color drawing(s) will be provided by the Office upon request and payment of the necessary fee.

The accompanying drawings, which are incorporated in and form a part of the specification, illustrate the embodiments of the present disclosure and together with the description, serve to explain the principles of the disclosure. Those of skill in the art will understand that the drawings, described below, are for illustrative purposes only. The drawings are not intended to limit the scope of the present disclosure in any way.

Figure 1A:
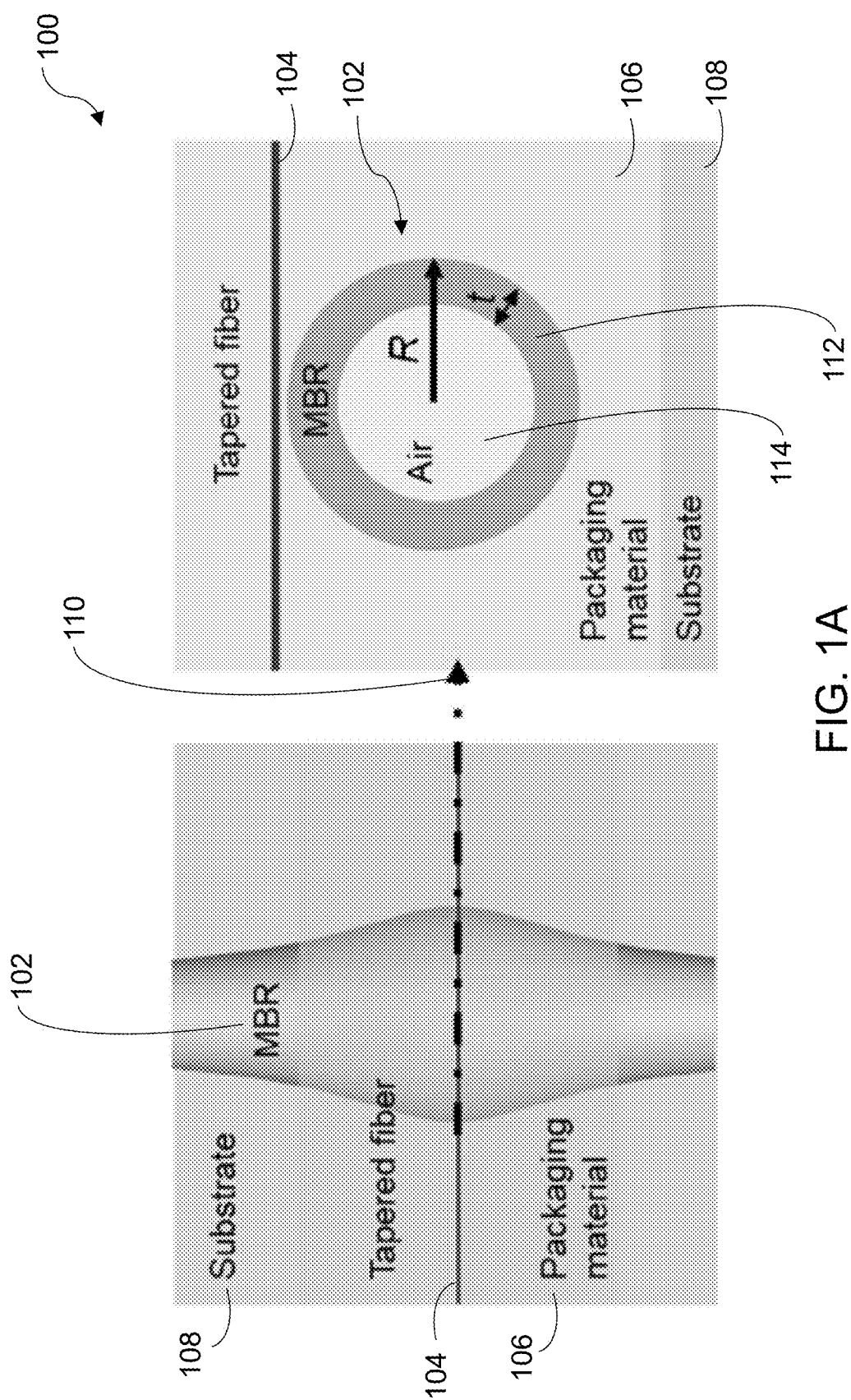
FIG. 1A illustrates a schematic of a microbubble resonator (MBR)-fiber coupling system according to one embodiment of the disclosure.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

The packaging of WGM devices using non-toxic polydimethylsiloxane (PDMS) is disclosed herein. Q-factor as high as $10^7$ is achieved at the 780 nm band. The PDMS packaging technique not only endows the WGM device with better robustness and compactness but also enhances the humidity resistance significantly. By making use of the unique flexibility of PDMS, displacement detection with high sensitivity (e.g., of ~0.1 pm/μm) and a detection limit as low as 600 nm is achieved. The WGM devices disclosed herein exhibit such high sensitivity and low detection limit as well as long-term operational stability, all of which are crucial for potential applications in displacement sensing systems and medical diagnostics.

Compared with conventional packaging techniques, which are costly, potentially toxic, and vulnerable to moisture, the PDMS packaging technique disclosed herein not only endows the WGM device with better robustness, stability, and compactness, but also enhances the humidity resistance significantly. Compared with all polymer WGM displacement sensors, the hybrid structure disclosed herein offers both high Q factors of silica microbubble resonators and high displacement sensitivity enhanced by the PDMS layer.

The present disclosure details light confinement when the resonator is encapsulated within polymer materials with various refractive index contrasts, both theoretically and experimentally. The results disclosed herein indicate that materials with a higher refractive index (higher than that of low index polymers) can also provide significant optical confinement if the structure is properly engineered. In one aspect, the packaging of WGM microbubble resonators (MBRs) is carried out using polydimethylsiloxane (PDMS).

Despite its high refractive index (1.4074 at 780 nm band), which may weaken the optical confinement when encapsulating a WGM resonator, PDMS bears the following key features that ensure its successful application for packaging: (1) PDMS has unique flexibility with a shear elastic modulus of ~250 kPa, much lower than UV curable polymer (~4.0 MPa)—the flexible nature of PDMS makes it possible for the encapsulated WGM resonators to detect applied displacement by distributing deformation in a large volume; (2) PDMS forms a protective hydrophobic layer on the coating surface which can improve the structural/chemical stability of devices under humid conditions, and (3) PDMS has excellent thermal, mechanical, and chemical stability, non-toxicity, and ease of use for fabrication. Through the combination of these features, packaging WGM MBRs for displacement sensing is beneficial in reducing and/or solving the hygroscopicity, rigidity, and toxicity issues, as well as achieving improved detection limits.

Additionally, accurate multiparameter sensing is crucial for capturing and analyzing complex interactions in diverse environments, leading to deeper, multi-faceted understandings and effective decision-making across various fields. Conventional multiparameter sensors relying on multiple sensors or microstructures, face limitations in further integration due to their complexity and their dependence on matrix methods (linear approximation) for signal analysis, which hinders their effectiveness in addressing real-world applications. To overcome these limitations, a new approach that integrates multimode sensing with machine learning algorithms in a single optical microresonator device is needed. The AI-empowered sensor disclosed herein leverages the hyper-information barcodes formed by the multimode sensing system, including resonances with distinct sensitivities and sensing hot spots. By extracting useful sensing information from the barcodes, the disclosed sensor achieves high-precision multiparameter sensing and perturbation tracking with excellent robustness against down-sampling and signal-to-noise ratio (SNR) reduction. The combination of multimode sensing and AI-driven data analysis position the disclosed sensing framework a promising tool for next-generation optical sensing and analysis systems.

Optical microresonator sensors, based on the Whispering-gallery mode (WGM) resonance for signal enhancement, are a new sensing technology. Based on their unique working mechanism, WGM sensors have shown unprecedented sensitivity levels for the label-free optical detection of single biomolecule and ion, as well as physical parameters such as thermal radiation, optical absorption, magnetic field, displacement, and angular velocity. In addition, by making use of the collective pattern of the resonance spectrum, the accuracy and dynamic range can be significantly improved via the optical barcode technique. Furthermore, WGM resonators can support various WGMs in different wavelengths, mode numbers, polarizations, quality factors, and other properties. These diverse WGMs in one sensor can provide multiple sensing modalities with additional sensing information, akin to employing multiple sensors to detect a target parameter. With these capabilities, a multimode WGM sensor provides a simple solution to the complexity and linear-dependence challenges of multiparameter sensing.

Disclosed herein is a hyper-information barcode technique for multiparameter sensing with only one single sensing element. The hyper-information barcode captures comprehensive data and multi-faceted information encoded in the multimode WGM spectrum of the sensor. Utilizing the distinct sensing channels provided by different WGMs, the sensor embedded under a micro-keyboard can accurately detect both the position and amplitude of perturbations applied. To discern patterns and relationships in raw sensor data, machine learning (ML) models are utilized for data analysis. These models are adept at analyzing both linear and nonlinear relationships, offering significant potential to overcome the limitations imposed by the conventional matrix method in existing multiparameter sensors. The performance of the models is further evaluated when dealing with sparse-sampled and noisy data. It is demonstrated to be a robust method for multiparameter sensing even in the presence of noise or down-sampling. Through continuous analysis of hyper-information barcodes, achieved simultaneous tracking of both the position and amplitude of perturbations was achieved. This dual tracking capability has enabled the application of a multi-factor authentication system that combines a password (a sequence of digital numbers) with the unique manner in which it is entered (subtle differences in pressing amplitude). This innovative approach enhances human-microrobot interaction, offering new possibilities in encryption and tactile sensing and other applications.

In various aspects, the performance of WGM resonators may be assessed using any suitable existing analysis method without limitation.

Figure 1B:
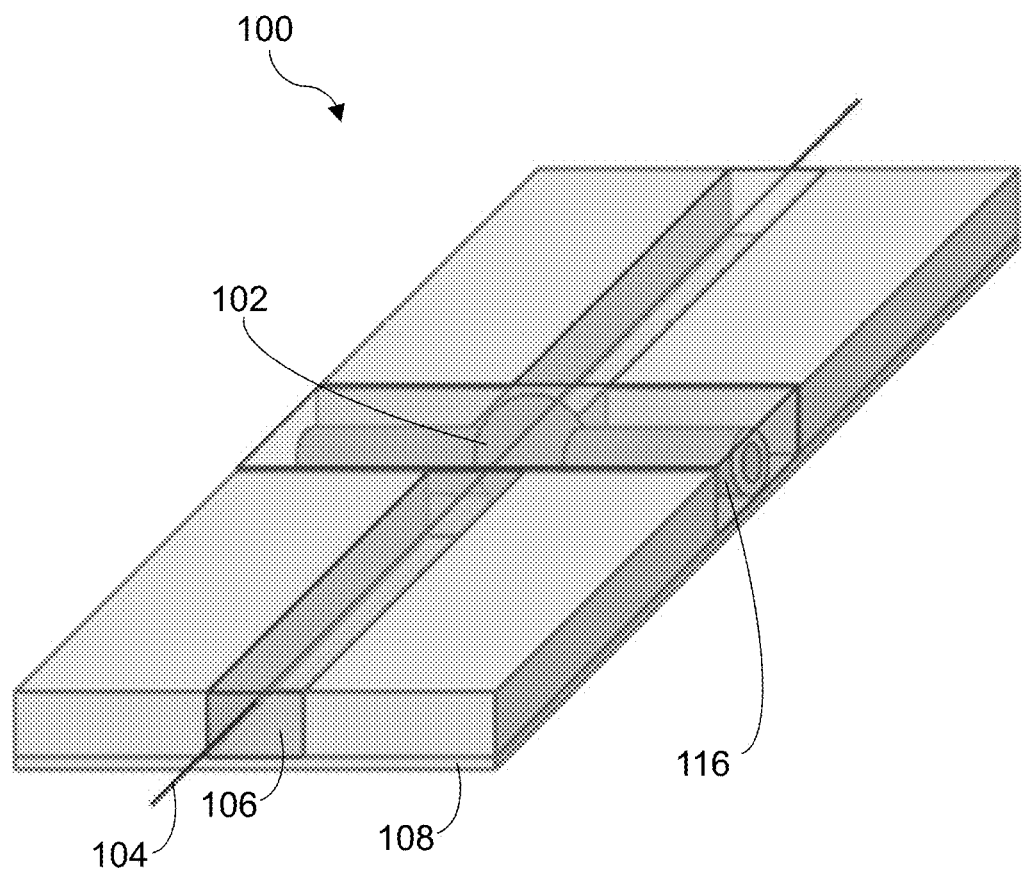
FIG. 1B illustrates an alternative schematic view of a packaged MBR-fiber coupling system according to one embodiment of the disclosure.

FIGS. 1A and 1B illustrate wholly packaging of an optical whispering-gallery-mode (WGM) microbubble resonator (MBR). FIG. 1A illustrates a schematic of an MBR-fiber coupling system 100, including an MBR 102, a tapered fiber 104, a packaging material 106 that encapsulates MBR 102 and tapered fiber 104, and a substrate 108. The right figure of FIG. 1A illustrates a cross-sectional view of system 100 taken along axis 110. FIG. 1A also shows a wall 112 of MBR 102, including a thickness "t" thereof, an inner portion 114 of MBR 102, and a radius "R" of MBR 102. Inner portion 114 may be filled with air or another substance or material. FIG. 1B illustrates an alternative schematic view of packaged MBR-fiber coupling system 100 on a substrate (e.g., substrate 108), including capillaries (e.g., microcapillaries) 116 of MBR 102.

Figure 1C:
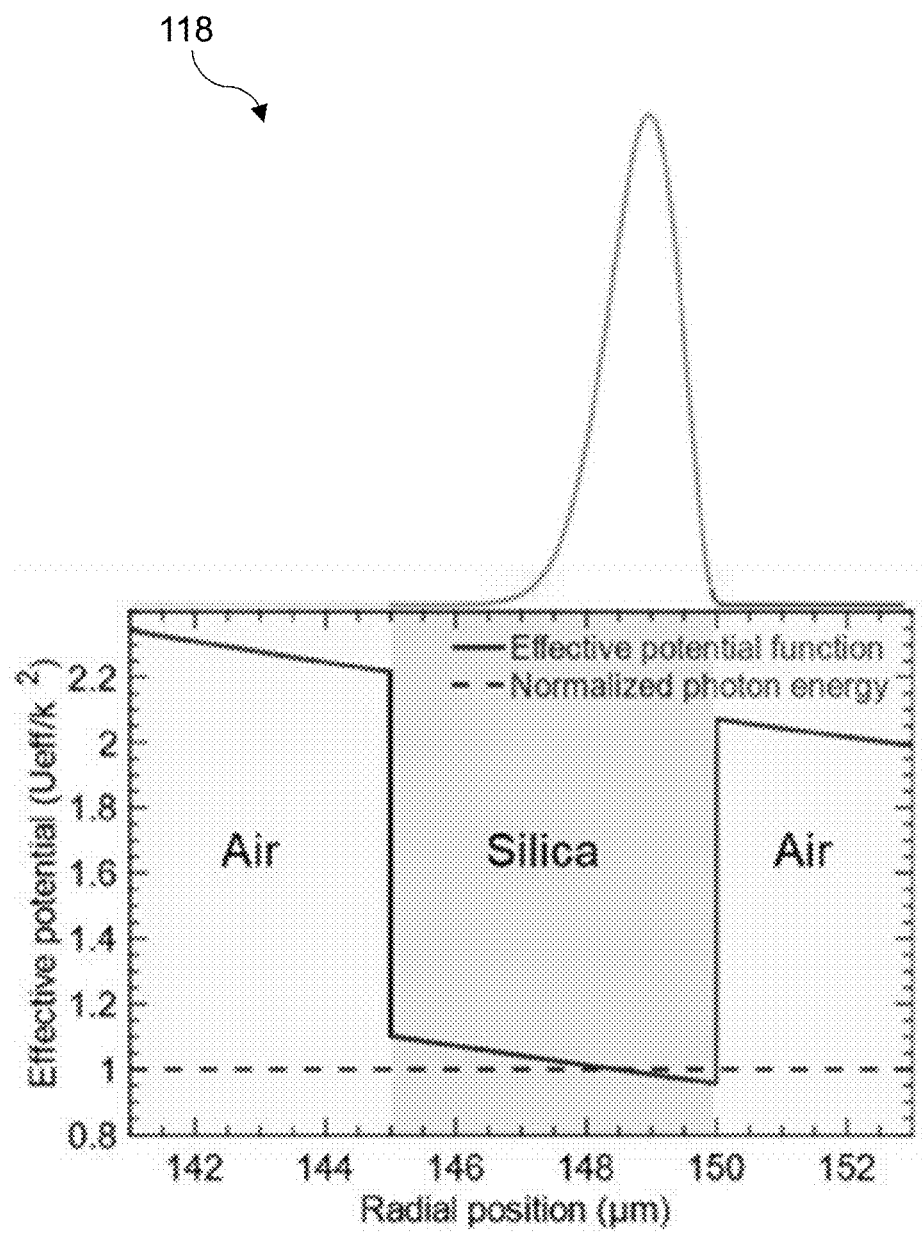
FIG. 1C illustrates effective potential function for an MBR encapsulated by air.
Figure 1D:
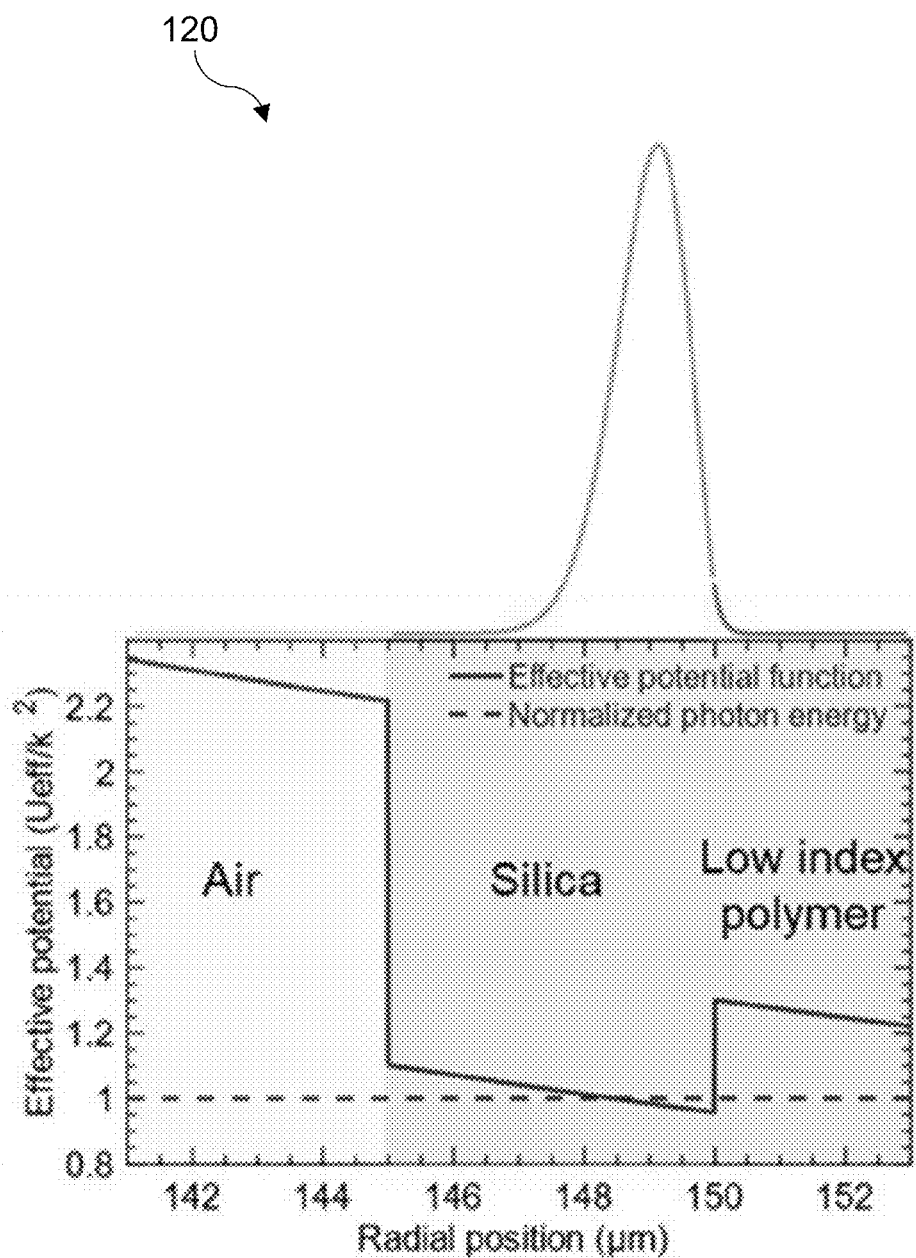
FIG. 1D illustrates effective potential function for an MBR encapsulated by low refractive index UV curable polymer.
Figure 1E:
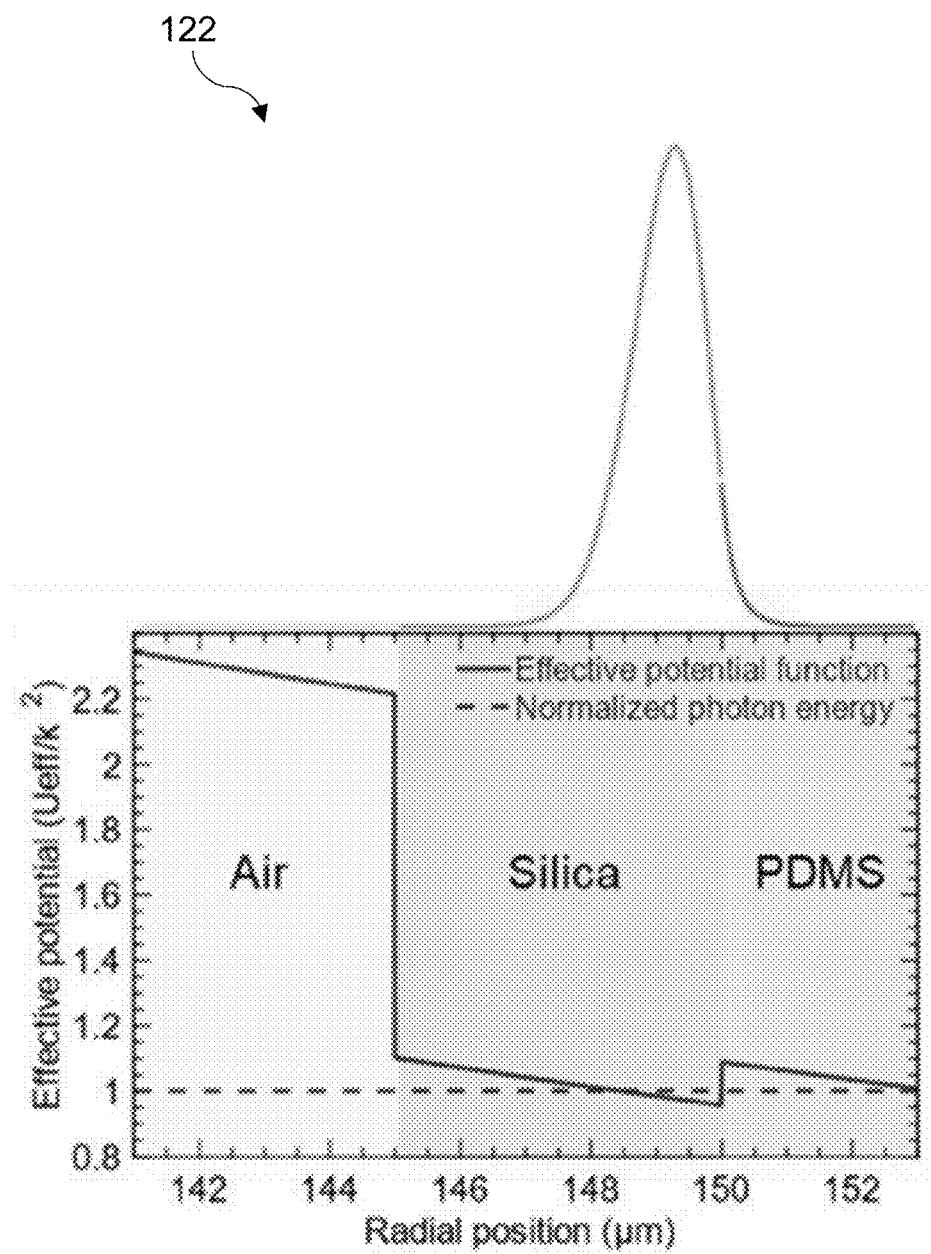
FIG. 1E illustrates effective potential function for an MBR encapsulated by PDMS.

FIGS. 1C-1E illustrate effective potential functions for MBR 102 encapsulated by various materials. In each of FIGS. 1C-1E, the vertical represents effective potential (Ueff/k$^2$), the horizontal represents radial position (μm), the horizontal dash-dotted line shows the normalized photon energy, and the radial distributions of optical mode inside the air core, silica wall, and the packaging material are shown in yellow, blue, and red curves, respectively. Plot 118 in FIG. 1C illustrates effective potential function for MBR 102 encapsulated by air. Plot 120 in FIG. 1D illustrates effective potential function for an MBR encapsulated by low refractive index UV curable polymer. Plot 122 in FIG. 1E illustrates effective potential function for an MBR encapsulated by PDMS.

Figure 1F:
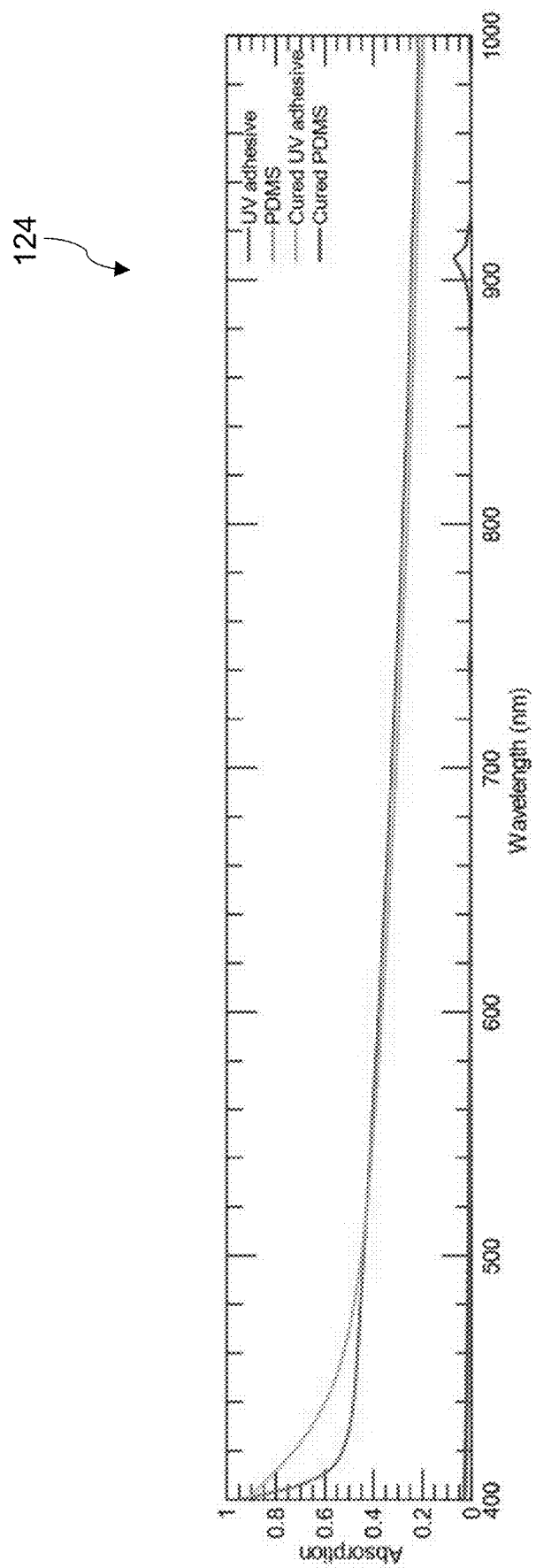
FIG. 1F illustrates absorption spectra of UV curable polymer and PDMS before and after curing.

Plot 124 in FIG. 1F illustrates absorption spectra of UV curable polymer and PDMS before and after curing. The vertical axis represents absorption, and the horizontal axis represents wavelength (nm).

Figure 2A:
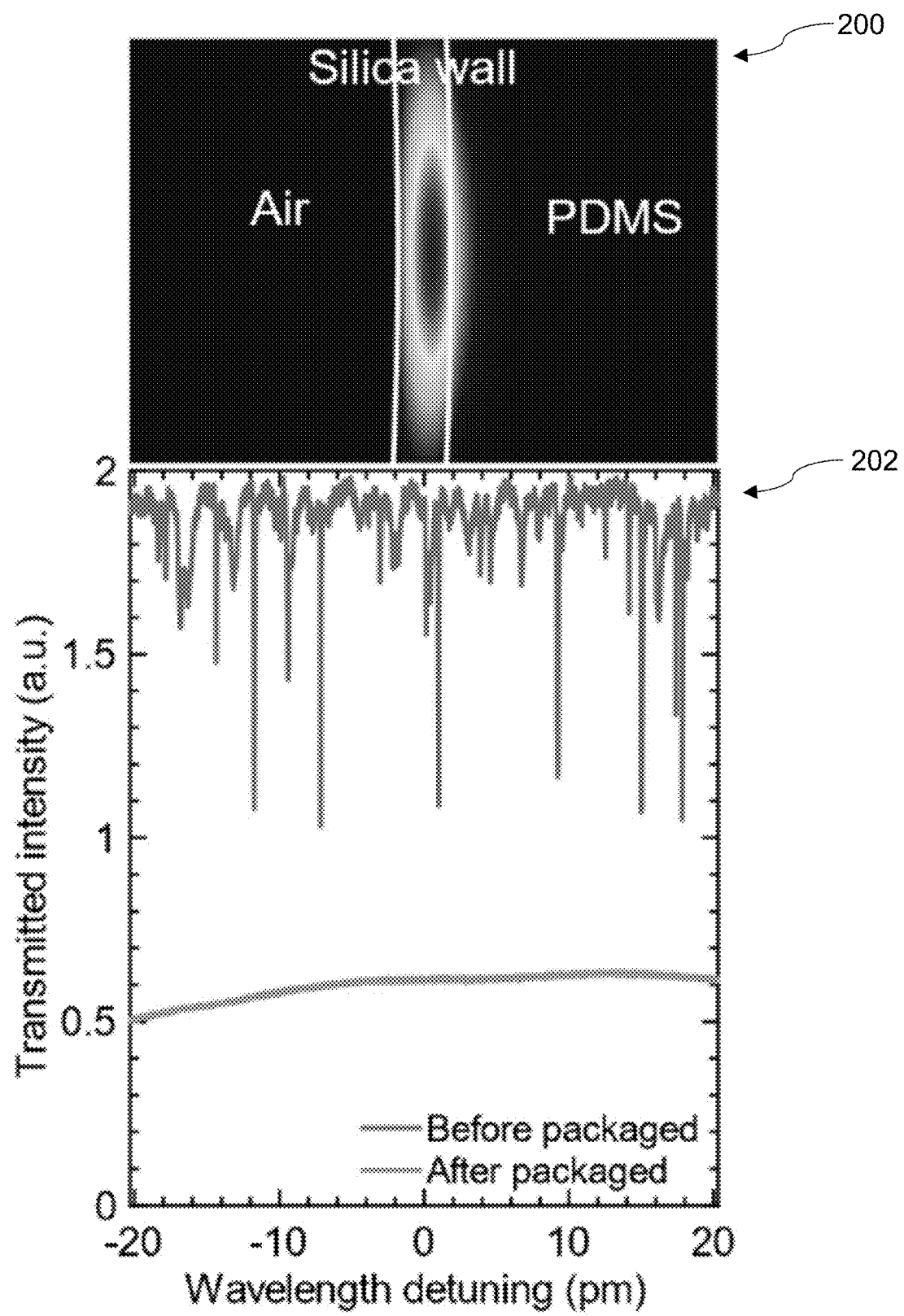
FIG. 2A illustrates simulations of optical confinement and WGM spectra before and after packaging with a first wall thickness.
Figure 2B:
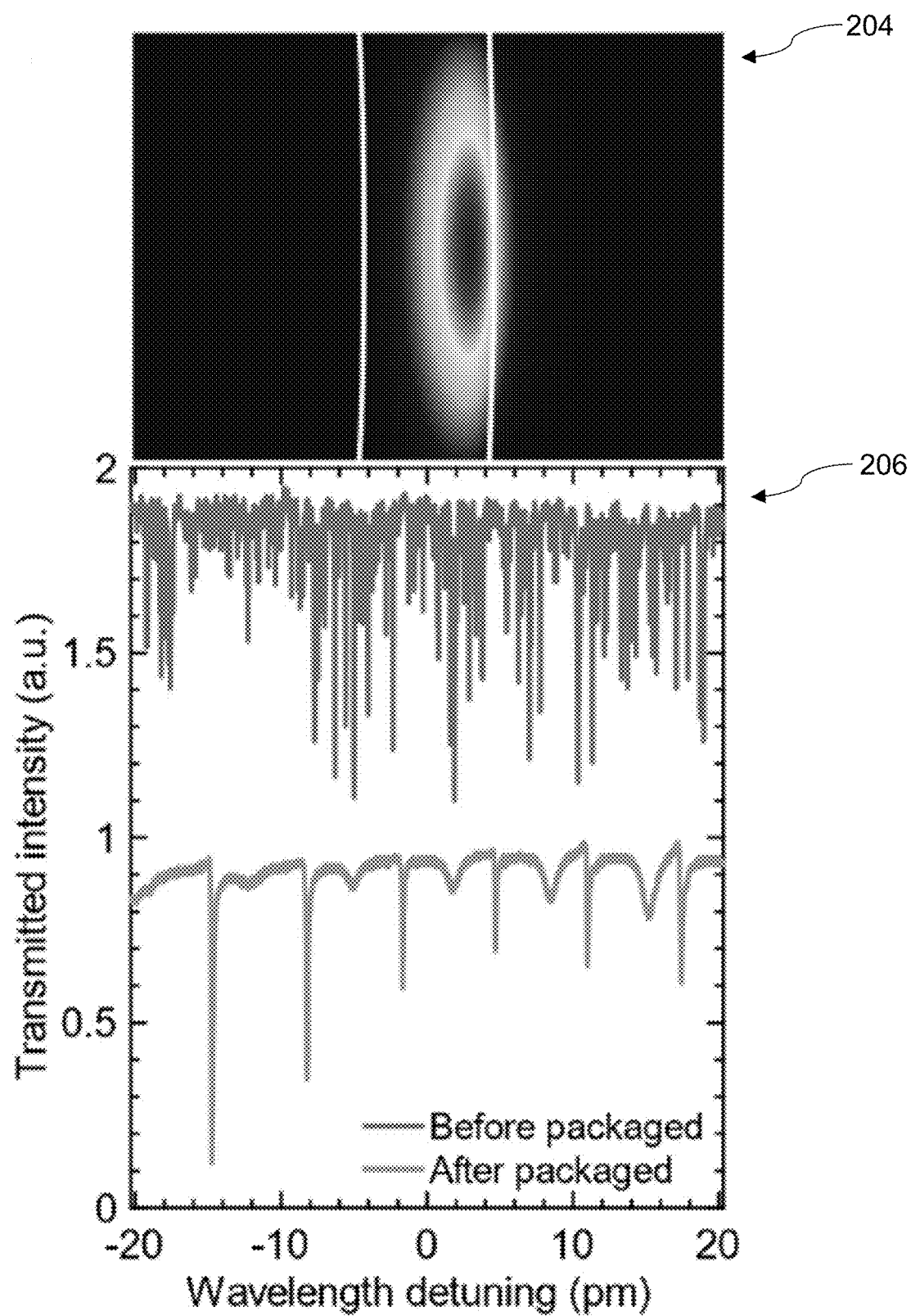
FIG. 2B illustrates simulations of optical confinement and WGM spectra before and after packaging with a second wall thickness.
Figure 2C:
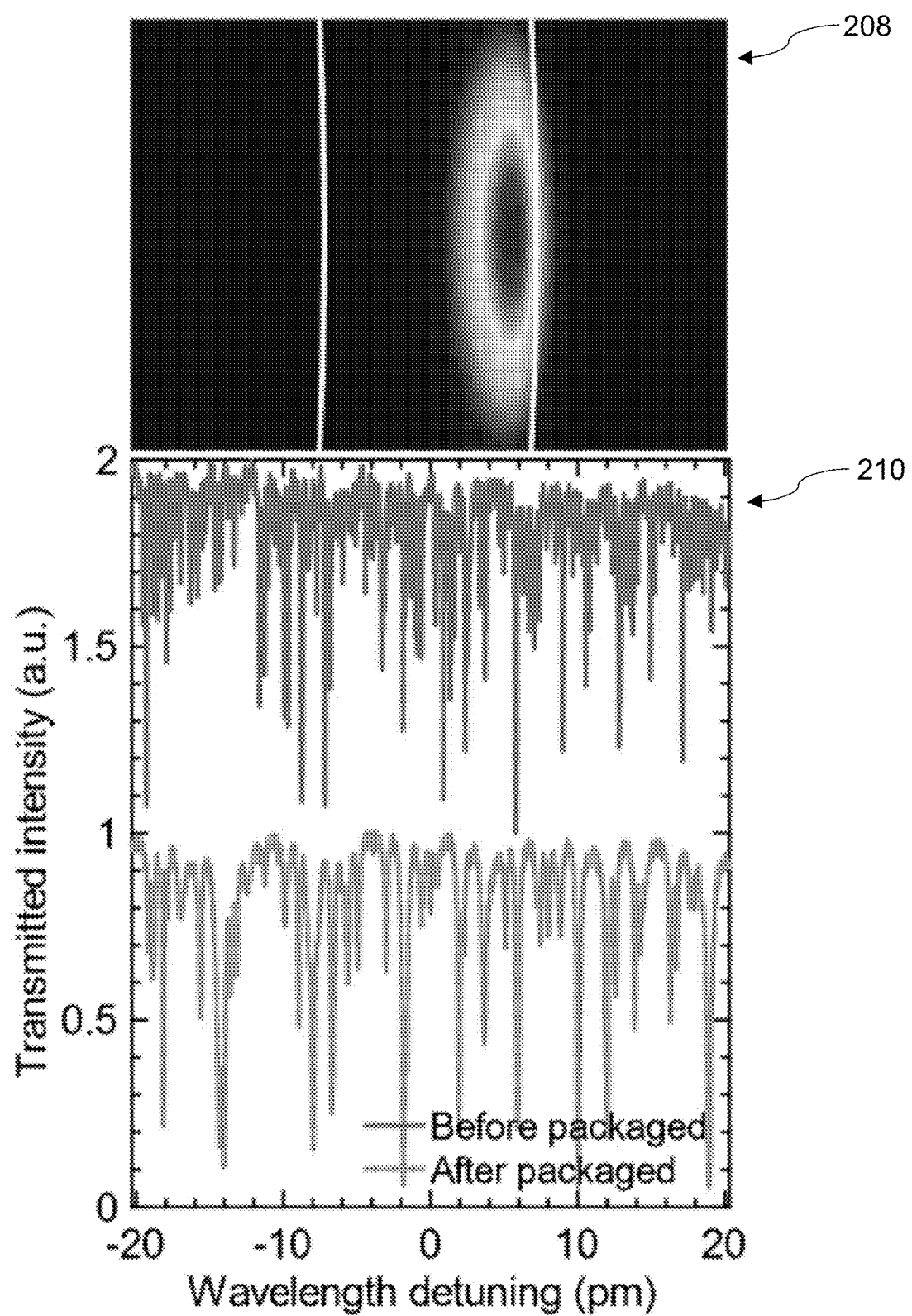
FIG. 2C illustrates simulations of optical confinement and WGM spectra before and after packaging with a third wall thickness.

FIGS. 2A-2C illustrate simulations (e.g., Comsol simulations) of optical confinement and WGM spectra before and after packaging. Top FIGS. 200, 204, 208 of FIGS. 2A, 2B, 2C, respectively, show images of radial distributions of the electric field of the fundamental mode in an MBR (e.g., MBR 102) with a wall (e.g., silica wall) thickness of (a) 1.6 pm (FIG. 2A), (b) 3.9 pm (FIG. 2B), and (c) 6.3 pm (FIG. 2C). FIG. 2A shows the distribution from left-to-right relative to air, silica wall, and PDMS (the "Air," Silica Wall," and "PDMS" labels shown in FIG. 2A also apply to the corresponding portions in FIGS. 2B and 2C). The radius of the MBR is kept at 150 μm. The refractive indices of silica, air, and PDMS are 1.4537, 1.000, and 1.4074, respectively. Bottom FIGS. 202, 206, 210 of FIGS. 2A, 2B, 2C, respectively, are plots showing WGM spectra before and after packaging for MBRs with a wall thickness of (a) 1.6 pm, (b) 3.9 pm, and (c) 6.3 pm before and after being packaged with PDMS. In each of bottom FIGS. 202, 206, 210 of FIGS. 2A, 2B, 2C, respectively, the vertical axis represents transmitted intensity (a.u.) and the horizontal axis represents wavelength detuning (pm).

Figure 3A:
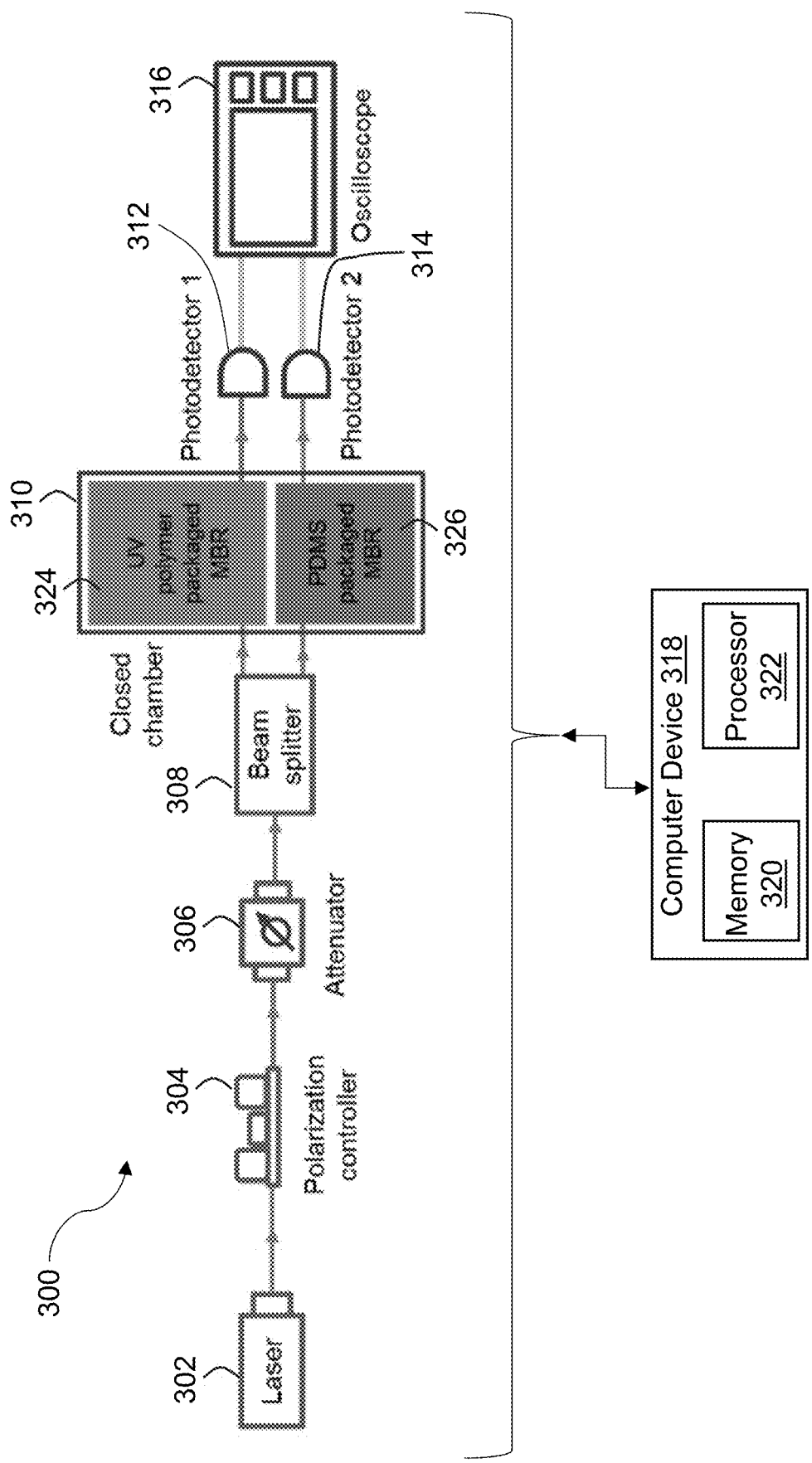
FIG. 3A illustrates a schematic of an example testing setup according to one embodiment of the disclosure.

FIG. 3A illustrates a schematic of an example testing setup 300, for example for performing stability comparison between a PDMS packaged device and a UV curable polymer packaged device. Setup 300 may be configured to perform long-term stability test of PDMS packaged WGM device (e.g., 100), and includes a plurality of components including a laser 302, a polarization controller 304, an attenuator 306, a beam splitter 308, a closed chamber 310, a first photodetector 312, a second photodetector 314, and an oscilloscope 316. Each of components 302, 304, 306, 308, 310, 312, 314, and 316 may be operatively coupled to a computer device 318, where such coupling may include a wired (e.g., network cable, USB, etc.), wireless (e.g., wireless network), or other remote (e.g., cloud) connection between computer device 318 and components 302 to 316. Computer device 318 includes one or memory devices 320 and one or more processors 322, and may be configured to provide user control of setup 300, store data associated with setup 300, and provide other computing functions and/or computing resources in association with setup 300. For example, computer device 318 may control power and/or pulses/duration of a beam emitted from laser 302, a type of polarization applied by polarization controller 304, an amount of attenuation by attenuator 306, and other associated controls with other components of setup 300. Alternatively, computing device 318 may include a plurality of computing devices each with their own memory devices and processors, for example a dedicated computer for each of components 302 to 316 or a dedicated computer for various subsets of components 302 to 316. Additional aspects of computer device 318 are described in more detail herein. Closed chamber 310 is configured to house one or more devices to be tested, such as a first device 324 and a second device 326. For example, in FIG. 3A, first device 324 may include a UV polymer packaged MBR and second device 326 may include a PDMS packaged MBR.

Figures 3B, 3C, 3D:
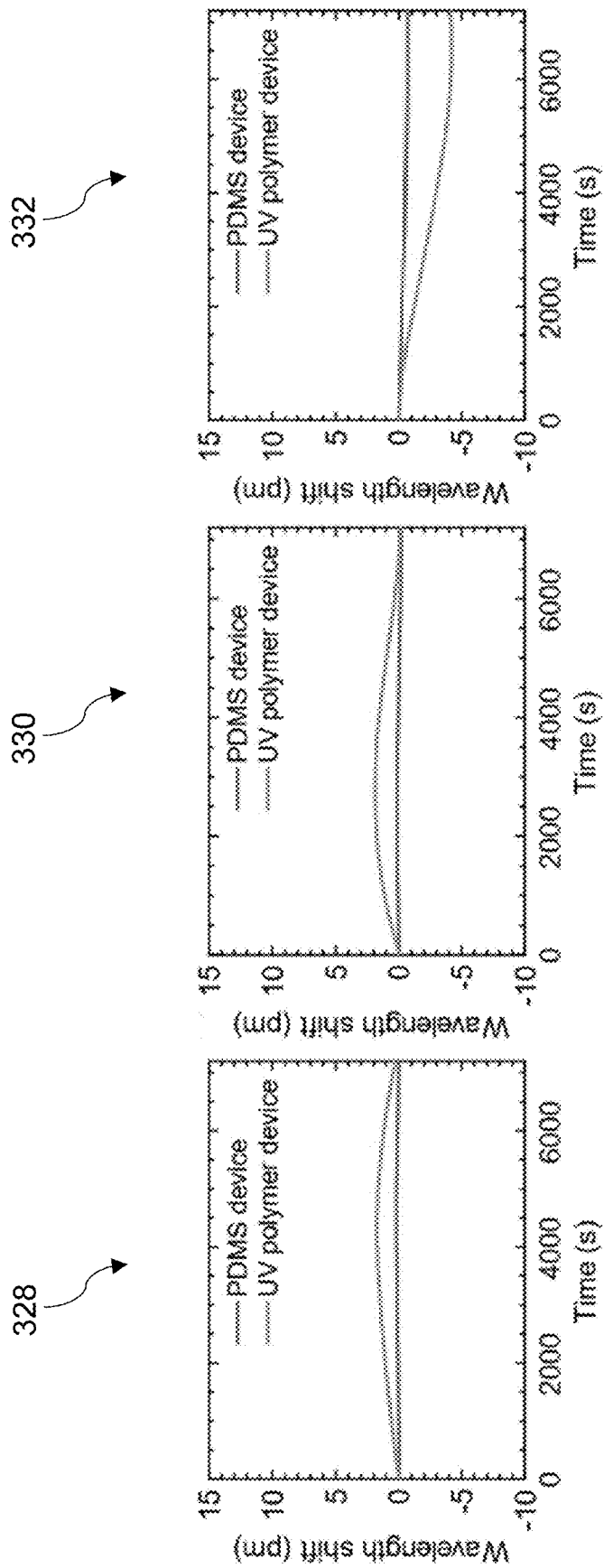
FIG. 3B illustrates time traces of resonant wavelengths of two packaged devices under a first laser power.
FIG. 3C illustrates time traces of resonant wavelengths of two packaged devices under a second laser power.
FIG. 3D illustrates time traces of resonant wavelengths of two packaged devices under a third laser power.
Figures 3E, 3F, 3G:
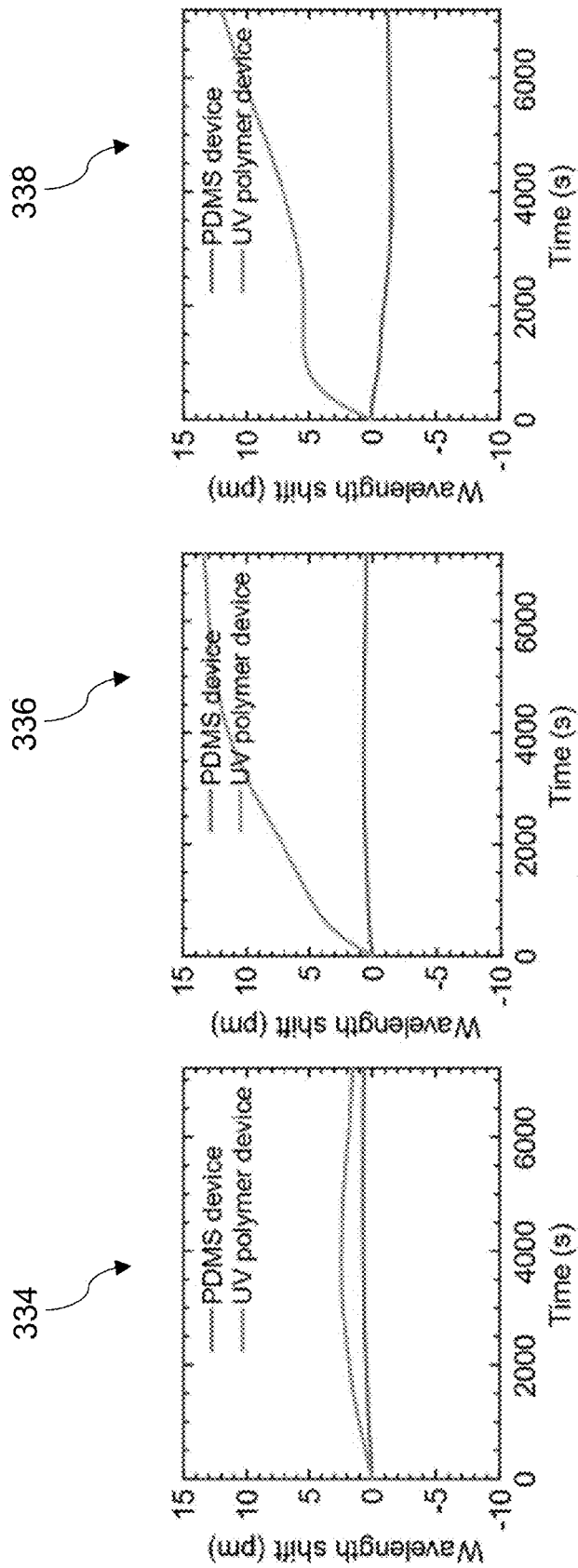
FIG. 3E illustrates time traces of resonant wavelengths of two packaged devices under a first relative ambient humidity (RH).
FIG. 3F illustrates time traces of resonant wavelengths of two packaged devices under a second relative ambient humidity (RH).
FIG. 3G illustrates time traces of resonant wavelengths of two packaged devices under a third relative ambient humidity (RH).

FIGS. 3B-3D are plots that illustrate time traces of resonant wavelengths of two packaged devices (e.g., first device 324 (e.g., UV polymer packaged MBR) and second device 326 (e.g., PDMS packaged MBR)) under various laser powers (e.g., of laser 302). Plot 328 in FIG. 3B illustrates results of a laser power of 56 μW. Plot 330 in FIG. 3C illustrates results of a laser power of 818 μW. Plot 332 in FIG. 3D illustrates results of a laser power of 1.5 mW. The temperature is around 18° C. and the humidity is around 50%. FIGS. 3E-3G illustrate time traces of resonant wavelengths of two packaged devices (e.g., first device 324 (e.g., UV polymer packaged MBR) and second device 326 (e.g., PDMS packaged MBR)) under various relative ambient humidity (RH). Plot 334 of FIG. 3E illustrates results of an RH of 50%. Plot 336 in FIG. 3F illustrates results of an RH of 55%. Plot 338 in FIG. 3G illustrates results of an RH of 62%. For each of FIGS. 3E-3F, the laser power (e.g., of laser 302) is fixed at 55 u W. In each of FIGS. 3B-3G, the vertical axis represents wavelength shift (pm) and the horizontal axis represents time(s).

Figure 4A:
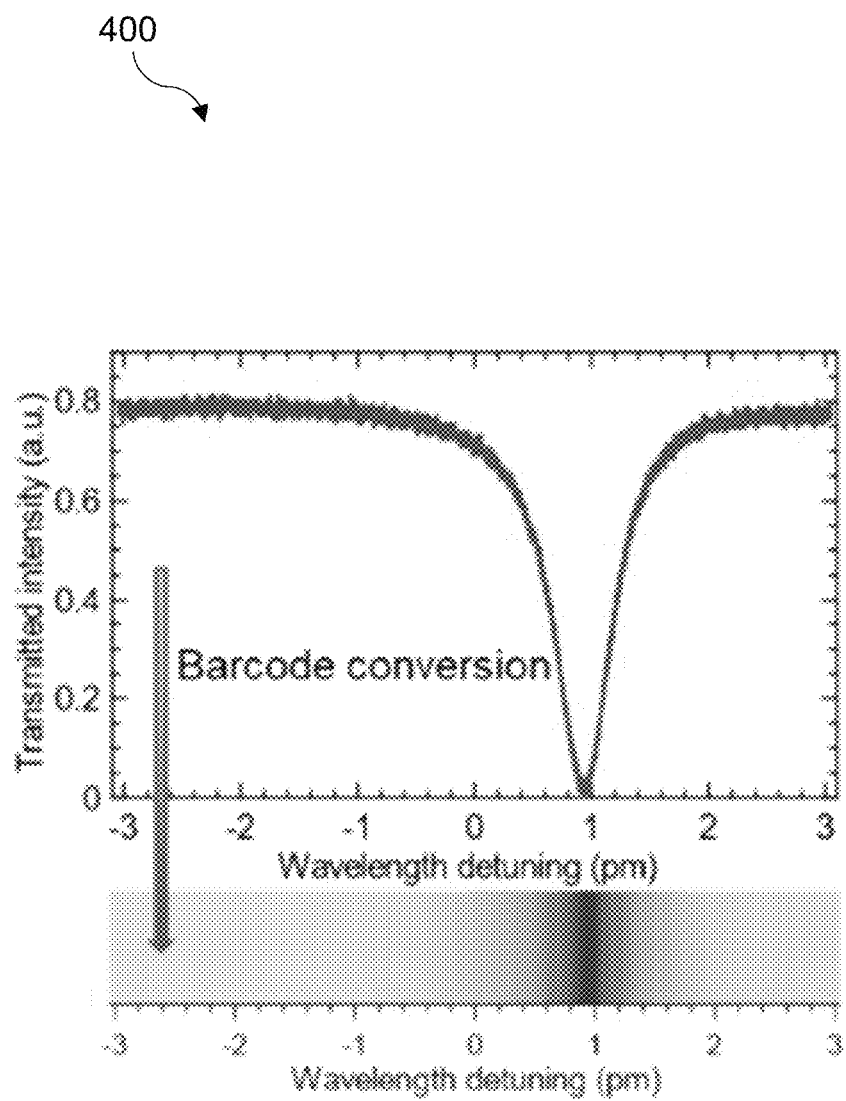
FIG. 4A illustrates optical barcode generation from WGM spectra in displacement sensing.
Figure 4B:
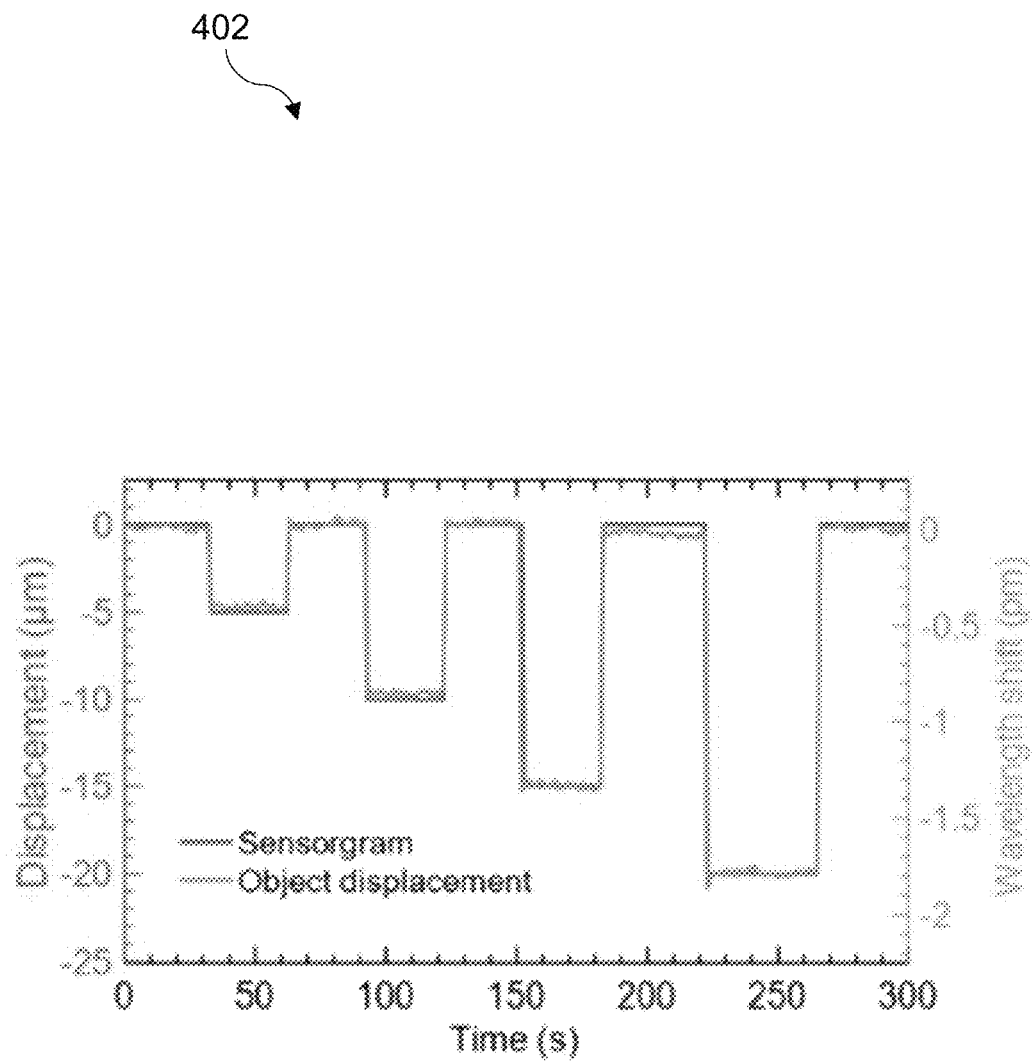
FIG. 4B illustrates WGM wavelength shift induced by a stepwise displacement for a sphere with a first radius.
Figure 4C:
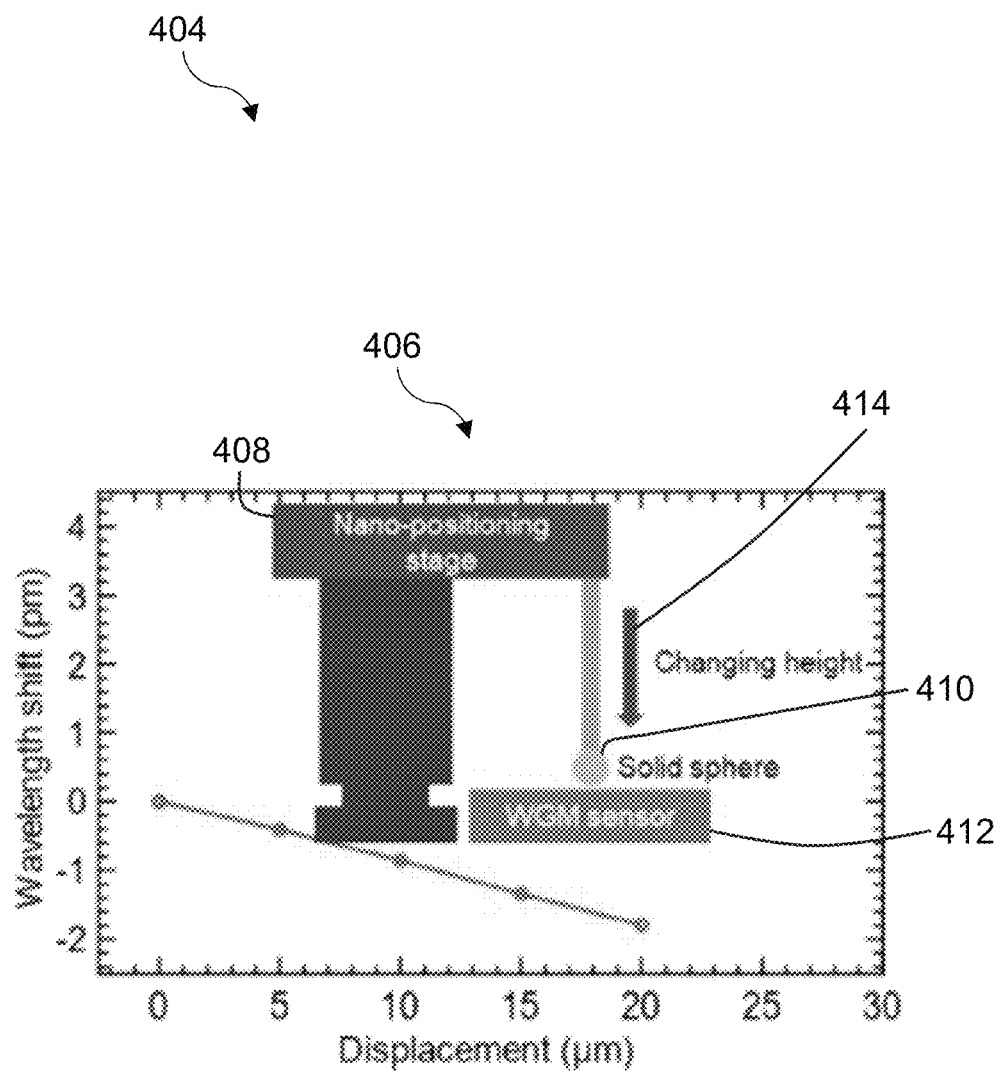
FIG. 4C illustrates wavelength shift dependence on displacement.
Figure 4D:
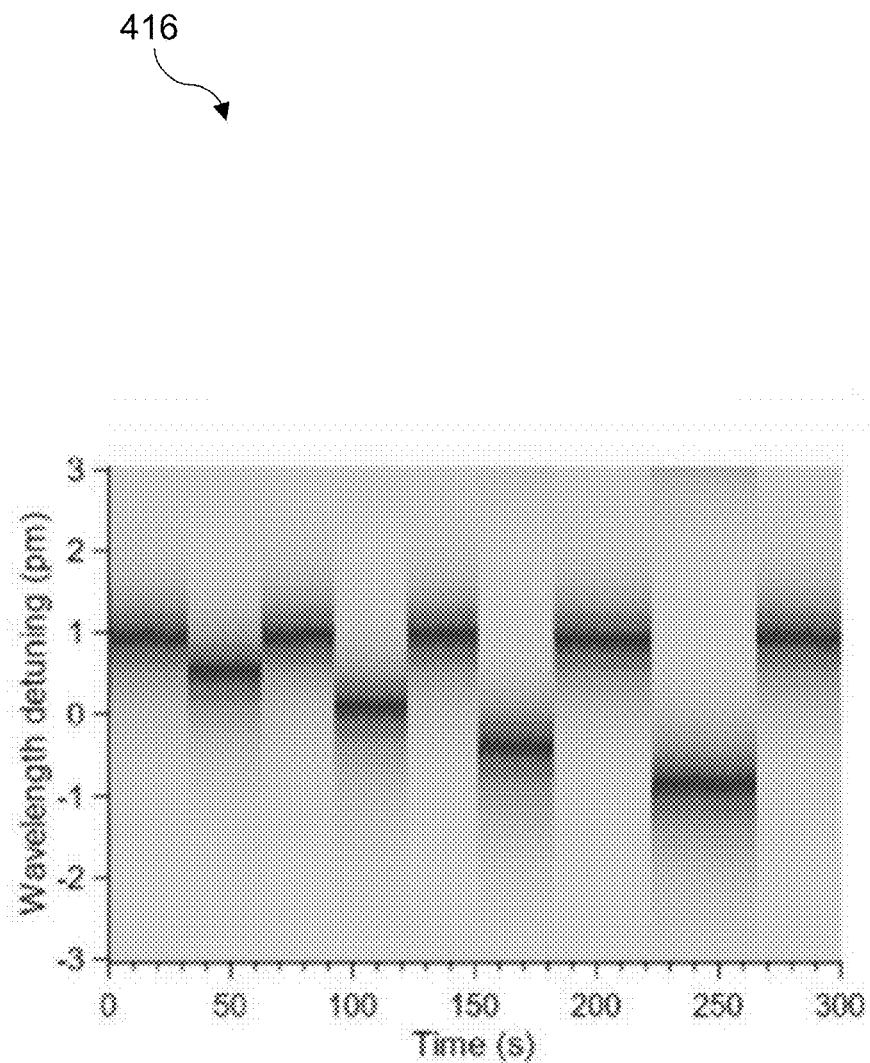
FIG. 4D illustrates a first example of resultant barcode dynamics of WGM barcodes generated from the spectrum recorded in a displacement test.
Figure 4E:
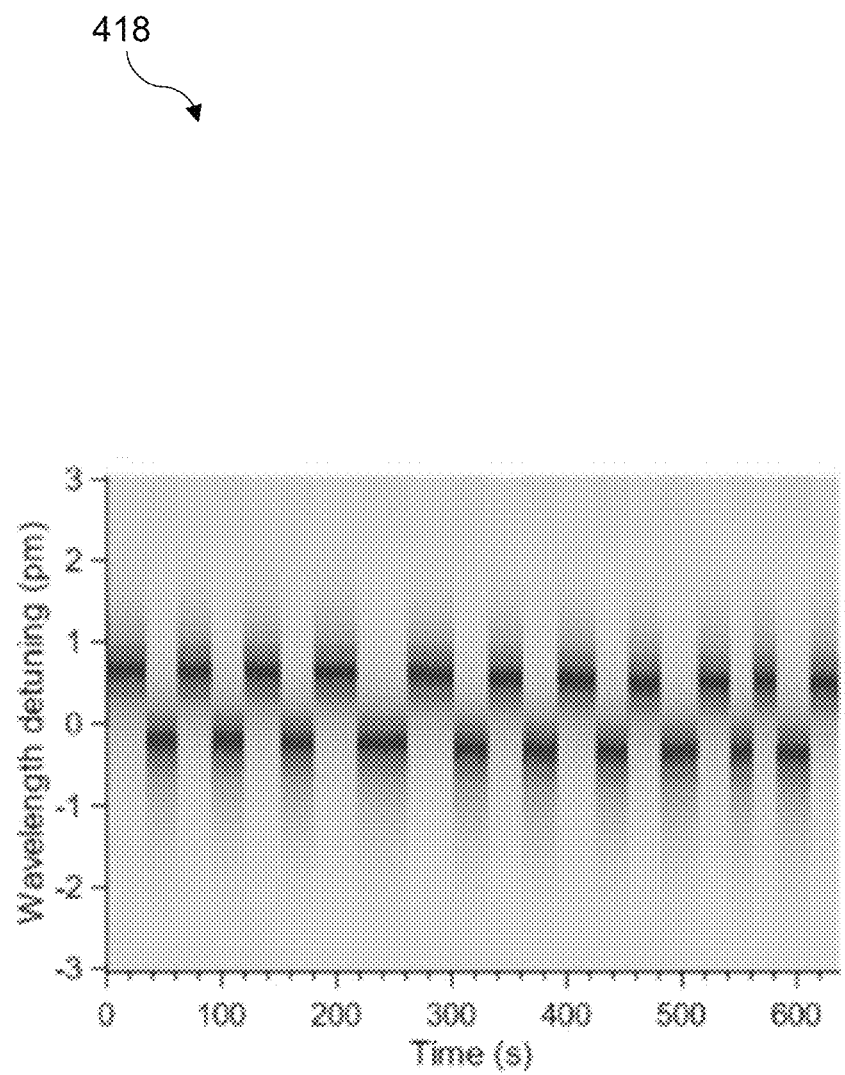
FIG. 4E illustrates a second example of resultant barcode dynamics of WGM barcodes generated from the spectrum recorded in a displacement test.
Figure 4F:
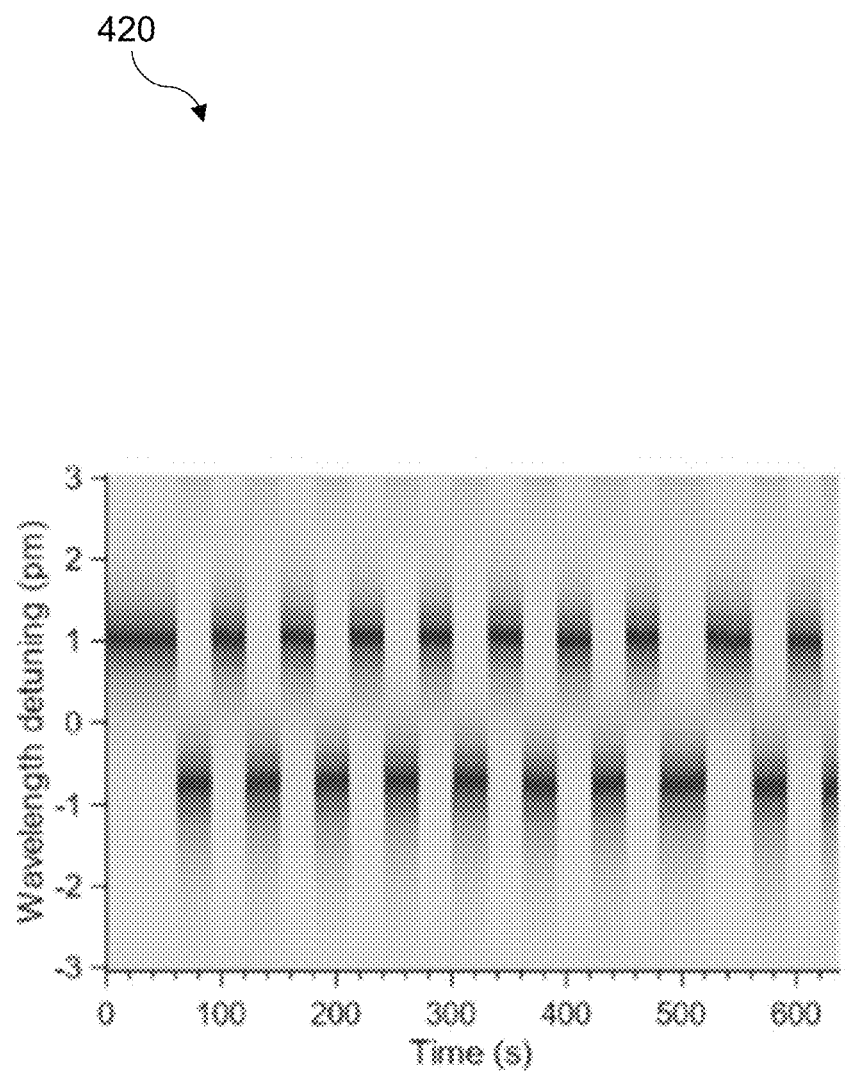
FIG. 4F illustrates a third example of resultant barcode dynamics of WGM barcodes generated from the spectrum recorded in a displacement test.

FIGS. 4A-4F illustrate aspects of using a PDMS packaged WGM sensor for displacement sensing. Wavelength shifts can be extracted from the WGM spectra using a barcode-based technique (e.g., as shown in FIGS. 4A, 4D-4F). Plot 400 in FIG. 4A plots transmitted intensity (a.u.) (vertical axis) against wavelength detuning (pm) (horizontal axis) and depicts such barcode-based techniques (e.g., barcode conversion), illustrating how an optical barcode can be generated from one of the WGM spectra in the measurement. Each WGM barcode includes one or multiple lines, and each line represents a mode from the spectrum. The width of each line indicates the linewidth of the mode, and the color reflects its coupling depth. Plot 402 in FIG. 4B illustrates WGM wavelength shift induced by a stepwise displacement for a sphere with a radius of 250 pm. The left vertical axis represents displacement (μm), the right vertical axis represents wavelength shift (pm), and the horizontal axis represents time(s). Plot 404 in FIG. 4C illustrates wavelength shift dependence on displacement (0 to 20 μm with 5 pm increment). The vertical axis represents wavelength shift (pm) and the horizontal axis represents displacement (μm). The red line is a linear fitting. The inset illustrates a setup 406 for the displacement sensing, including a nano-positioning stage 408, a solid sphere 410, a WGM sensor 412, and a changing height 414. FIGS. 4D-4F illustrate dynamics of the WGM barcodes generated from the spectrum recorded in the displacement test. FIG. 4D illustrates resultant barcode 416, representing 0 to 20 μm with 5 pm increment. FIG. 4E illustrates resultant barcode 418, representing multicycles between 0 and 10 pm. FIG. 4F illustrates resultant barcode 420, representing multicycles between 0 and 20 μm. The dynamics of WGM barcodes indicate how the spectrum evolves upon different applied displacements. In each of FIGS. 4D-4F, the vertical axis represents wavelength detuning (pm), and the horizontal axis represents time(s).

Figure 5A:
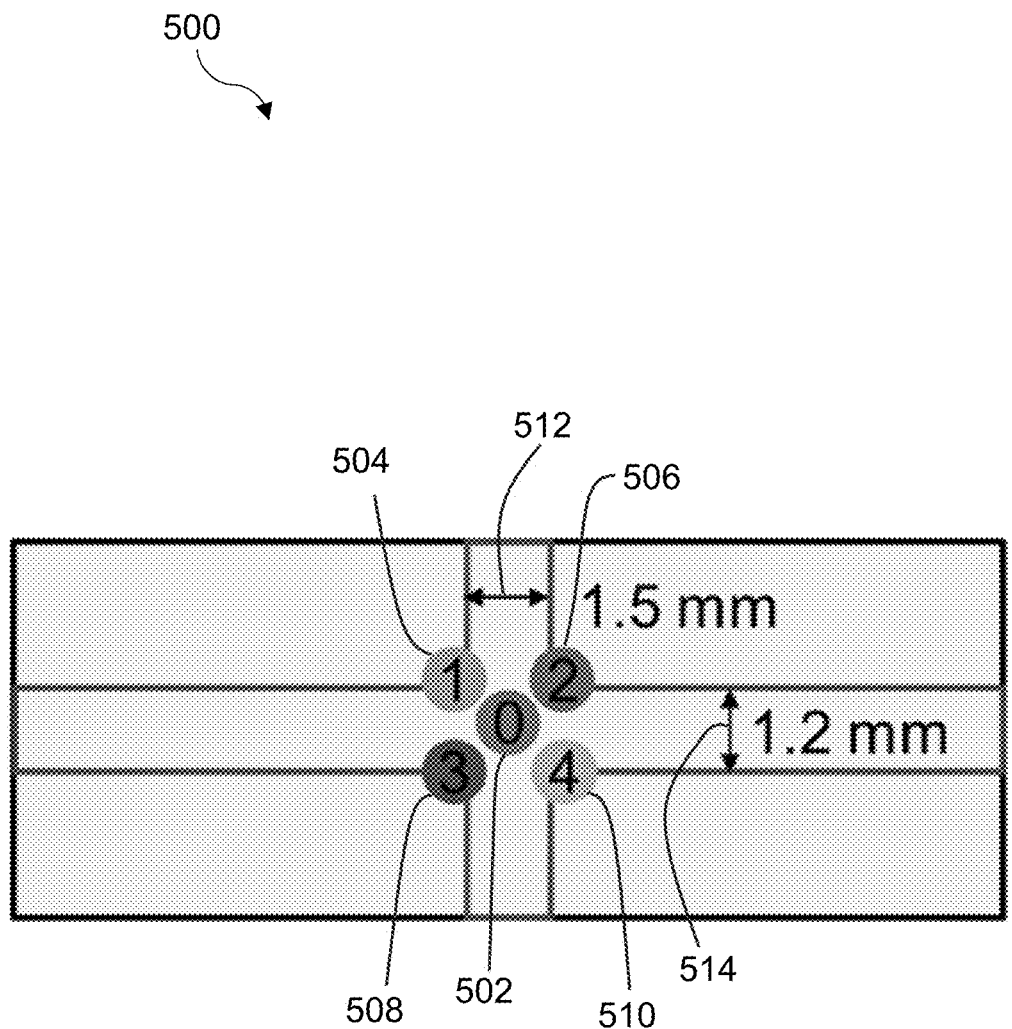
FIG. 5A is a schematic of positions for displacement sensing.
Figure 5B:
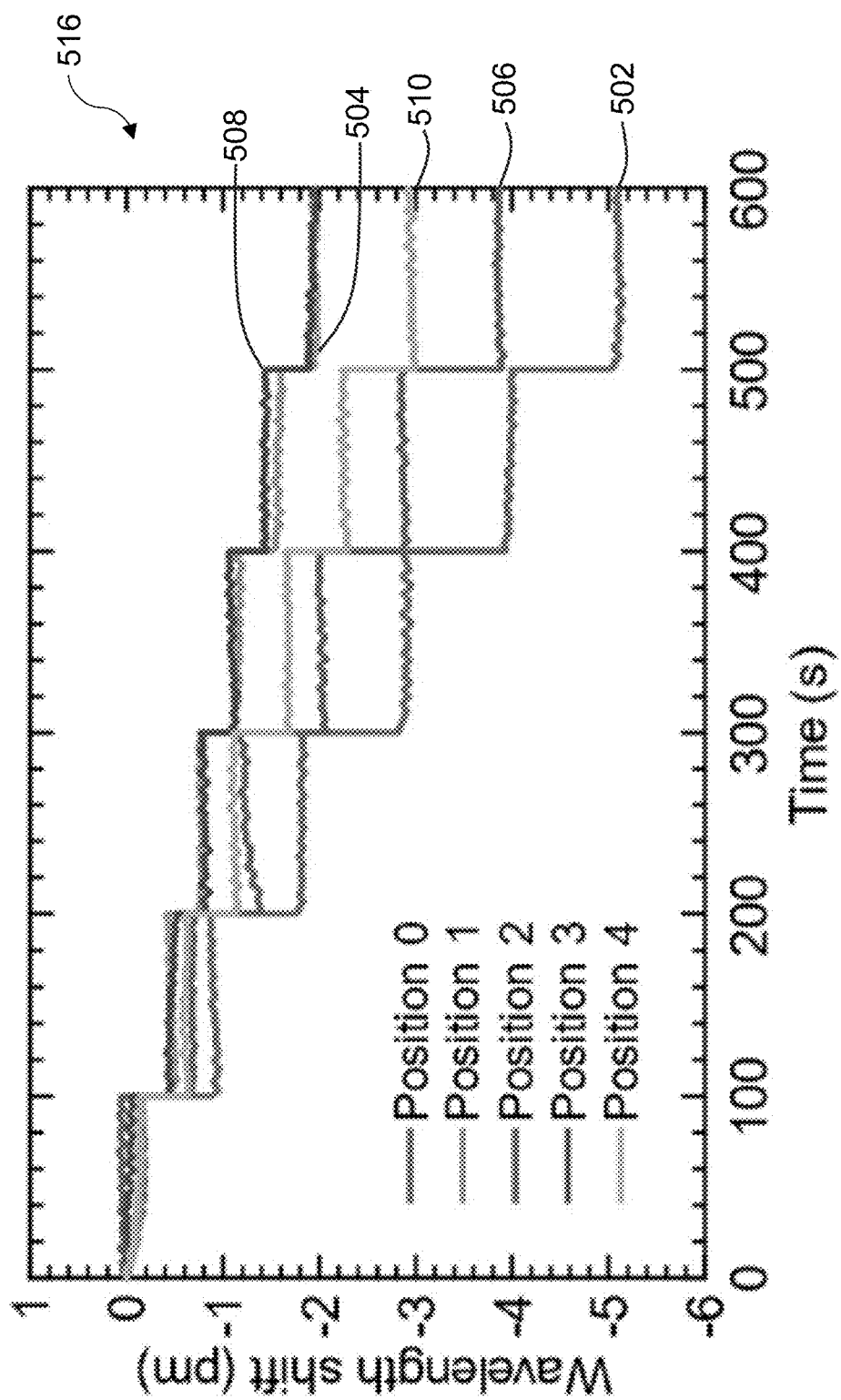
FIG. 5B illustrates displacement sensorgrams at various positions.
Figure 5C:
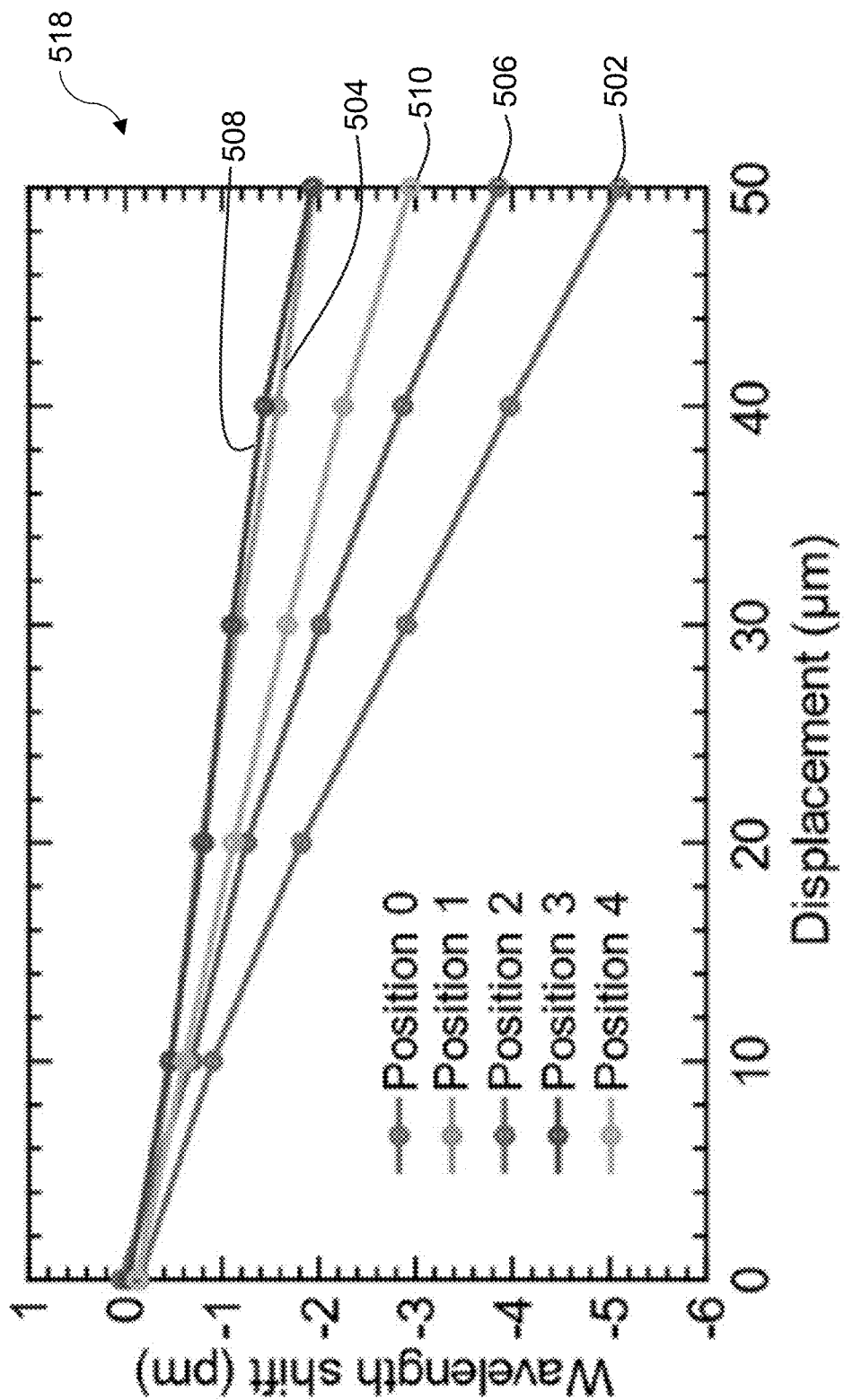
FIG. 5C illustrates WGM wavelength shift induced by displacement at various positions

FIGS. 5A-5C illustrate additional aspects of displacement sensing (e.g., at various positions). FIG. 5A is a schematic 500 of positions 502-510 for displacement sensing. Position 502 (e.g., position 0) is right above the MBR (not shown, e.g., MBR 102) while positions 504, 506, 508, 510 (e.g., positions 1, 2, 3, 4, respectively) are at the corners, millimeters away from position 502 (e.g., position 0). FIG. 5A also illustrates various size parameters, including a first size parameter 512 (e.g., a (e.g., longitudinal) distance), and second size parameter 514 (e.g., a (e.g., lateral) distance). For example, as shown in FIG. 5A, first size parameter 512 may be a longitudinal distance of 1.5 mm between positions 504, 506 (e.g., positions 1 and 2) and positions 508, 510 (e.g., positions 3, 4), and second size parameter 514 may be a lateral distance of 1.2 mm between positions 504, 508

(e.g., positions 1, 3) and positions 506, 510 (e.g., positions 2, 4). Plot 516 in FIG. 5B illustrates displacement (0 to 50 μm with 10 μm increment) sensorgrams at the various positions 502-510 (e.g., positions 0-4, respectively, where the vertical axis represents wavelength detuning (pm) and the horizontal axis represents time(s)). Plot 518 in FIG. 5C illustrates WGM wavelength shift induced by displacement at the various positions 502-510 (e.g., positions 0-4, respectively, where the vertical axis represents wavelength detuning (pm) and the horizontal axis represents displacement (μm)).

Figure 6:
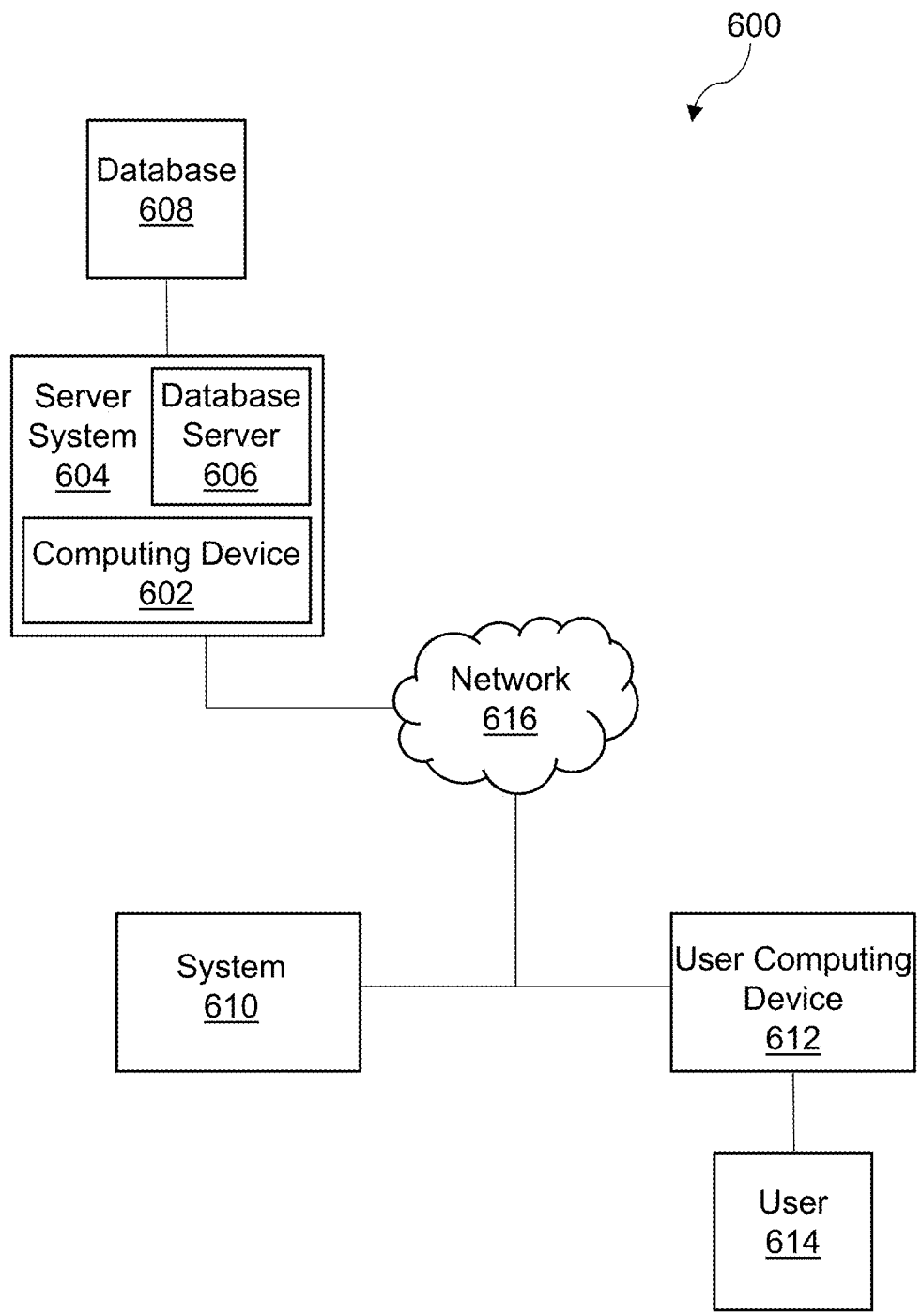
FIG. 6 is a block diagram schematically illustrating an example system in accordance with one embodiment of the disclosure.

FIG. 6 is a block diagram schematically illustrating a system in accordance with one aspect of the disclosure. FIG. 6 illustrates a simplified block diagram of a computing system 600 for implementing the methods described herein. As illustrated in FIG. 6, the computing system 600 may be configured to implement at least a portion of the tasks associated with disclosed method using the disclosed resonator-based sensors (e.g., for displacement sensing). Computer system 600 may include a computing device 602. In one aspect, the computing device 602 is part of a server system 604, which also includes a database server 606. Computing device 602 is in communication with a database 608 through database server 606. Computing device 602 is communicably coupled to system 610 (e.g., a displacement sensing system) and a user computing device 612 of a user 614 through a network 616. Network 616 may be any network that allows local area or wide area communication between the devices. For example, network 616 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. User computing device 612 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In other aspects, computing device 602 is configured to perform a plurality of tasks associated with the operation of a resonator-based sensor and/or a system incorporating the resonator-based sensors including, but not limited to the displacement systems described herein.

Figure 7:
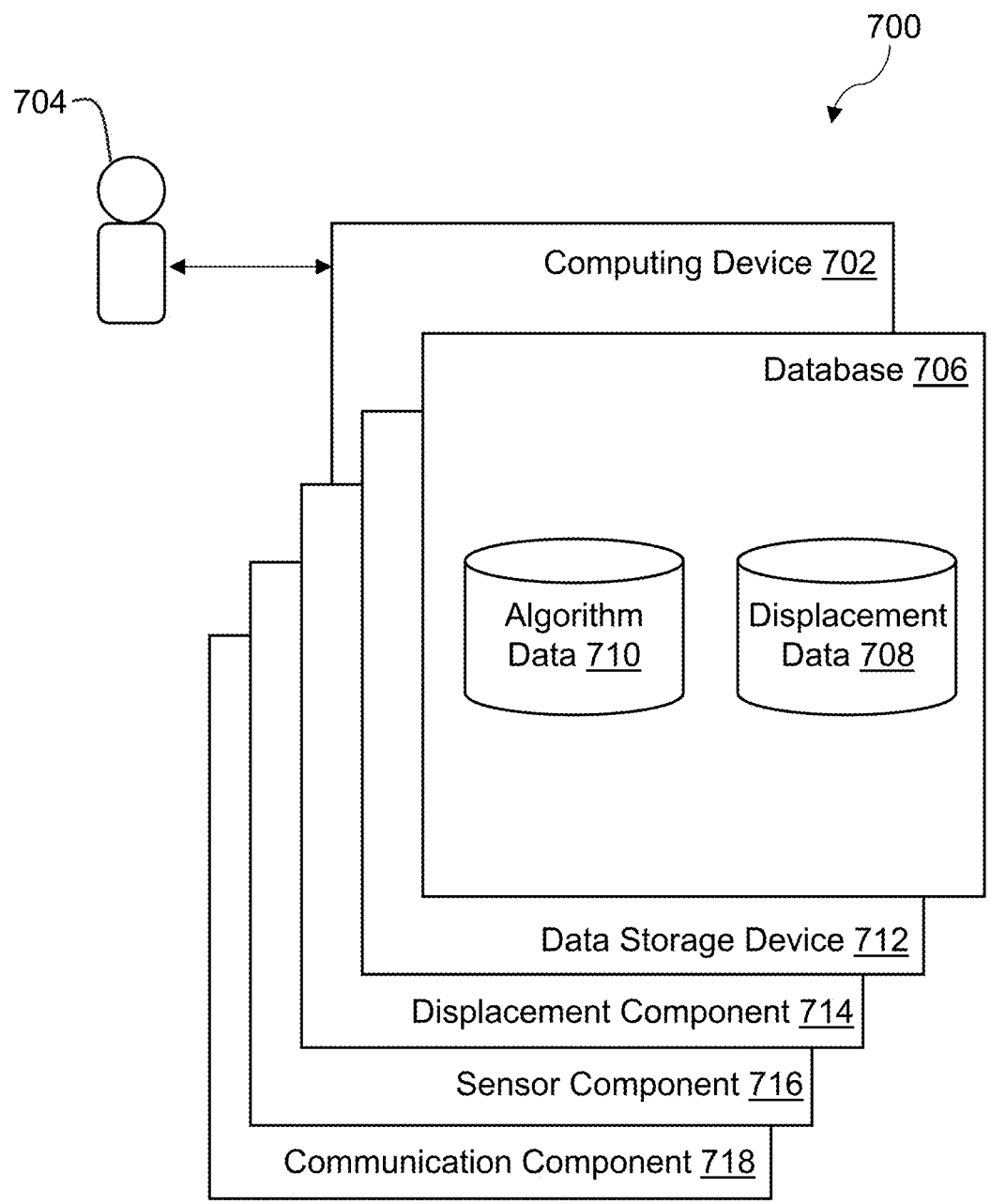
FIG. 7 illustrates an example component configuration of a computing device according to one embodiment of the disclosure.

FIG. 7 depicts a component configuration 700 of a computing device 702 associated with a user 704. Device 702 includes database 706 along with other related computing components. In some aspects, computing device 702 is similar to computing device 602 (shown in FIG. 6). User 704 may access components of computing device 702. In some aspects, database 706 is similar to database 608 (shown in FIG. 6).

In one aspect, database 706 includes displacement data 708 and algorithm data 710. Non-limiting examples of suitable displacement data 708 may include perturbations and position and amplitude of displacements. Non-limiting examples of suitable algorithm data 710 include any values of parameters defining the operation of the WGM resonator-based sensors, and displacement sensing systems. Additional non-limiting examples of suitable algorithm data 710 includes any algorithms and any values of parameters defining the algorithms associated with the disclosed method as described herein and or any displacement algorithms used to reconstruct or predict displacement as described herein.

Computing device 702 also includes a number of components that perform specific tasks. In the example aspect, computing device 702 includes data storage device 712, displacement component 714, sensor component 716, and communication component 718. Data storage device 712 is configured to store data received or generated by computing device 702, such as any of the data stored in database 706 or any outputs of processes implemented by any component of computing device 702.

Communication component 718 is configured to enable communications between computing device 702 and other devices (e.g., user computing device 612 and system 610, shown in FIG. 6) over a network, such as network 616 (shown in FIG. 6), or a plurality of network connections using predefined network protocols such as TCP/IP (Transmission Control Protocol/Internet Protocol).

Figure 8:
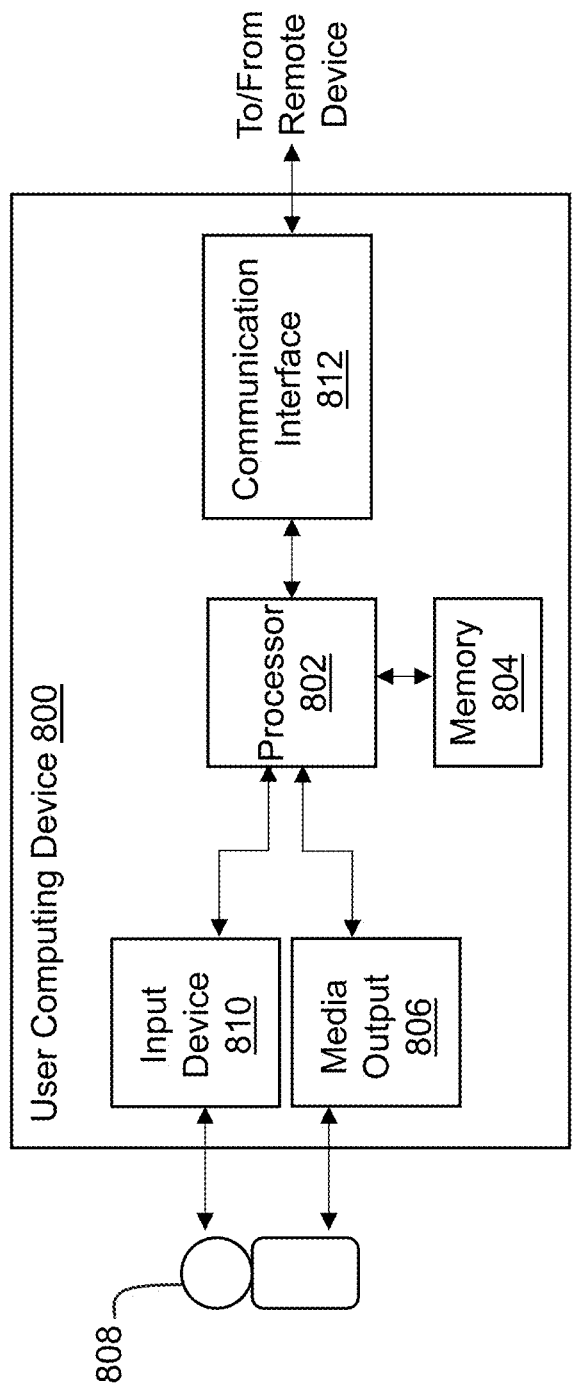
FIG. 8 illustrates an example configuration of a remote or user computing device according to one embodiment of the disclosure.

FIG. 8 depicts a configuration of a remote or user computing device 800, such as user computing device 612 (shown in FIG. 8). Computing device 800 may include a processor 802 for executing computer-readable/-executable instructions. In some aspects, executable instructions may be stored in a memory area of memory 804. Processor 802 may include one or more processing units (e.g., in a multi-core configuration). Memory 804 may be any device allowing information such as executable instructions and/or other data to be stored and retrieved. Memory 804 may include one or more computer-readable media (e.g., hard drive, RAM, ROM, and the like).

Computing device 800 may also include at least one media output component 806 for presenting information to a user 808. Media output component 806 may be any component capable of conveying information to a user 808. In some aspects, media output component 806 may include an output adapter, such as a video adapter and/or an audio adapter. An output adapter may be operatively coupled to processor 802 and operatively coupled to an output device such as a display device (e.g., a liquid crystal display (LCD), organic light emitting diode (OLED) display, cathode ray tube (CRT), or "electronic ink" display) or an audio output device (e.g., a speaker or headphones). In some aspects, media output component 806 may be configured to present an interactive user interface (e.g., a web browser or client application) to user 808.

In some aspects, computing device 800 may include an input device 810 for receiving input from user 808. Input device 810 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 806 and input device 810.

Computing device 800 may also include a communication interface 812, which may be communicatively coupled to a remote device. Communication interface 812 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory 804 are, for example, computer-readable/-executable instructions for providing a user interface to user 808 via media output component 806 and, optionally, receiving and processing input from input device 810. A user interface may include, among other possibilities, a web browser and client application. Web browsers enable users 808 to display and interact with media and other information typically embedded on a web page or a website from a web server. A client application allows users 808 to interact with a server application associated with, for example, a vendor or business.

Figure 9:
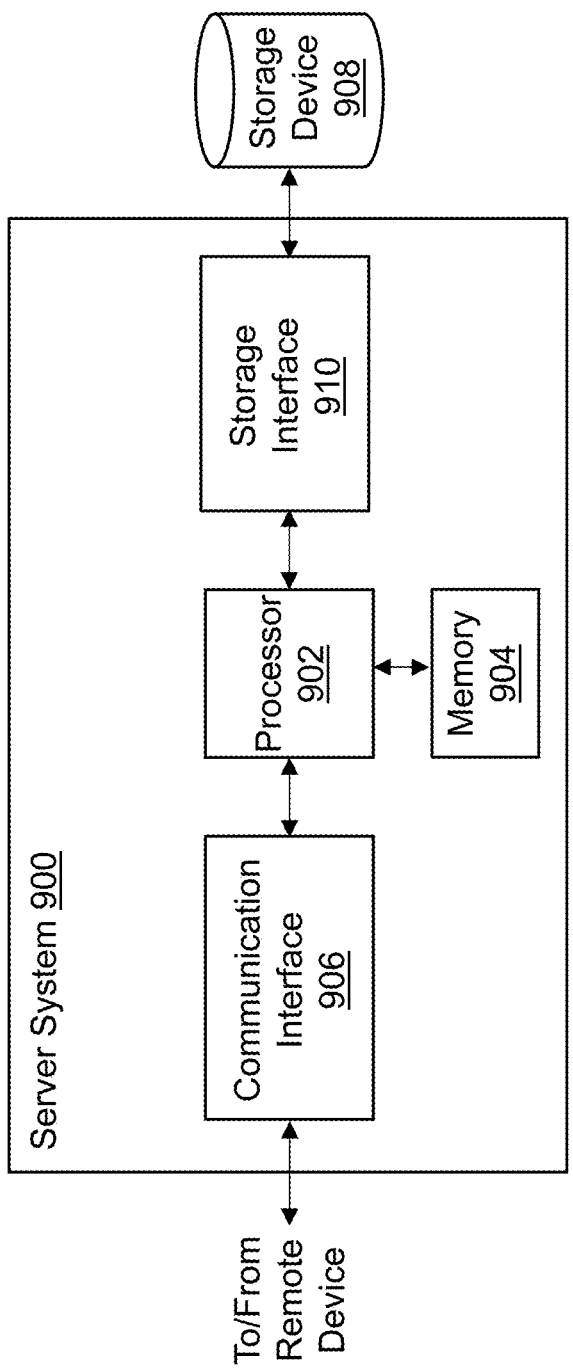
FIG. 9 illustrates an example configuration of a server system according to one embodiment of the disclosure.

FIG. 9 illustrates an example configuration of a server system 900. Server system 900 may include, but is not limited to, database server 606 and computing device 602 (both shown in FIG. 6). In some aspects, server system 900 is similar to server system 604 (shown in FIG. 6). Server system 900 may include a processor 902 for executing instructions. Instructions may be stored in a memory area of memory 904, for example. Processor 902 may include one or more processing units (e.g., in a multi-core configuration).

Processor 902 may be operatively coupled to a communication interface 906 such that server system 900 may be capable of communicating with a remote device such as user computing device 612 (shown in FIG. 6) or another server system 900. For example, communication interface 906 may receive requests from user computing device 612 via a network 616 (shown in FIG. 6).

Processor 902 may also be operatively coupled to a storage device 908. Storage device 908 may be any computer-operated hardware suitable for storing and/or retrieving data. In some aspects, storage device 908 may be integrated in server system 900. For example, server system 900 may include one or more hard disk drives as storage device 908. In other aspects, storage device 908 may be external to server system 900 and may be accessed by a plurality of server systems 900. For example, storage device 908 may include multiple storage units such as hard disks or solid state disks in a redundant array of inexpensive disks (RAID) configuration. Storage device 908 may include a storage area network (SAN) and/or a network attached storage (NAS) system.

In some aspects, processor 902 may be operatively coupled to storage device 908 via a storage interface 910. Storage interface 910 may be any component capable of providing processor 902 with access to storage device 908. Storage interface 910 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 902 with access to storage device 908.

Memory 804 (shown in FIG. 8) and 904 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 10:
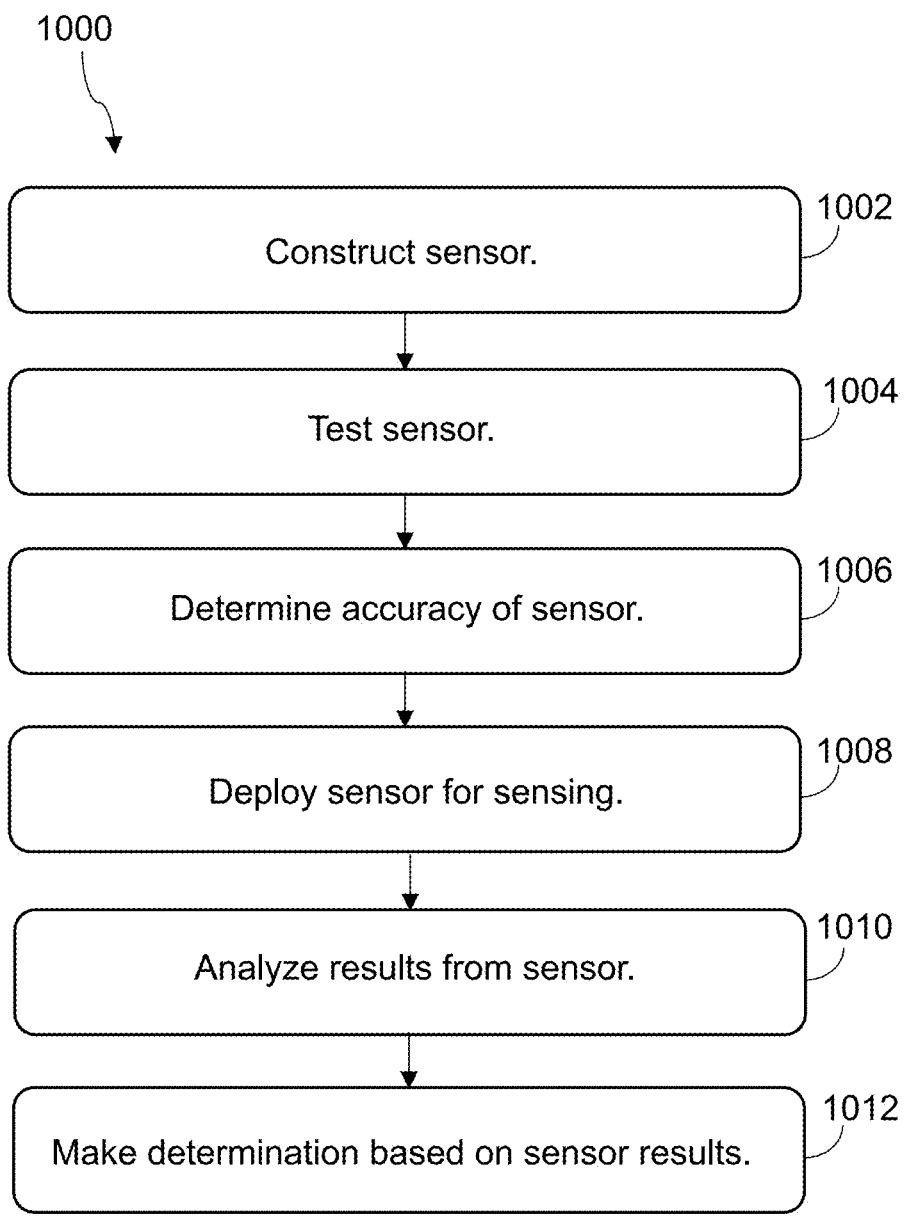
FIG. 10 is a flow diagram of an example method according to one embodiment of the disclosure.
Figure 11A:
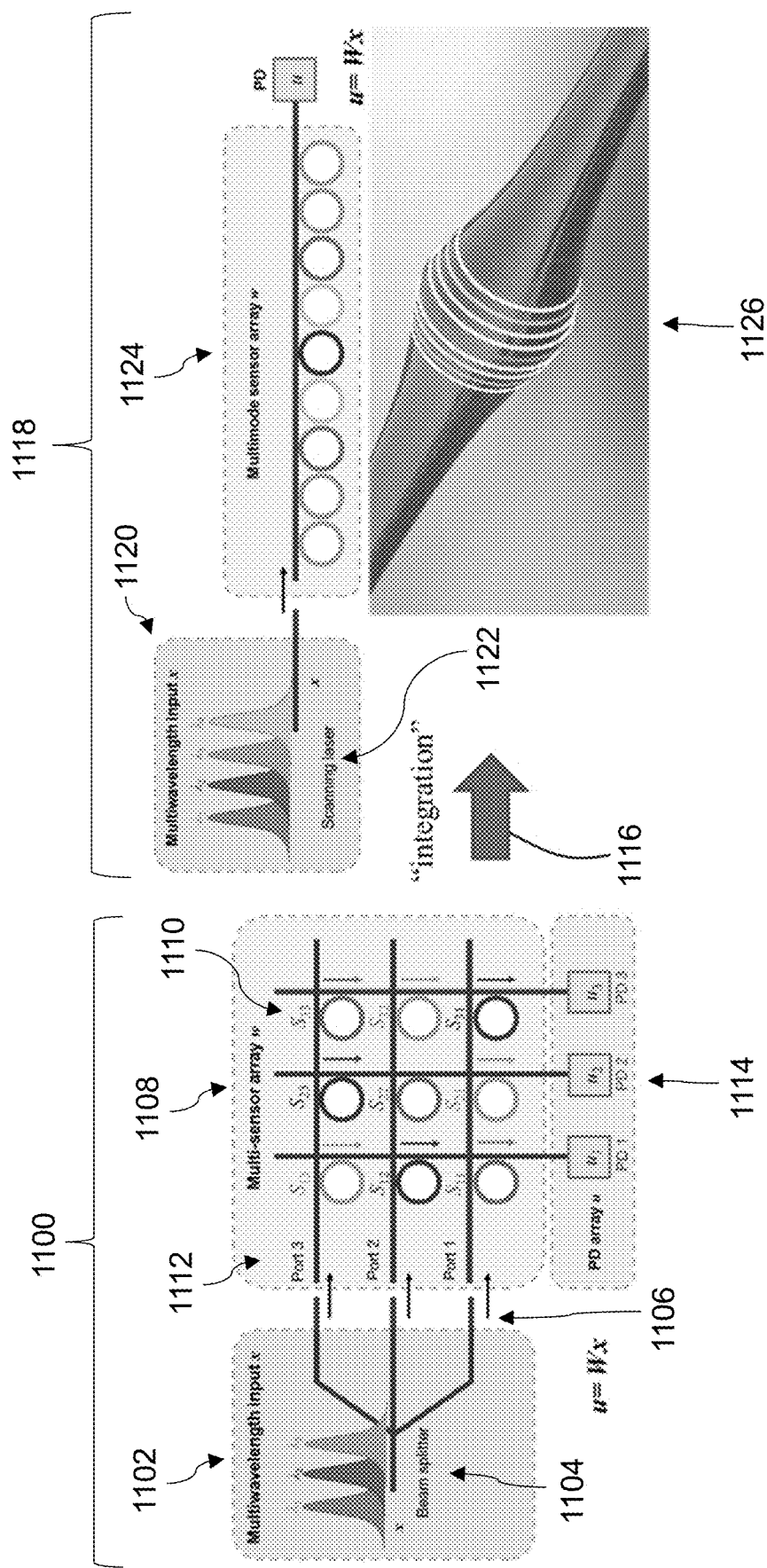
FIG. 11A is a schematic illustrating aspects of a multimode sensor as an effective integration of sensor array according to one embodiment of the disclosure.

FIG. 10 is a flow diagram of an example method 1000 according to one embodiment of the disclosure. Step 1002 includes constructing a sensor, including construction as disclosed herein (e.g., as shown in FIGS. 1A, 1B, 11A). Step 1002 includes physical construction of the sensor as well as any training via AI-models as disclosed herein. Step 1004 includes testing the sensor, including testing as disclosed herein (e.g., as shown in FIGS. 3A, 4C, 5A, 11B, 12B, 20A-20C). Step 1006 included determining an accuracy of the sensor, for example for use in displacement detection as described herein. Step 1008 includes deployed a sensor deemed suitable in a displacement setting as described herein. Step 1010 includes analyzing results from the deployed sensor, such as displacement measurements as described herein. Step 1012 includes making determinations based on the sensor results, as described herein (e.g., determinations for perturbations, etc., across any applicable industry or technology utilizing the sensor).

I. Theoretical Analysis and Numerical Simulations

The structure of an MBR encapsulated in a packaging material is shown in FIG. 1A, and includes, for example, a silica MBR 102, a tapered fiber 104, a substrate 108, and packaging material 106 surrounding MBR 102. The radial field distributions in such a structure can be described by the Helmholtz equation, which is in analogy with the time-independent Schrödinger equation. The electromagnetic energy of a WGM is trapped within the wall of an MBR in a dielectric potential well. The effective radial potentials of the fundamental mode of the MBR and the corresponding modal distributions when the MBR is unpackaged, packaged with low index UV polymer, and packaged with PDMS are simulated. Although the index contrast is low for PDMS, a shallow potential well can still be formed in the air-silica-PDMS structure, which implies that resonance states still exist. By comparing the radial field distributions in FIGS. 1C-1E, it is possible to find that the increased refractive index of packaging material leads to a lower barrier outside the resonator, resulting in a larger portion of the WGM tunneling into the packaging material. Consequently, the optical property of WGMs depends more on the property of the packaging material.

One important optical property is optical absorption. To measure the absorptions of packaging materials (e.g., 106), solutions of low index UV curable polymer (e.g., MY Polymers, MY133) and PDMS (e.g., SYLGARD) are filled within square cuvettes of 10 mm in length. The absorption spectra are measured by a UV-visible spectrophotometer (e.g., Varian Cary 50 Bio). Before the absorption measurement, an empty square cuvette is measured as a reference sample. Each sample is measured for four facets and the absorption spectra are obtained from the average of the four measurements. When the solutions are cured, their absorption spectra are measured again using the same procedure. Due to the low optical absorption of PDMS, as shown in FIG. 1F, the overall optical loss of WGMs remains low, making it possible to achieve a high Q-factor after being packaged.

In addition to refractive index and optical absorption, the radial field distributions also depend on the geometrical features of MBRs, such as wall thickness and radius. A 2D simulation of WGMs of the PDMS packaged MBR (e.g., device 326) may be carried out by commercially available software (e.g., COMSOL Multiphysics (a commercial finite-element method software)). Device 326 (e.g., MBR 102 encapsulated in PDMS as packaging material 106) is considered as a rotationally axisymmetric dielectric structure. In the 780 nm wavelength band, the refractive indices of silica, low index UV curable polymer, and PDMS are 1.4537, 1.3240, and 1.4074, respectively. The radius (R) of the MBR (e.g., 102) is kept at 150 µm, and the wall thickness (t) is set as 1.6 µm, 3.9 µm, and 6.3 µm, respectively. The radial distributions of the electric field for various t are shown in FIGS. 2A-2C. When t is relatively large (3.9 µm 174 and 6.3 µm), the mode is mainly confined within the silica wall. As a result, the Q-factors remain high due to the strong optical confinement. As t decreases to 1.6 µm, the modal volume starts to shrink and penetrates more deeply into the packaging material. Consequently, the optical loss increases and the Q-factor drops dramatically. This increased optical loss results from the lower refractive index contrast and the additional loss experienced by the evanescent field penetrating the packaging material. While the optical loss is also affected by the radius R of the MBR (e.g., MBR 102), the radius of MBRs can be hundreds of microns; the limitation of radiation loss due to a small radius can be neglected. Therefore, in designing PDMS packaged MBR devices with high Q-factors, thicker walls are preferred.

To verify the simulation results, MBRs with various wall thicknesses were fabricated and their WGMs are tested. FIGS. 2A-2C show the transmission spectra of MBRs with a wall thickness of 1.6 µm, 3.9 µm, and 6.3 µm, respectively, before and after being packaged with PDMS. Before being packaged, high Q WGMs appear in the transmitted spectra of all the MBRs, regardless of their wall thickness. After applying the PDMS mixture solution surrounding the MBR, the transmitted spectra behave distinctively. For the 1.6 µm-wall MBR, WGMs disappear after applying PDMS solution. For the 3.9 µm-wall MBR, some of the WGMs survive, and the Q-factors drop from $\sim 1.5 \times 10^7$ to $\sim 6.6 \times 10^6$. For the 6.3 µm-wall MBR, more WGMs survive, with a negligible dropping of Q-factors from $\sim 1.8 \times 10^7$ to $\sim 1.0 \times 10^7$. The experimental results match well with the theoretical analysis that the thick-wall MBR exhibits high Q-factors after being surrounded by PDMS.

II. Device Performance

Device performance parameters regarding stability, humidity resistance, and displacement detection are outlined below.

A. Stability and Humidity Resistance

The stability of packaged WGM devices is important for practical applications since changes in the environment may introduce noise and drift to the system. In general, the long-term deviation is mainly due to the ambient temperature drift, changes in relative ambient humidity (RH), and instability of the laser power. To show the stability improvement of the PDMS packaged device (e.g., 326), a comparison between its stability with another WGM device (e.g., 324) packaged with UV curable polymer can be conducted. Both devices (e.g., 324, 326) are placed together within a closed chamber (e.g., 310) and exposed to the same environmental condition. The temperature and the humidity are roughly controlled by an air conditioner (not shown). The temperature is not controlled precisely since the focus is on exploring the performance of both devices (e.g., 324, 326) under temperature drift. FIG. 3A shows the schematic of the setup (e.g., 300). Two hygrometers (not shown) are placed on top of each of the devices (e.g., 324, 326) for temperature and humidity monitoring. Light from the laser source (e.g., 302) is divided by a 3 dB coupler (e.g., beam splitter 308) and coupled into the two packaged devices (e.g., 324, 326). The transmission spectra of both devices (e.g., 324, 326) are monitored simultaneously, for example via computer device 318. The collective wavelength shifts are extracted from the WGM spectra using a barcode-based technique.

The stability of the two devices (e.g., 324, 326) under different operating laser power (e.g., of laser 302) can be tested first. In the 780 nm band, the optical absorption of PDMS is lower than that of UV curable polymer. Therefore, the PDMS packaged device (e.g., device 326) absorbs less energy and becomes more stable when operating at a high laser power. The temperature is around 18° C., and the humidity is around 50%.

FIGS. 3B-3D show the collective wavelength shift of the devices (e.g., 324, 326) when the laser power is 56 µW, 818 µW, and 1.5 mW, respectively. In all the 3 cases, the long-term deviation of the PDMS packaged device (e.g., device 326) is smaller than the UV curable polymer packaged device (e.g., device 324). Even when the power is as high as 1.5 mW, the maximum drift of the PDMS device (e.g., 326) is 0.72 pm, more than five times smaller than the maximum drift (4.19 pm) of the UV curable polymer device (e.g., 324). With reference to FIGS. 3E-3G, to demonstrate the humidity resistance of the PDMS packaged device (e.g., 326), further tests on the stability of the two devices (e.g., 324, 326) under different RH conditions can be conducted. The laser power (e.g., of laser 302) is fixed at 55 µW. FIGS. 3E-3G show the collective shift of the devices (e.g., 324, 326) when the RH is 50%, 55%, and 62%, respectively. When the RH is high, the resonant wavelength of the UV curable polymer device (e.g., 324) shifts dramatically. Due to the hygroscopic nature of the UV curable polymer, moisture in the air penetrates to the resonator and results in changes in effective refractive index and coupling efficiency. In contrast, the PDMS device (e.g., 326) stays stable. Even if the RH reaches as high as 62%, the maximum drift of the PDMS device (e.g., 326) is 1.52 pm, more than eleven times smaller than that (17.83 pm) of the UV curable polymer device (e.g., 324). The hydrophobic layer on the surface can effectively prevent the penetration of water molecules and consequently provide better humidity resistance to the WGM device.

B. Displacement Detection

With the protection of the flexible PDMS layer, displacement can be applied to the surface of the packaged device without breaking the sensor. Here, the capability of the present PDMS-based sensor for small displacement detection is demonstrated. As shown in the inset of FIG. 4C, a solid sphere 410 (with radius ~250 µm) connected to a nano-positioning stage 408 is in contact with the WGM sensor 412. Since WGMs tunnel into the PDMS layer, their effective refractive index is affected by the changes in the PDMS. When the sphere 410 moves downward (displacement (e.g., 414) is applied), the PDMS film above the MBR will be compressed, and the effective optical path of WGMs changes, which consequently results in a resonance shift of WGMs. In this way, the displacement of the object can be determined from the WGM spectrum. The sphere 410 can first be placed right above the MBR (e.g., of 412). FIG. 4B shows the response of the WGM sensor (e.g., 412) to the stepwise displacement from 0 to 20 µm (5 µm increment for each step). The collective wavelength shift matches well with the displacement of the sphere. The wavelength shift response has a linear dependence on the displacement, as shown in FIG. 4C. The sensitivity is −0.1 pm/µm. The linewidth of the WGM is −0.593 pm. Suppose 1/10 of the linewidth is resolvable; the detection limit of displacement can reach as low as 600 nm. To test the reliability of the sensor, multiple cycles of displacement measurements are tested. WGM barcodes based on the recorded spectra for data visualization and wavelength shift extraction are generated. As shown in FIG. 4A, a barcode is generated from a WGM spectrum recorded in a time frame. It includes one or multiple lines, and each line represents a mode from the spectrum. The width of each line indicates the linewidth of the mode, and the color reflects its coupling depth. The dynamics of WGM barcodes indicate how the spectrum evolves upon different applied displacements. FIG. 4D shows the dynamics of WGM barcodes in response to the stepwise displacement. The resonance (blue line) blue shifts as the displacement decreases, and then it shifts back as the displacement recovers to 0. To demonstrate the repeatability, the displacement of the sphere is switched back and forth between 0-10 µm and 0-20 µm. As shown in FIGS. 4E, 4F, the WGM barcodes show good similarity when the same displacement is applied. The mean value of the collective wavelength shift for the multicycles displacements between 0 and 10 μm is 0.879 pm, with a standard deviation of 0.021 pm; the mean value of the collective wavelength shift for the multicycles displacements between 0 and 20 μm is 1.773 pm with a standard deviation of 0.025 pm.

The sensor (e.g., 412) disclosed herein exhibits good repeatability with a response time below 33 ms, which is shorter than the typical response time for piezo-resistive sensors, and the dynamic response to changes in displacement is measurable. The long-term drift (e.g., resonance shifts due to the humidity of the environment) would be ignorable in a small time scale.

Further advantage can be taken of the high flexibility of PDMS that helps distribute stress induced by displacement across a large volume. As a result of large deformation volume, MBR can also detect displacement applied at other positions away from it. With reference to FIG. 5A, besides the position right above the MBR (e.g., 502, position 0), the sensor response to the displacement at the four corners is also tested, as shown in FIG. 5A. The lateral distance (e.g., 514) between positions 504, 508 (e.g., positions 1, 3) and positions 506, 510 (e.g., positions 2, 4) is 1.2 mm while the longitudinal distance (e.g., 512) is 1.5 mm. The four corners are −0.96 mm away from the center (position 0). FIG. 5B shows the response of the sensor for stepwise displacement increasing from 0 to 50 μm (10 μm increment for each step) at various positions. As shown in FIG. 5C, the displacement sensitivity at position 502 (e.g., position 0) is higher than those (e.g., 504, 506, 508, 510) at the corners, which is expected since it is where the MBR locates. The sensitivities at position 504 (e.g., position 1) and position 508 (e.g., position 3) are similar since they are symmetric to position 502 (e.g., position 0, location of the MBR). However, the sensitivities are different between position 508 (e.g., position 3) and position 510 (e.g., position 4), which may result from the imperfection of the geometrical symmetry of the PDMS layer. For precise displacement sensing, the position of the applied displacement should remain constant, and it should be close to the MBR for an optimized sensitivity.

C. Conclusion

A WGM resonator-fiber coupling system (e.g., 100) packaged in PDMS (e.g., 106) for displacement sensing demonstrates high flexibility, great resistance to moisture penetration, and non-toxicity, rendering PDMS a suitable material for packaging WGM resonators as displacement sensors. Packaged devices with Q-factors as high as $10^7$ at the 780 nm band are obtained. The optimized device exhibits a high sensitivity of ~0.1 pm/μm with a detection limit as low as 600 nm and demonstrated long-term operational stability, all of which are crucial for potential applications in displacement sensing systems and medical diagnostics. Finally, the disclosed PDMS-based sensor is capable of measuring displacement at different locations near the resonator. Compared with all polymer WGM sensors, the disclosed hybrid structure offers both high quality factors of silica microbubble resonators and high displacement sensitivity enhanced by the PDMS layer. The disclosed packaged device (e.g., 326) is portable, free from contamination, and capable of field sensing applications. When empowered by artificial intelligence (AI), the disclosed sensor can not only to detect the displacement with high sensitivity, but also pinpoint the location of the displacement with high accuracy, useful in a variety of fields and technologies, including robotics, human-machine interface, tactile object recognition, and minimally invasive surgery. Additional AI aspects are disclosed below.

III. AI-empowered Hyper-information Barcodes for Multiparameter Sensing

A. Results-Multimode Sensing as an Effective Integration of Multiple Sensors

Figure 11B:
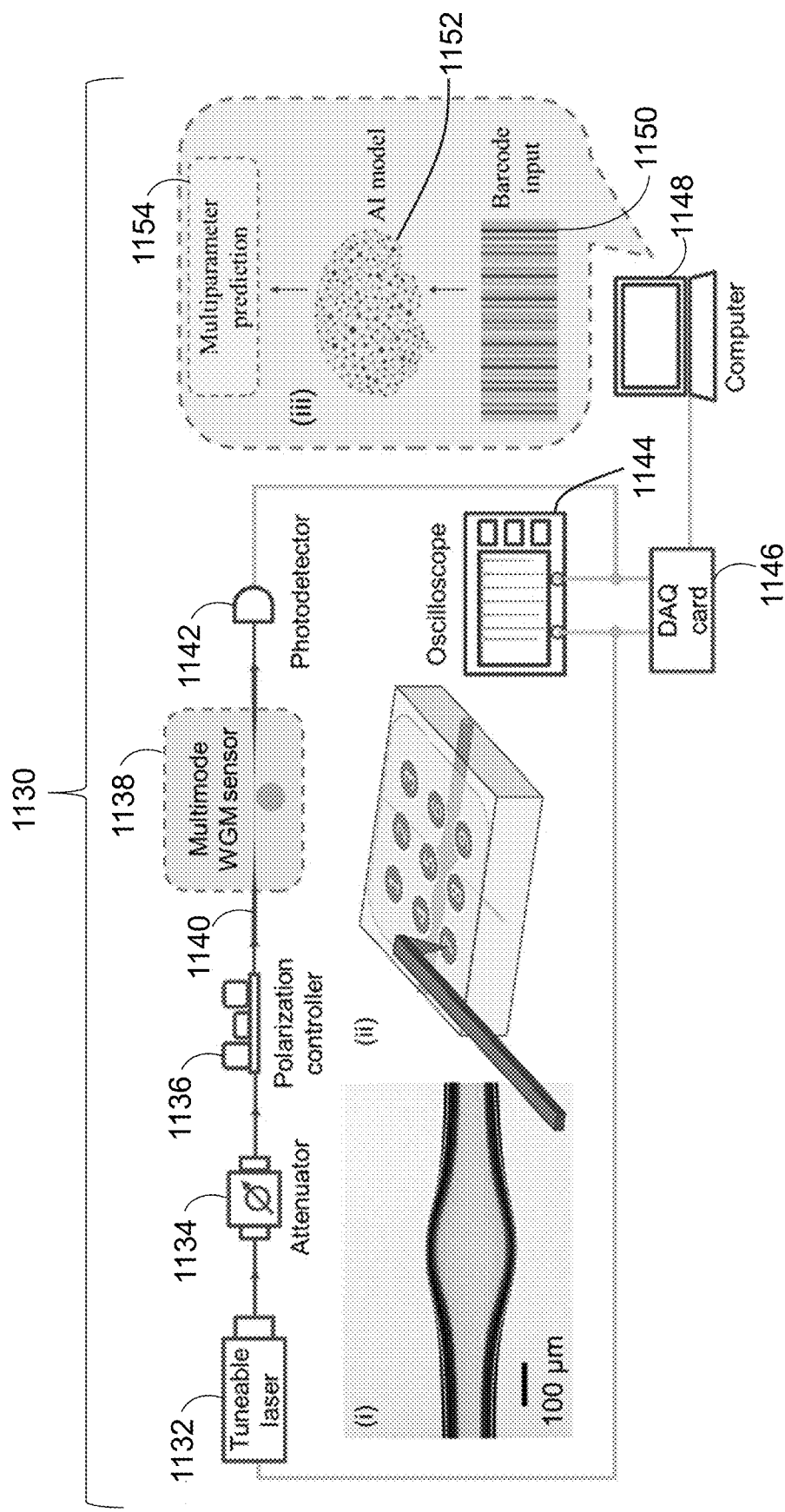
FIG. 11B illustrates an experiment setup and workflow of multiparameter sensing with hyper-information barcodes according to one embodiment of the disclosure.

In the case of multimode sensing, the WGM sensor supports multiple high Q resonances with various mode numbers within a fine-scanning wavelength range. Attributed to their distinct modal profiles, material and geometry dispersion, as well as wavelength-dependent light-matter interaction, each of them can potentially be used to detect a different aspect of the local environment. The working principle is similar to an array of individual sensors, where each sensor is designed to sense a specific local environment or a particular environmental variable. The spatial arrangement of the individual sensors can cause each sensor to have a different "sensing hotspot"—an area of maximum sensitivity where it can detect changes in the environment most effectively. This characteristic of sensor arrays can be leveraged for multiparameter sensing, where multiple variables are measured simultaneously. FIGS. 11A and 11B illustrate aspects of a multimode sensor as an effective integration of sensor array. FIG. 11A illustrates a schematic 1100 including a multiwavelength (e.g., $\lambda_1, \lambda_2, \lambda_3$) input x (1102) split by a beam splitter 1104 into a plurality of beams 1106 that are input into multi-sensor array w (1108) which includes multiple sensors, with individual signals 1110 (e.g., S11, S12, S13, S21, S22, S23, S31, S32, S33) read via control of input ports 1112 (e.g., Ports 1, 2, 3), and also including a photodetector array u (1114) including a selection of corresponding photodetectors (e.g., PD1, PD2, PD3). After integration 1116, schematic 1118 can be realized, providing for the use of a multimode sensor in a single sensing element, with multiple modes supported in the resonator exhibiting different spatial distributions and distinct sensing hotspots. Schematic 1118 illustrates a multiwavelength (e.g., $\lambda_1, \lambda_2, \lambda_3, \lambda_4$) input x (1120) generated by a scanning laser 1122, input 1120 being input into multimode sensor array w (1124) which is coupled with a photodetector u (1126) (see also the depiction of MBR 1128 which corresponds to the arrangement of multimode sensor array 1124).

FIG. 11B illustrates an experiment setup and workflow 1130 of multiparameter sensing with hyper-information barcodes. Setup and workflow 1130 includes components and other aspects similar to setup 300 (shown in FIG. 3A), and includes a laser 1132 (e.g., a tuneable laser), an attenuator 1134, a polarization controller 1136, a multimode WGM sensor 1138, a tapered fiber 1140, a photodetector 1142, an oscilloscope 1144, a DAQ card 1146, and a computer 1148. Computer 1148 performs a variety of tasks and other functions, including inputting an input (e.g., barcode) 1150 into an AI model 1152 to generate multiparameter predictions 1154. Computer 1148 (and computer device 318) may be configured as shown in FIG. 7 or 8 or as otherwise disclosed herein, for example. Portion (i) of FIG. 11B is an image of the packaged WGM sensor. Portion (ii) of FIG. 11B is a schematic illustration of perturbation introduction using a microtip. The microsensor is embedded in a micro-keyboard. Portion (iii) of FIG. 11B is a schematic illustration of the data analysis process (e.g., including inputting barcode 1150 into an AI model 1152 to generate multiparameter predictions 1154). During measurement, the WGM spectrum is measured when a perturbation is applied, and a hyper-information barcode capturing the comprehensive responses from various modes is subsequently generated. By analyzing its collective pattern via machine learning models, information about the location and amplitude of the perturbation can be directly extracted simultaneously.

Figure 12A:
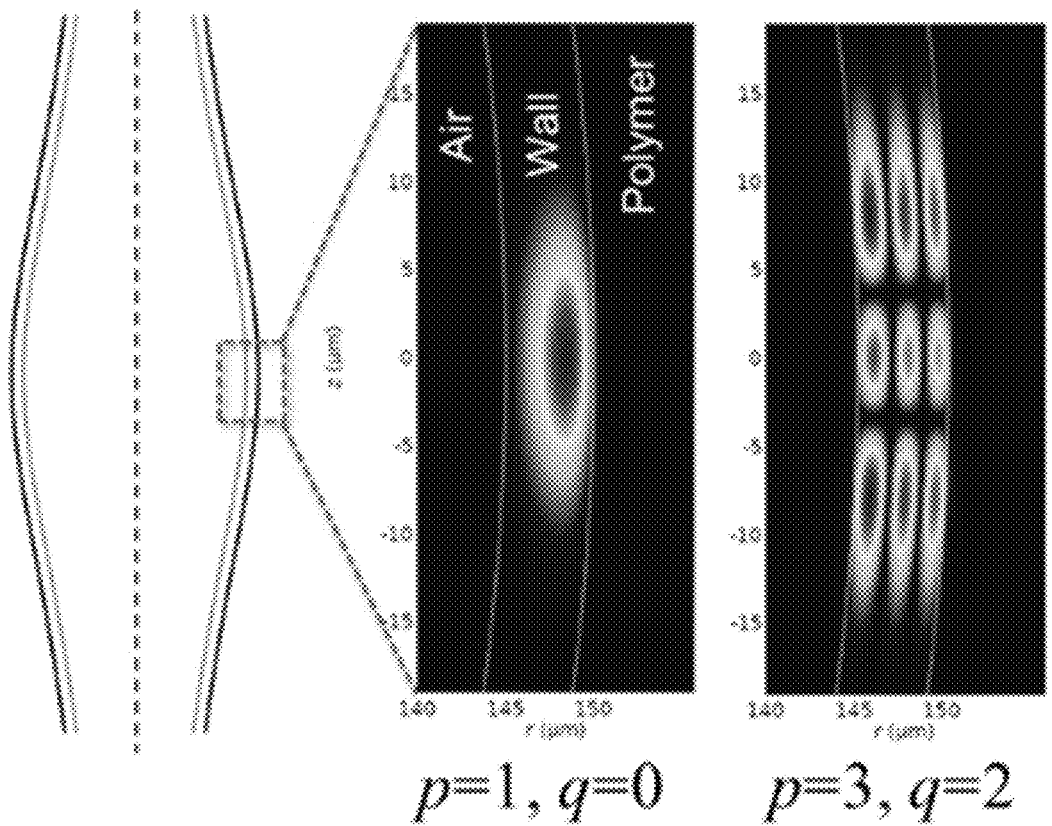
FIG. 12A is a schematic of two positions to apply perturbation.
Figure 12B:
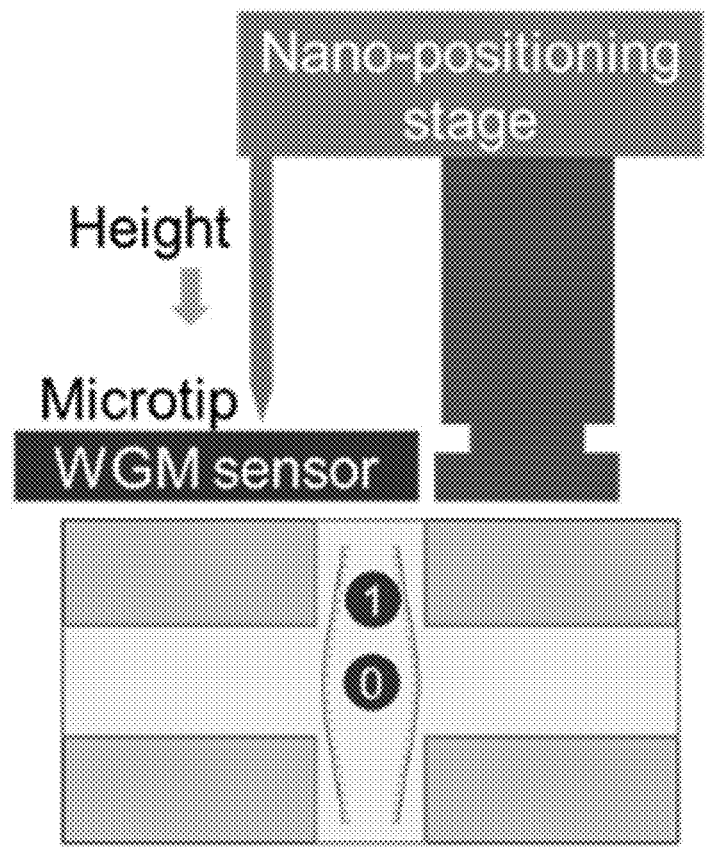
FIG. 12B is an illustration of a setup for applying displacement as a local perturbation according to one embodiment of the disclosure.
Figure 12C:
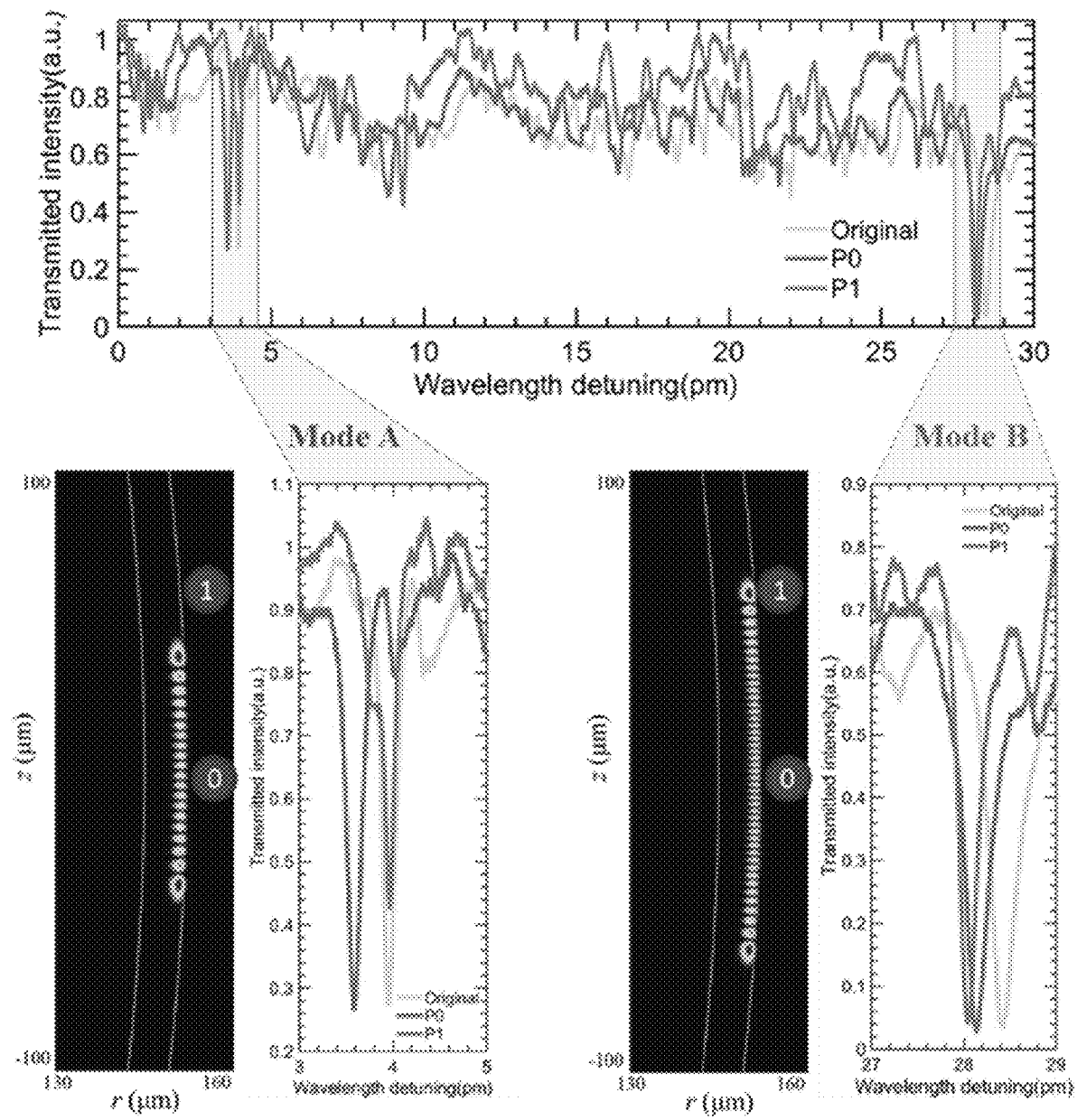
FIG. 12C illustrates transmission spectra including multiple modes when a local perturbation is applied at different positions and a modal profile.

FIGS. 12A-12C illustrate different WGM responses to the location of perturbation in a multimode sensor. FIG. 12A is a schematic of the two positions to apply perturbation. Position 0 is at the center of the MBR and position 1 is ~60 µm away from the center. FIG. 12B is an illustration of the setup for applying displacement as a local perturbation. FIG. 12C illustrates transmission spectra (top figure of FIG. 12C) including multiple modes when a local perturbation is applied at different positions. Two modes encircled by rectangles show distinct responses to the location of perturbation: the mode (in the red rectangle) shows a measurable shift when the perturbation is applied at location 1, while the mode (in the blue rectangle) shows no significant shift. The bottom figure(s) of FIG. 12C show(s) a modal profile (intensity distribution) of a center mode with relatively low axial order, which would not experience much impact from a perturbation applied at position 1 (red dot), although it would be altered from a perturbation applied at position 0. Additionally, a modal profile of an extended mode with relatively high axial order could be provided, which would be influenced by perturbations applied at position 1 and position 0.

Figure 13A:
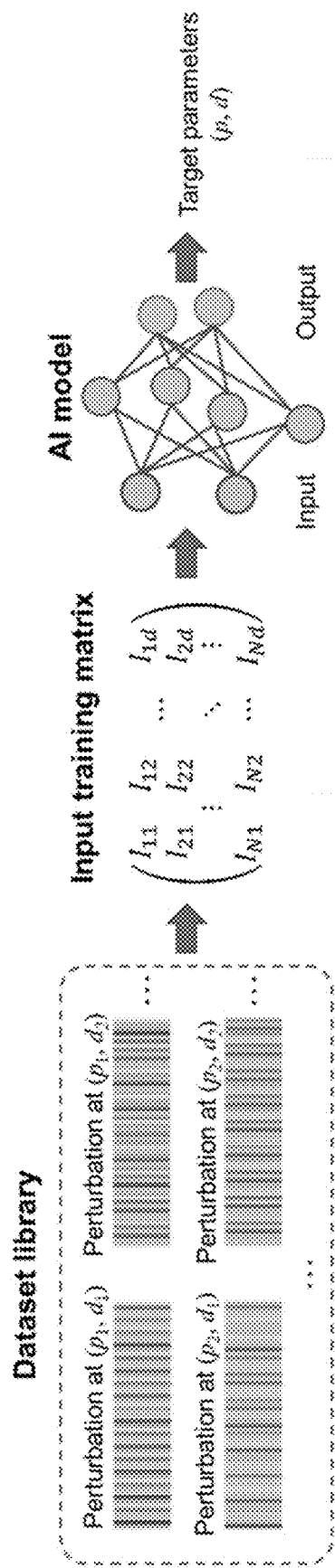
FIG. 13A illustrates an AI-empowered multimode sensing framework according to one embodiment of the disclosure, including a training process of an AI model according to one embodiment of the disclosure.
Figure 13B:
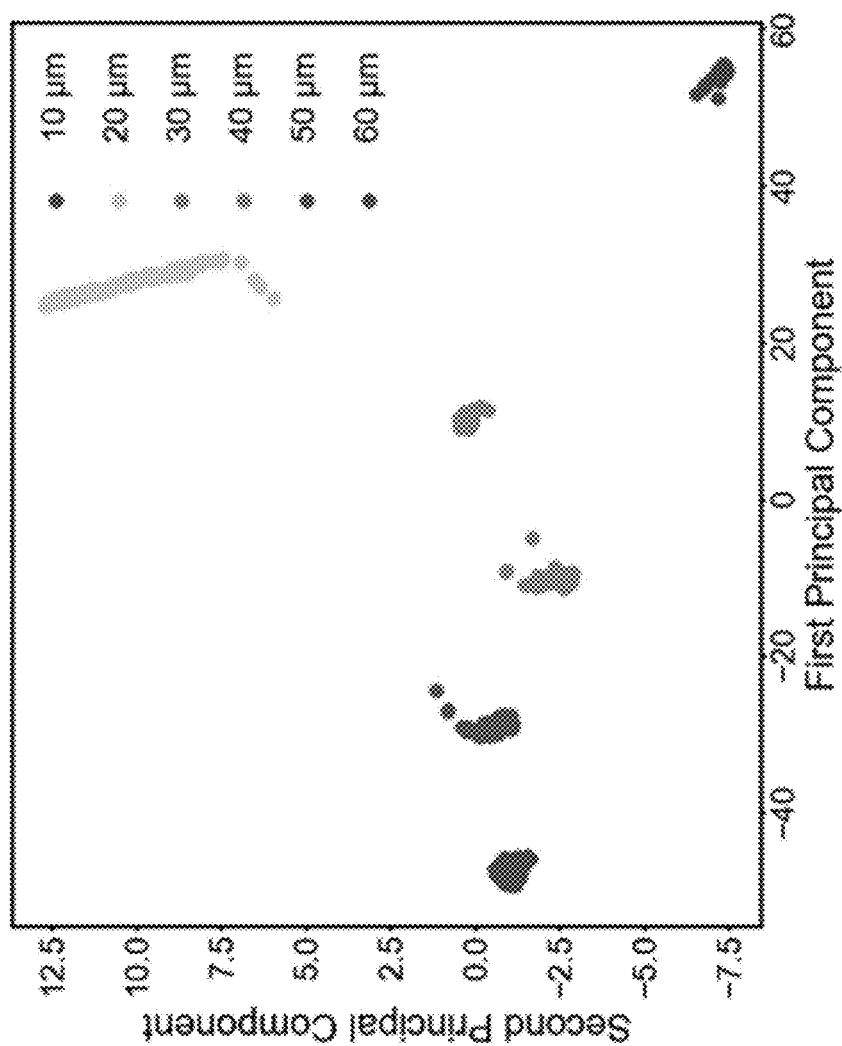
FIG. 13B shows PCA visualization on learned features of barcodes on different perturbations, specifically amplitudes.
Figure 13C:
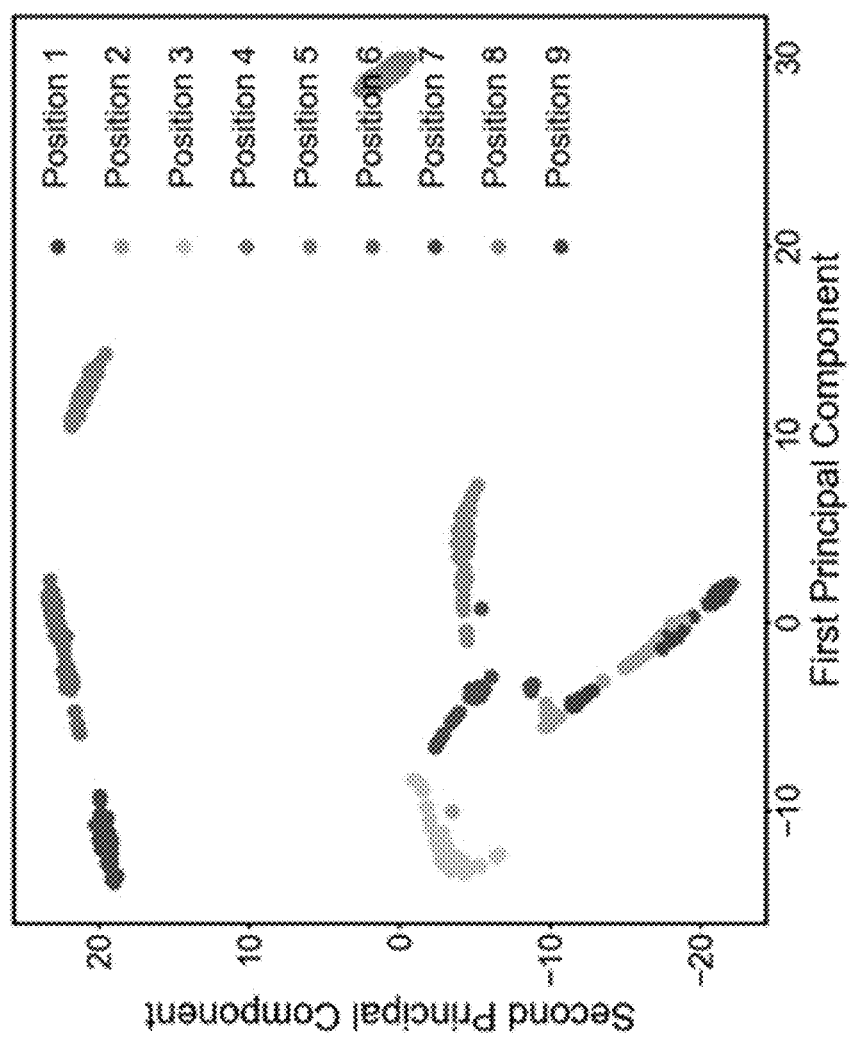
FIG. 13C shows PCA visualization on learned features of barcodes on different perturbations, specifically positions.

FIGS. 13A-13C illustrate an AI-empowered multimode sensing framework. FIG. 13A shows at training process of an AI model according to one embodiment of the disclosure. Hyper-information barcodes under various perturbation conditions are collected into a data library. Then these barcodes are transformed into matrices. Next, the machine learning model is trained to minimize the loss function, which estimates the discrepancy between the predicted output and the actual value. FIGS. 13B and 13C show PCA visualization on learned features of barcodes on different perturbations, where FIG. 13B shows amplitudes and FIG. 13C shows positions.

Figure 14A:
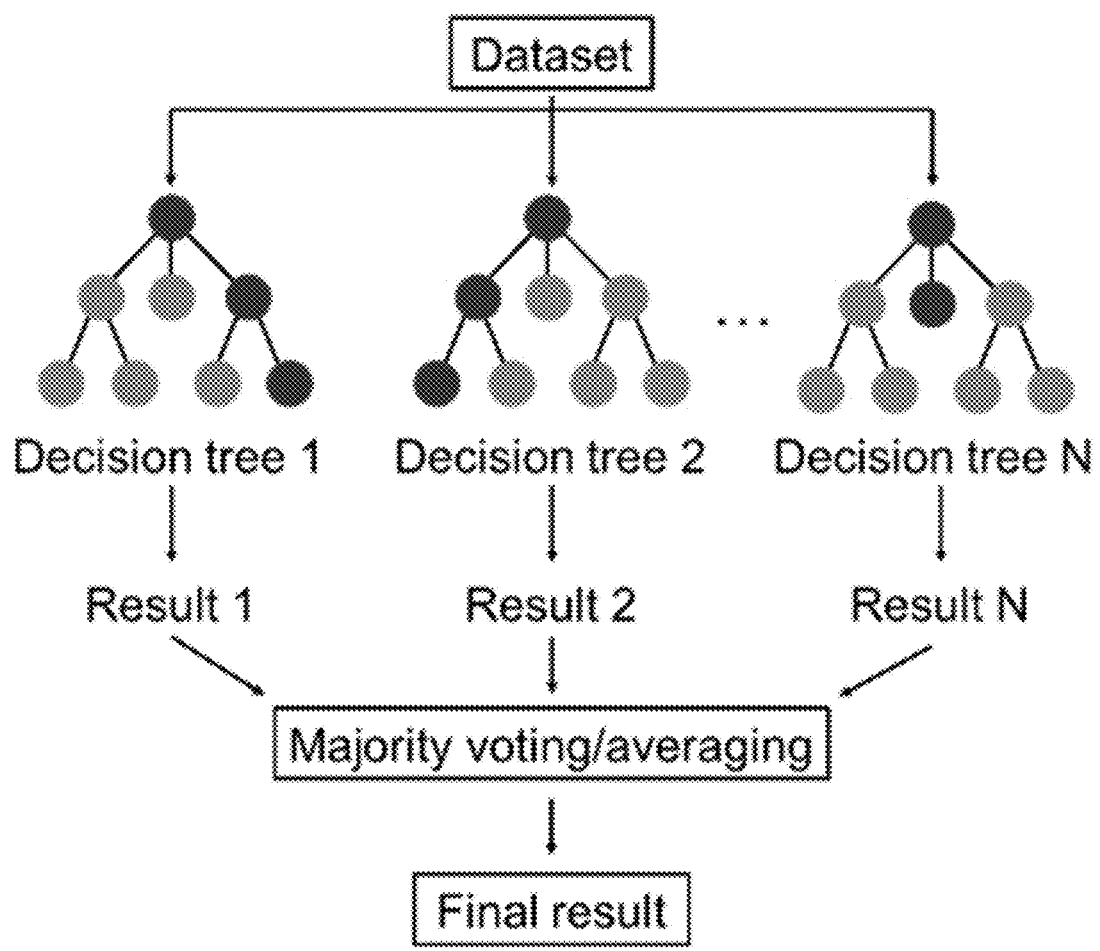
FIG. 14A illustrates a Random Forest (RF) model according to one embodiment of the disclosure.
Figure 14B:
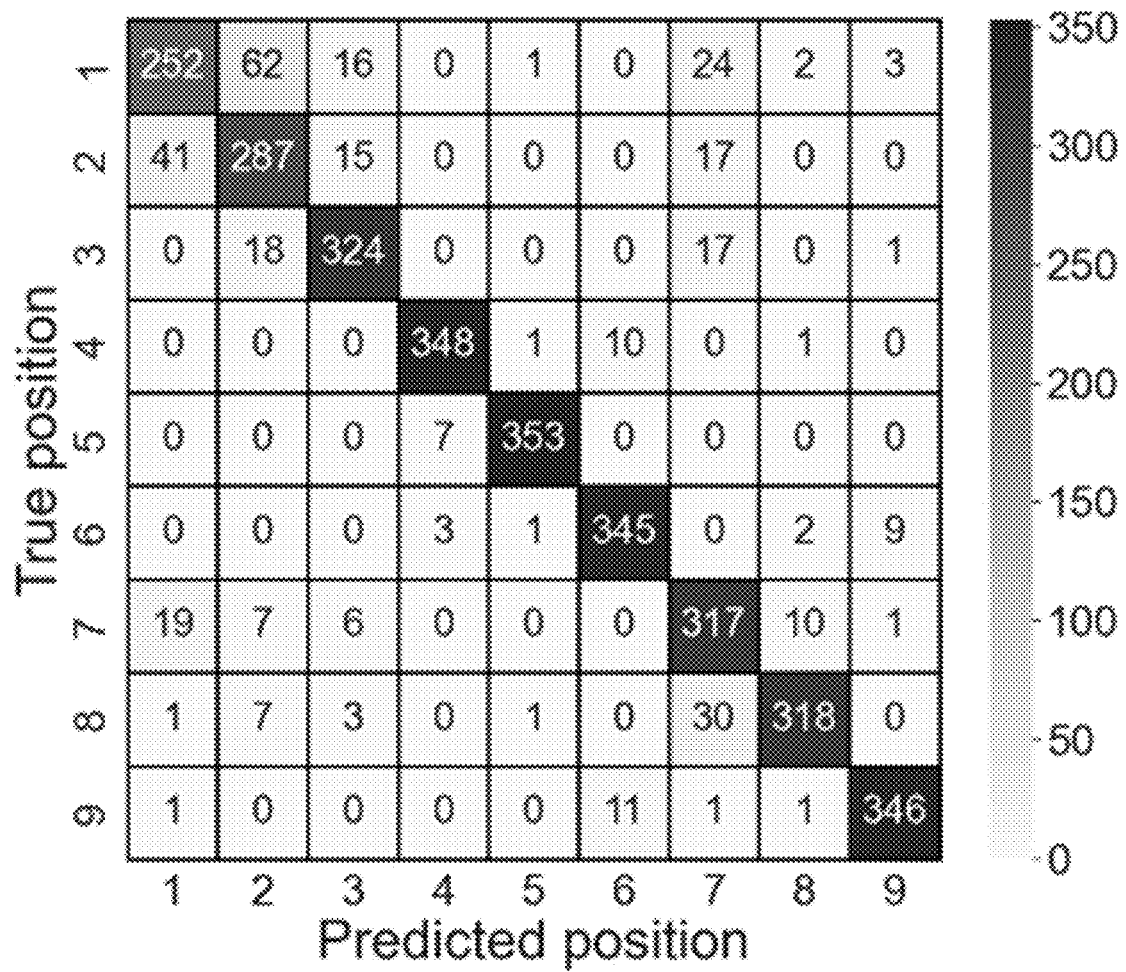
FIG. 14B illustrates confusion matrixes of identifying results based on WGM spectrum in a training set according to one embodiment of the disclosure.
Figure 14C:
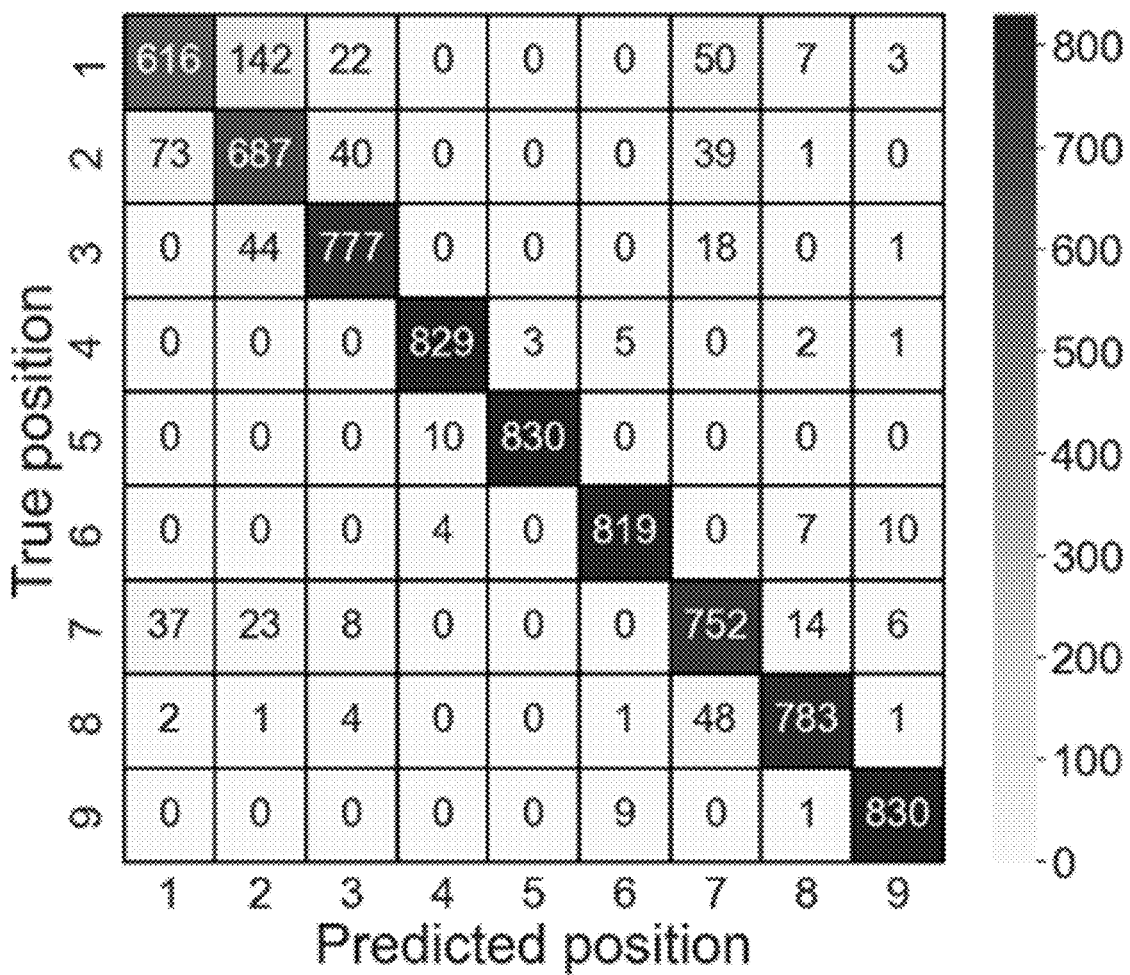
FIG. 14C illustrates confusion matrixes of identifying results based on WGM spectrum in a testing set according to one embodiment of the disclosure.

FIGS. 14A-14C illustrate a Random Forest model (random decision forests, RF). FIG. 14A is an illustration of the RF model. FIGS. 14B and 14C show confusion matrixes of the identifying results based on the WGM spectrum in the training set (FIG. 14B) and testing set (FIG. 14C), respectively.

Figure 15A:
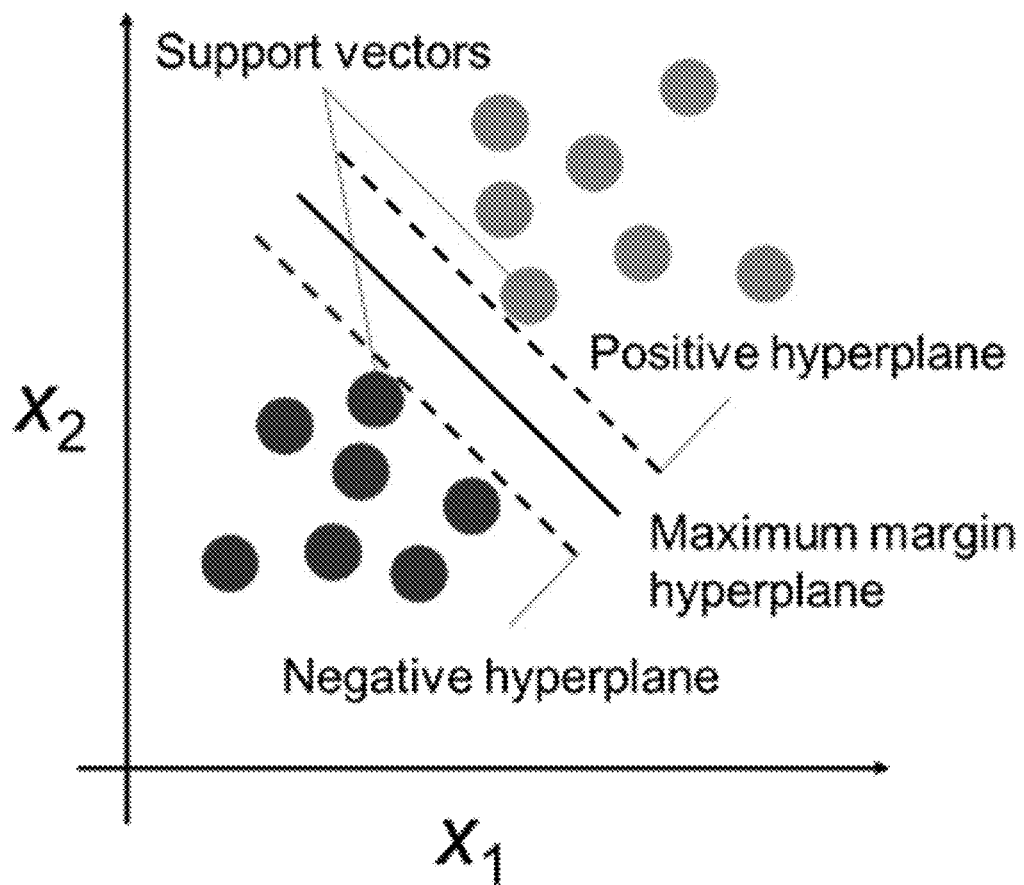
FIG. 15A illustrates a Support Vector Machine (SVM) model according to one embodiment of the disclosure.
Figure 15B:
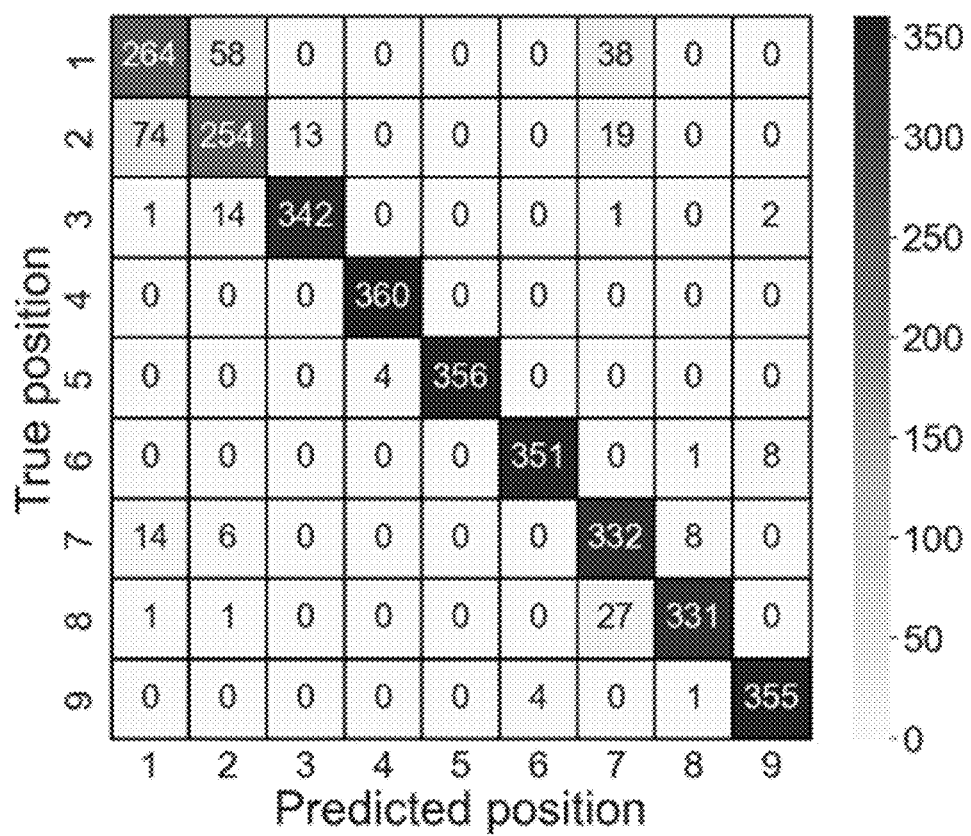
FIG. 15B illustrates confusion matrixes of identifying results from the SVM model using radial basis function kernel (RBF kernel).
Figure 15C:
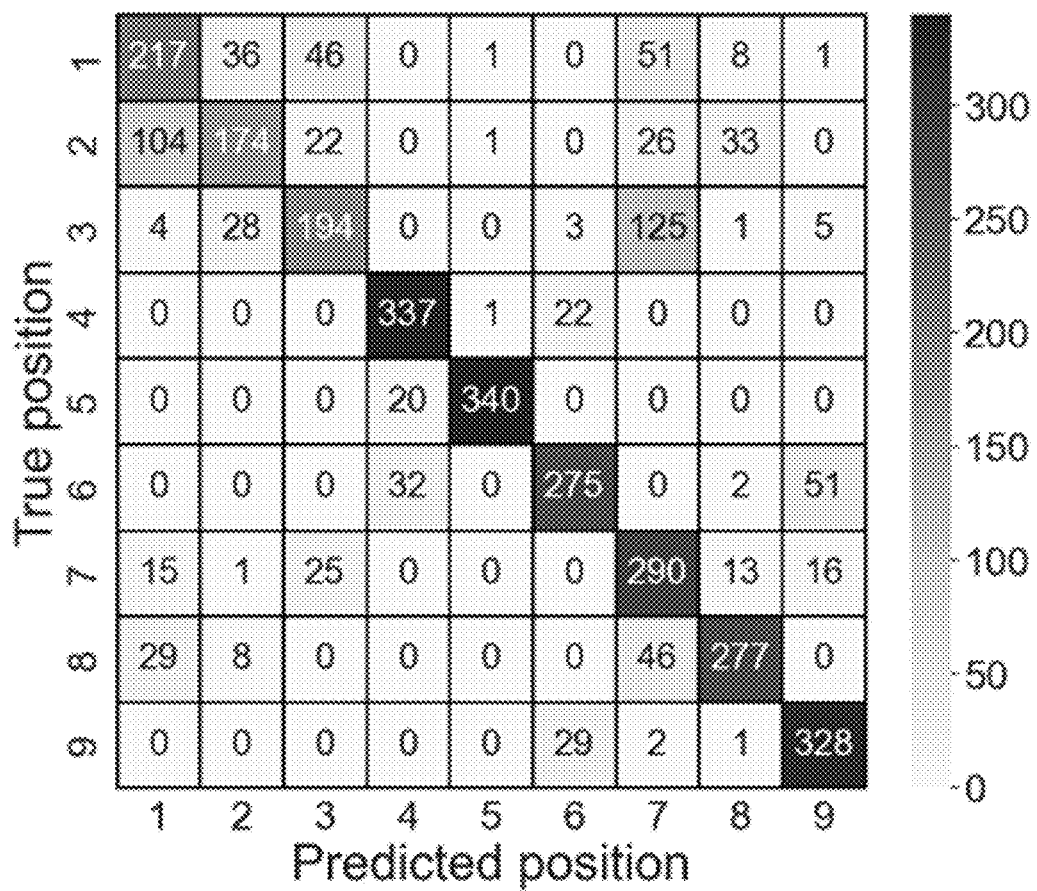
FIG. 15C illustrates confusion matrixes of identifying results from the SVM model using sigmoid kernel.

FIGS. 15A-15C illustrate a Support Vector Machine (SVM) model. FIG. 15A is an illustration of the SVM model. FIGS. 15B and 15C show confusion matrixes of the identifying results from the SVM model using radial basis function kernel (RBF kernel) (FIG. 15B) and sigmoid kernel (FIG. 15C), respectively.

Figure 16A:
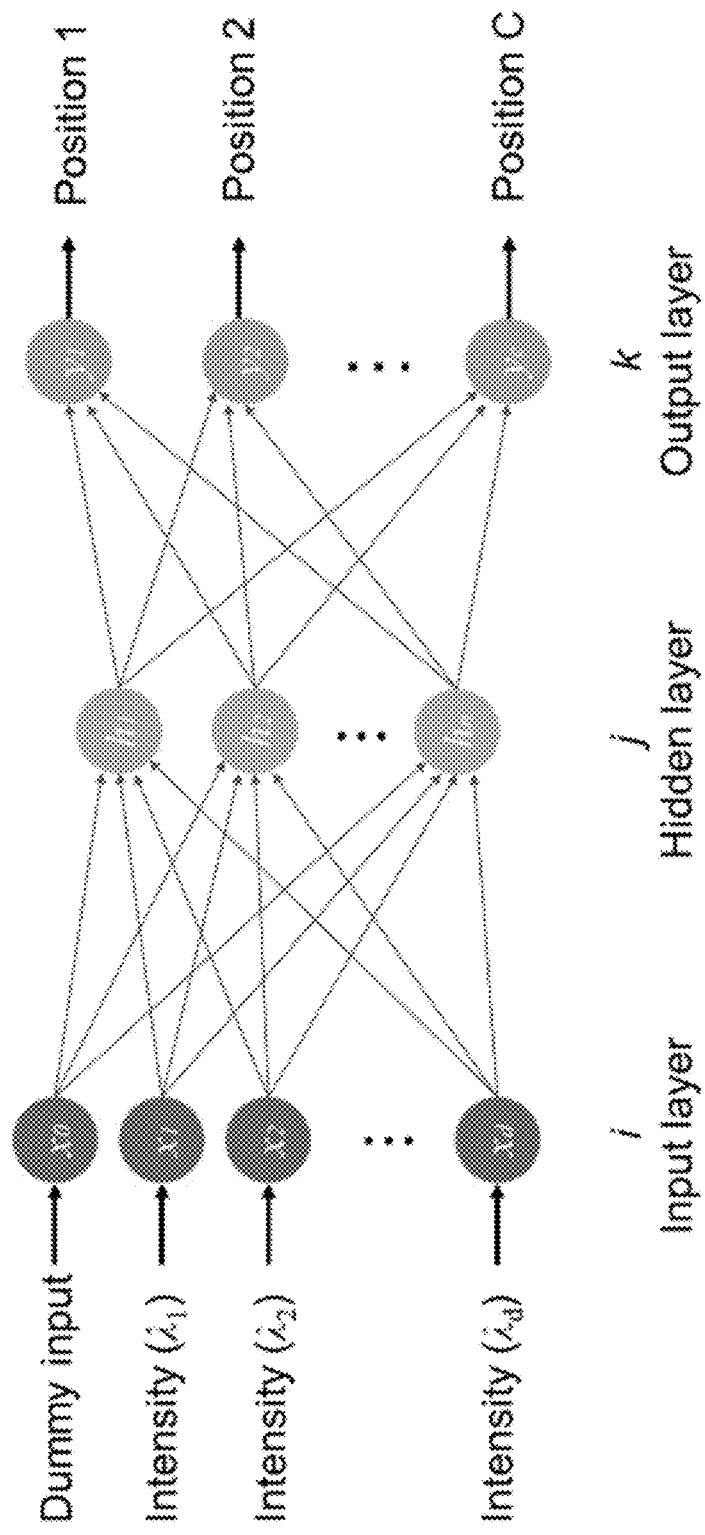
FIG. 16A illustrates an artificial neural network (ANN) model according to one embodiment of the disclosure.
Figure 16B:
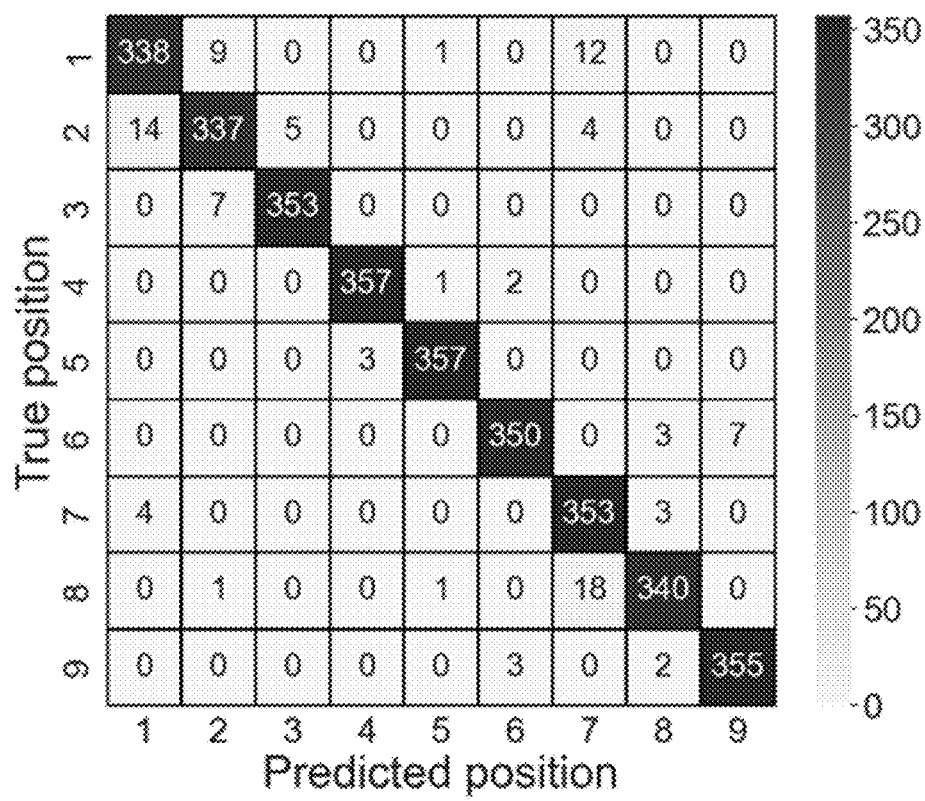
FIG. 16B illustrates a confusion matrix of identifying results of the ANN.

FIGS. 16A and 16B illustrate an artificial neural network (ANN) model. FIG. 16A is an illustration of the ANN model. FIG. 16B shows a confusion matrix of the identifying results.

Figure 17:
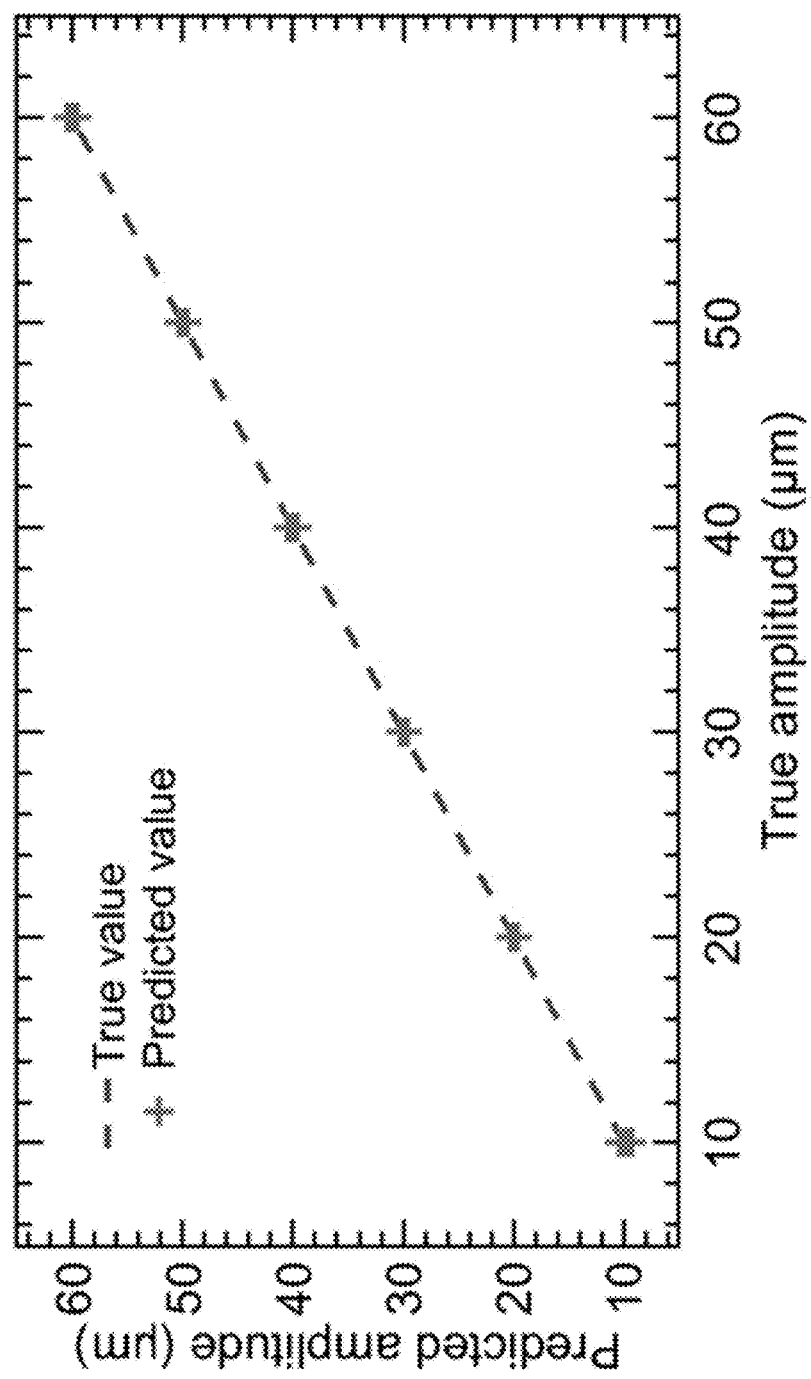
FIG. 17 illustrates a linear regression model for the estimation of perturbation amplitude.

FIG. 17 illustrates a linear regression model for the estimation of perturbation amplitude. The plot shows the predicted amplitude versus the expected amplitude (ground truth) for the model. The dashed line indicates the identity function of predicted value and true amplitude.

Figure 18A:
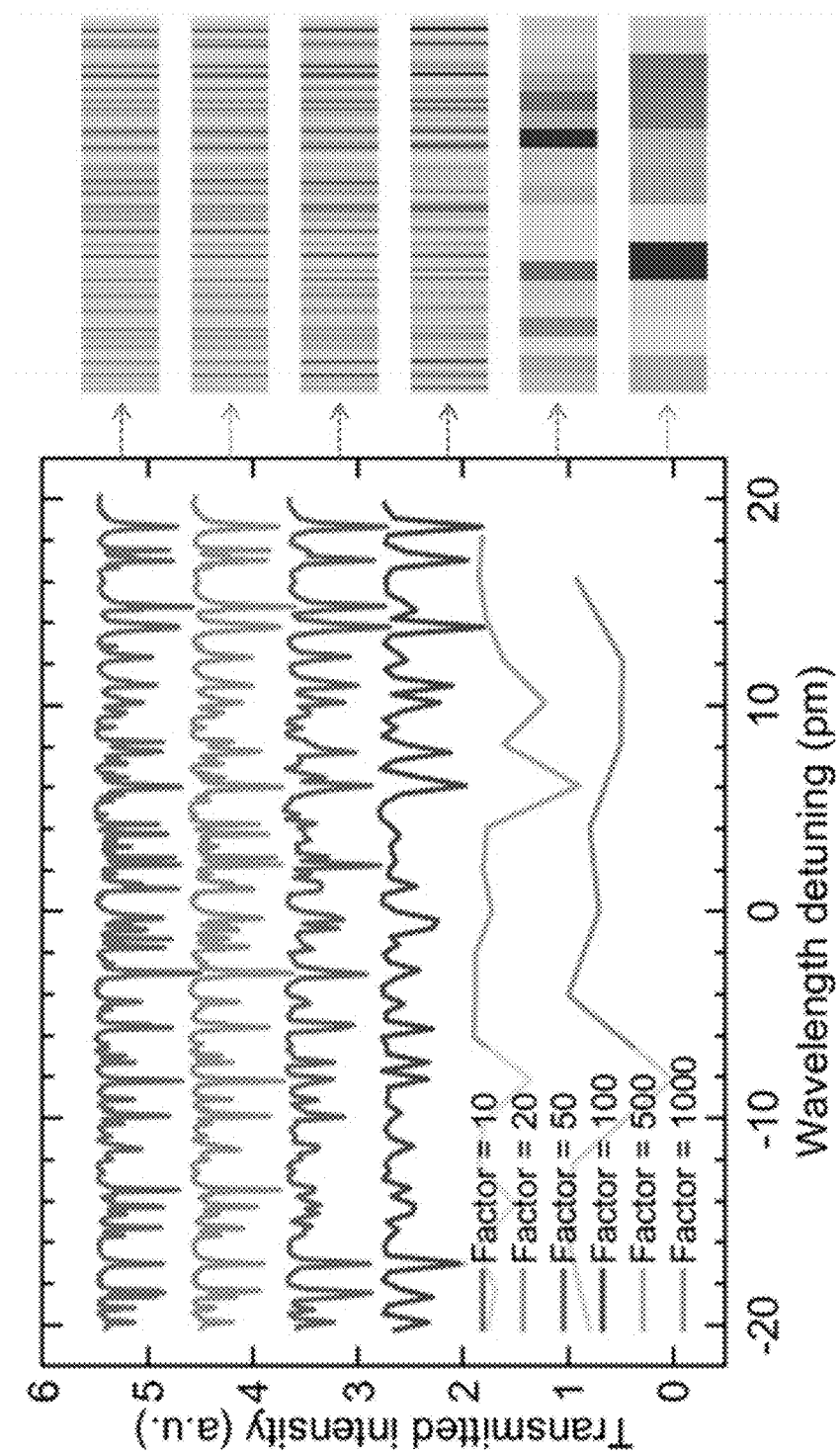
FIG. 18A illustrates model performances on sparse-sampled data, including representative resonant spectra after downsampling with various downsampling factors.
Figure 18B:
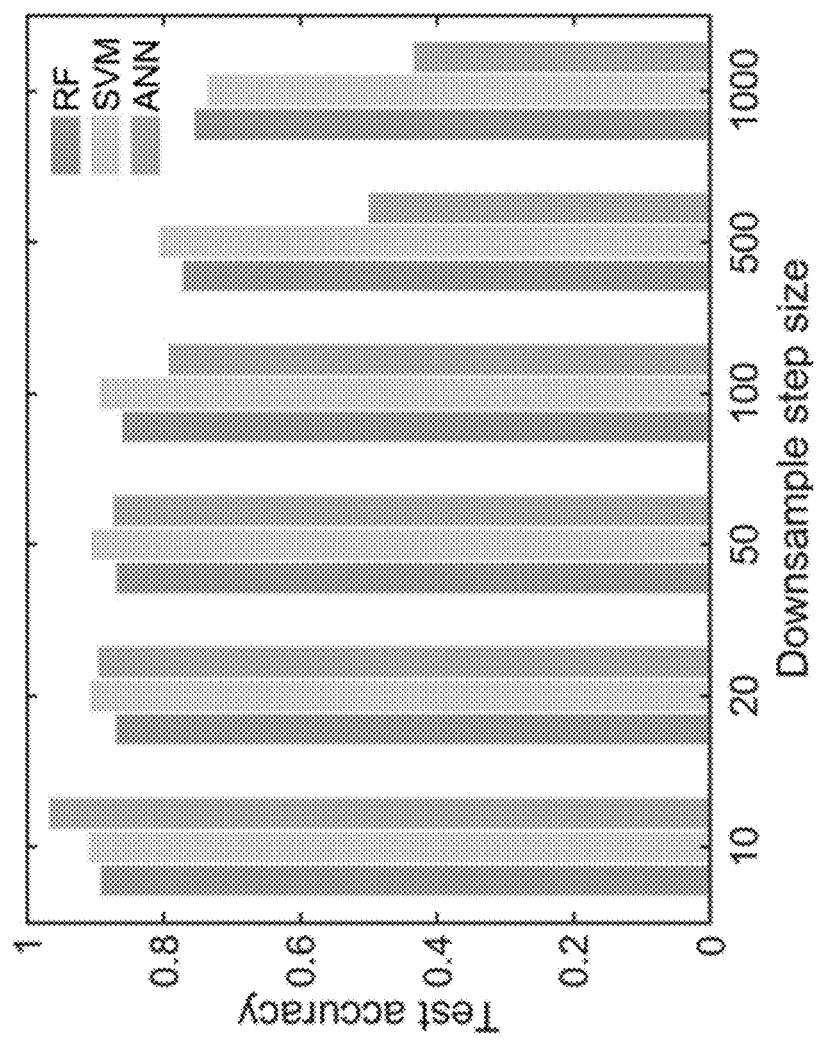
FIG. 18B illustrates corresponding test accuracies of different models.

FIGS. 18A and 18B illustrate model performances on sparse-sampled data, where downsampling factors reduce the number of data points available for analysis. FIG. 18A shows representative resonant spectra after downsampling with various downsampling factors (10, 20, 50, 100, 500, and 1000). FIG. 18B shoes corresponding test accuracies of different models.

Figure 19A:
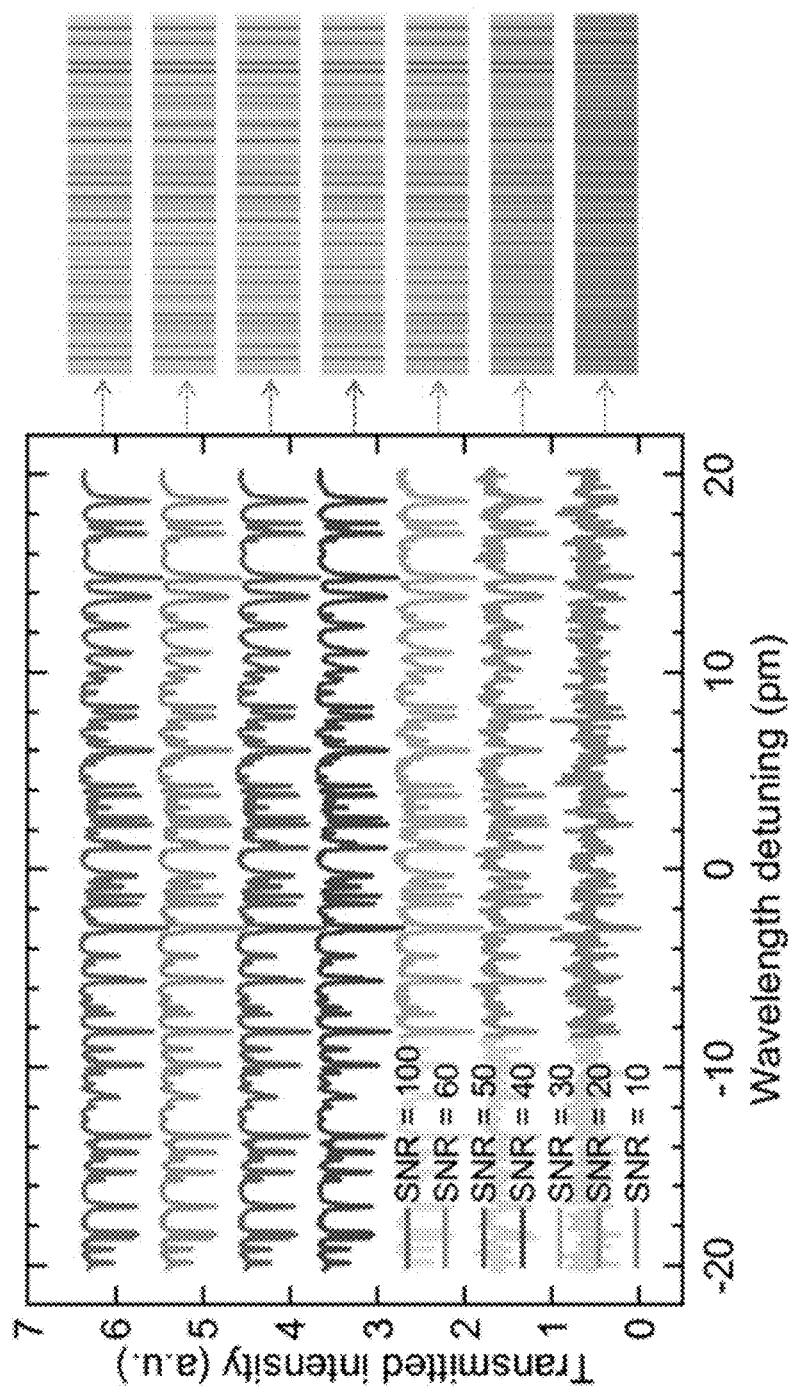
FIG. 19A illustrates model performances on noisy data, including representative resonant spectra under various SNRs.
Figure 19B:
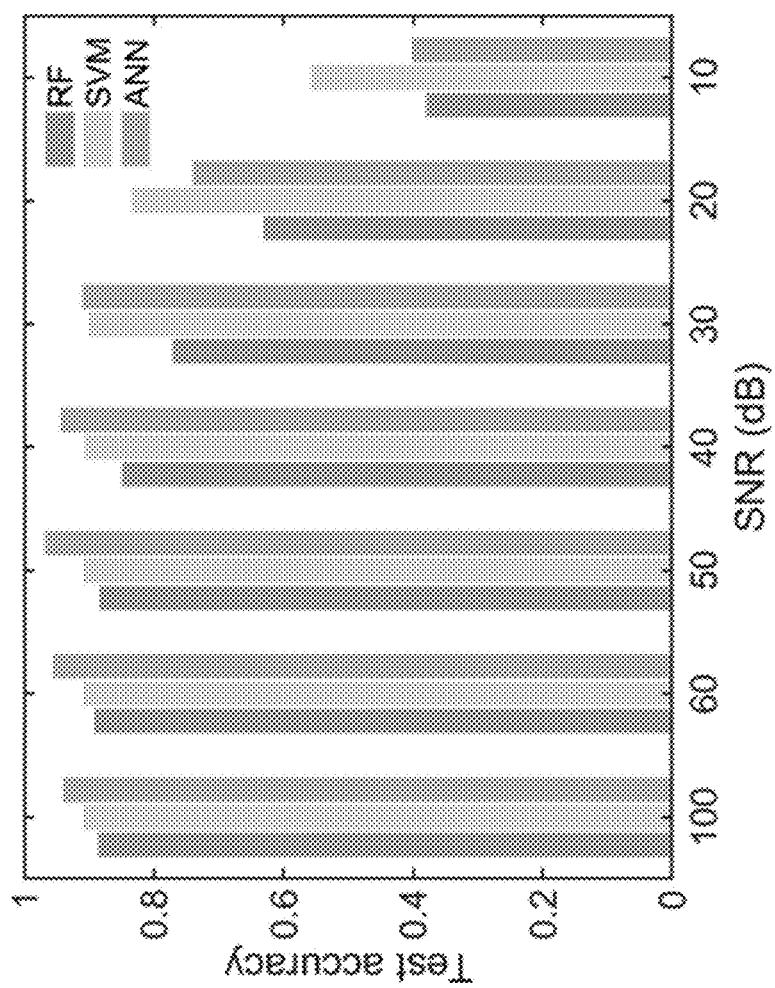
FIG. 19B illustrates corresponding test accuracies of different models.

FIGS. 19A and 19B illustrate model performances on noisy data, where the SNR affects the accuracy of the analysis. FIG. 19A shows representative resonant spectra under various SNRs of 100 dB, 60 dB, 50 dB, 40 dB, 30 dB, 20 dB, and 10 dB. FIG. 19B shows corresponding test accuracies of different models.

Figure 20A:
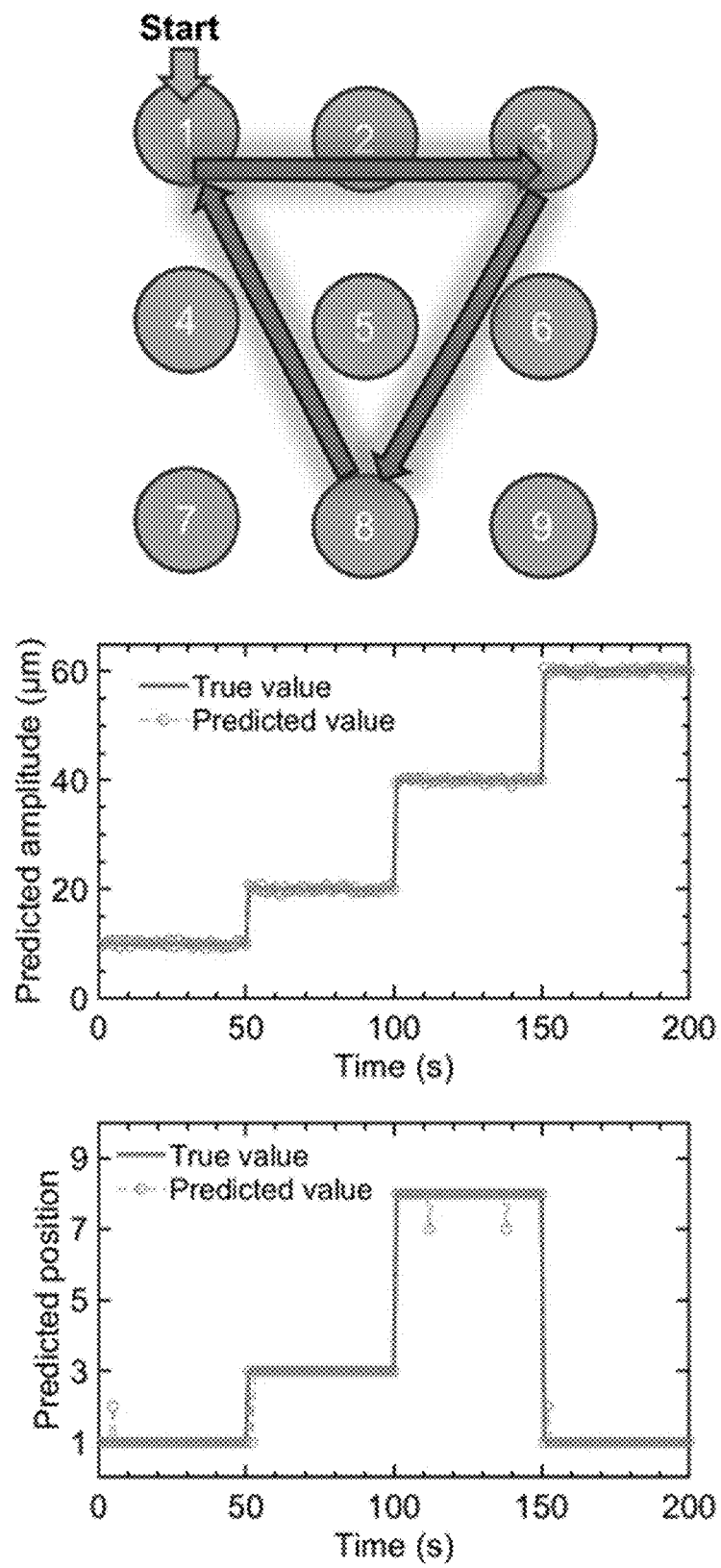
FIG. 20A illustrates continuous tracking of first inputs on a micro-keyboard according to one embodiment of the disclosure.
Figure 20B:
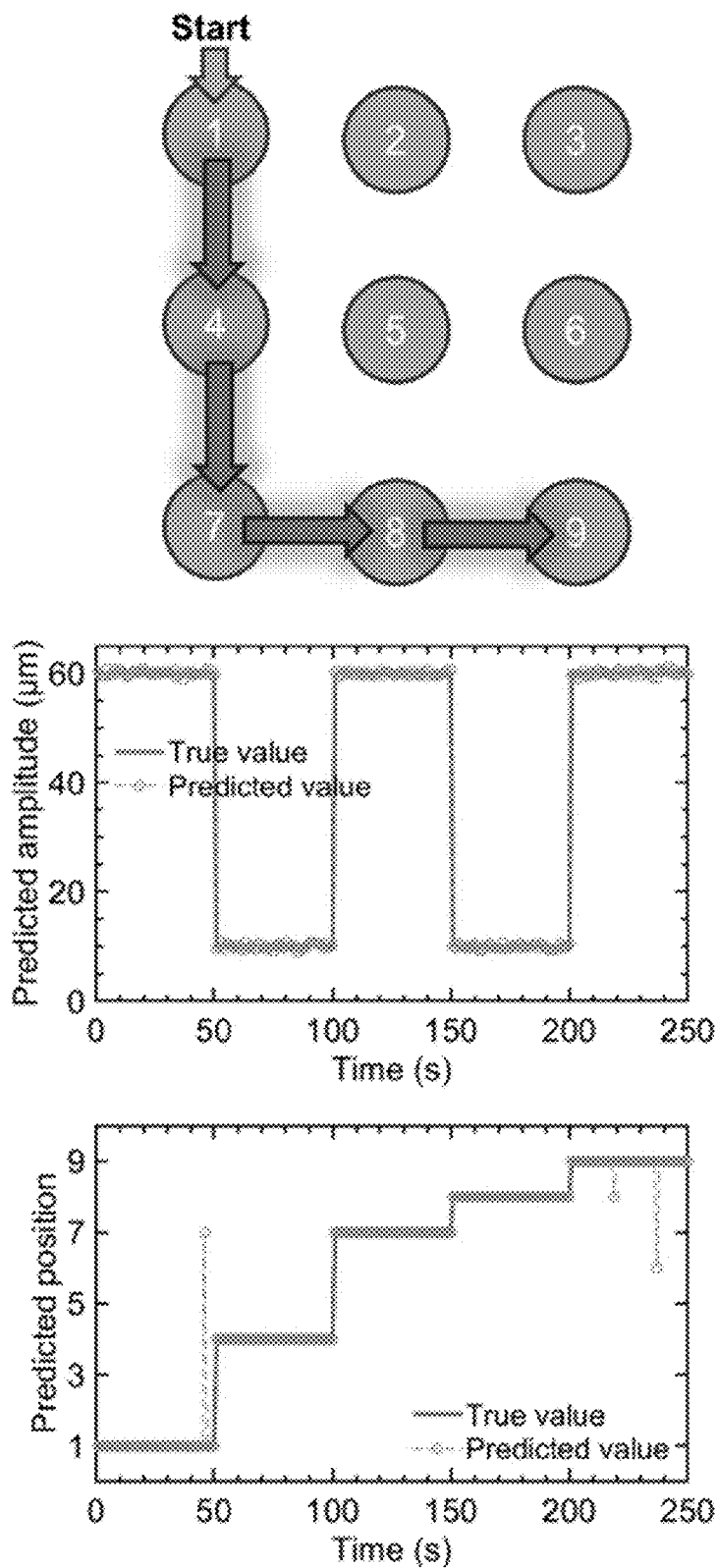
FIG. 20B illustrates continuous tracking of second inputs on a micro-keyboard according to one embodiment of the disclosure.
Figure 20C:
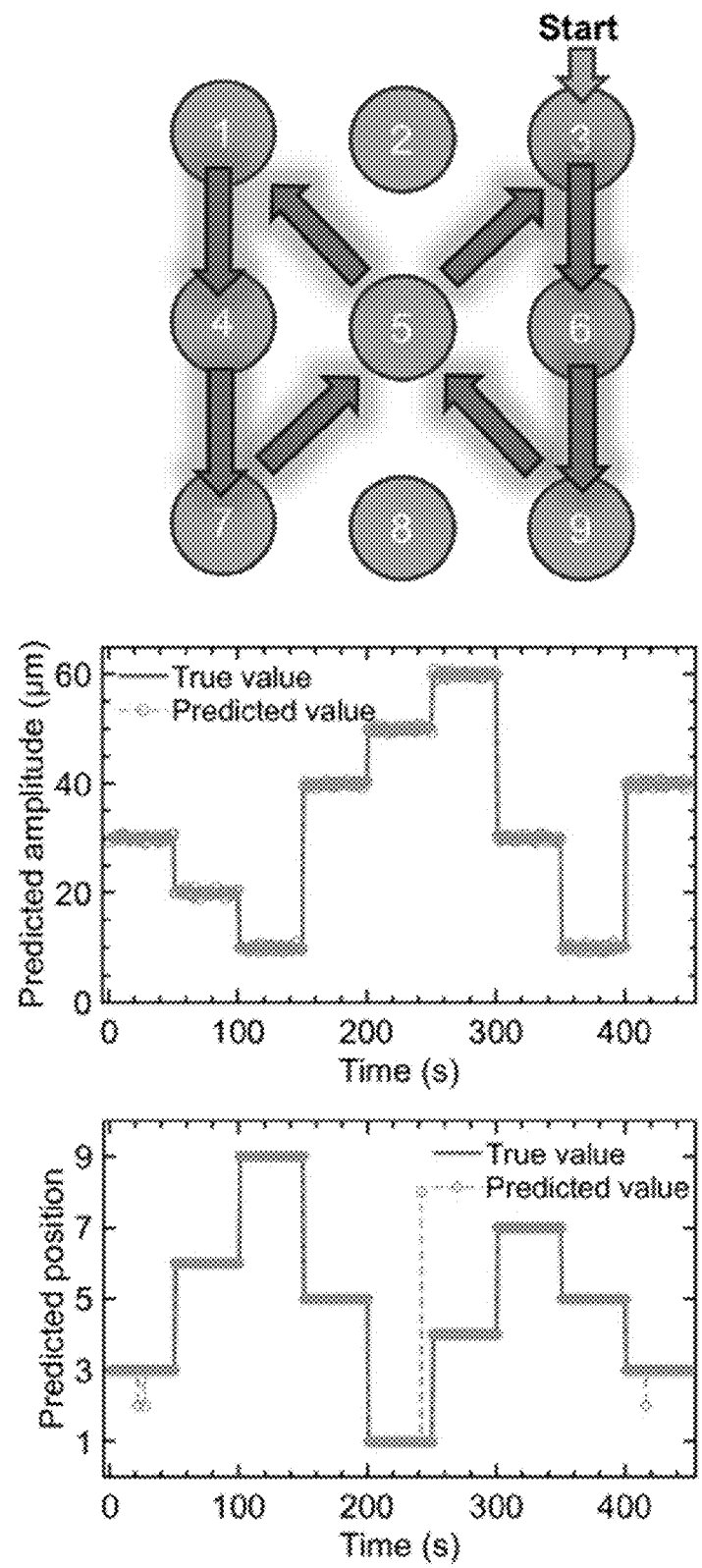
FIG. 20C illustrates continuous tracking of third inputs on a micro-keyboard according to one embodiment of the disclosure.

FIGS. 20A-20C illustrate continuous tracking of inputs on a micro-keyboard. FIGS. 20A, 20B, and 20C show three different sequences of inputs (different perturbation and amplitude applied) on the micro-keyboard. The upper figure in each of FIGS. 20A-20C shows the trajectories of the input positions. The middle figure in each of FIGS. 20A-20C shows the tracking (prediction) of displacement amplitude through the disclosed sensor. The bottom figure in each of FIGS. 20A-20C shows the tracking (prediction) of position through the disclosed sensor.

Figure 21A:
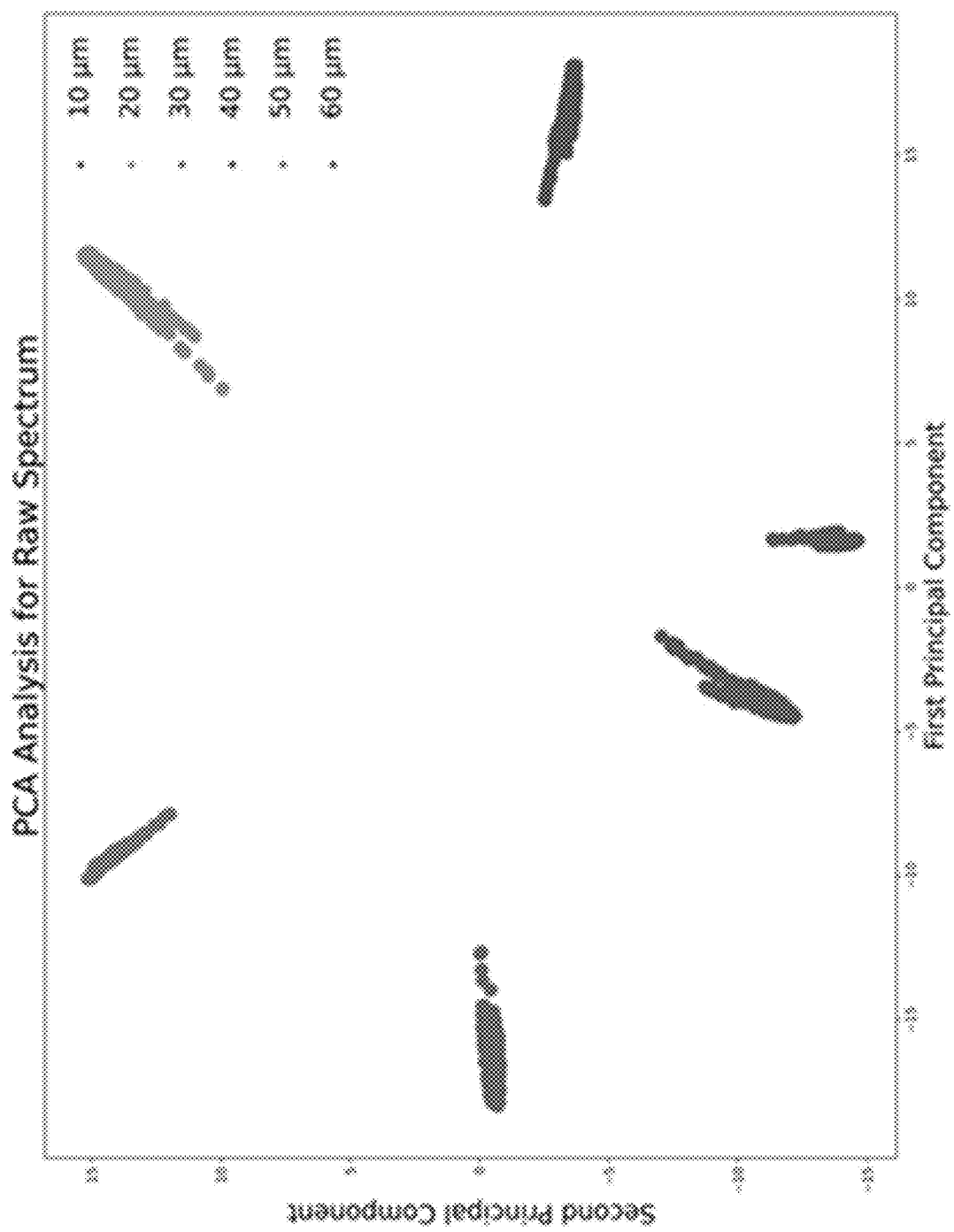
FIG. 21A illustrates PCA visualization on raw spectrum of different displacement.
Figure 21B:
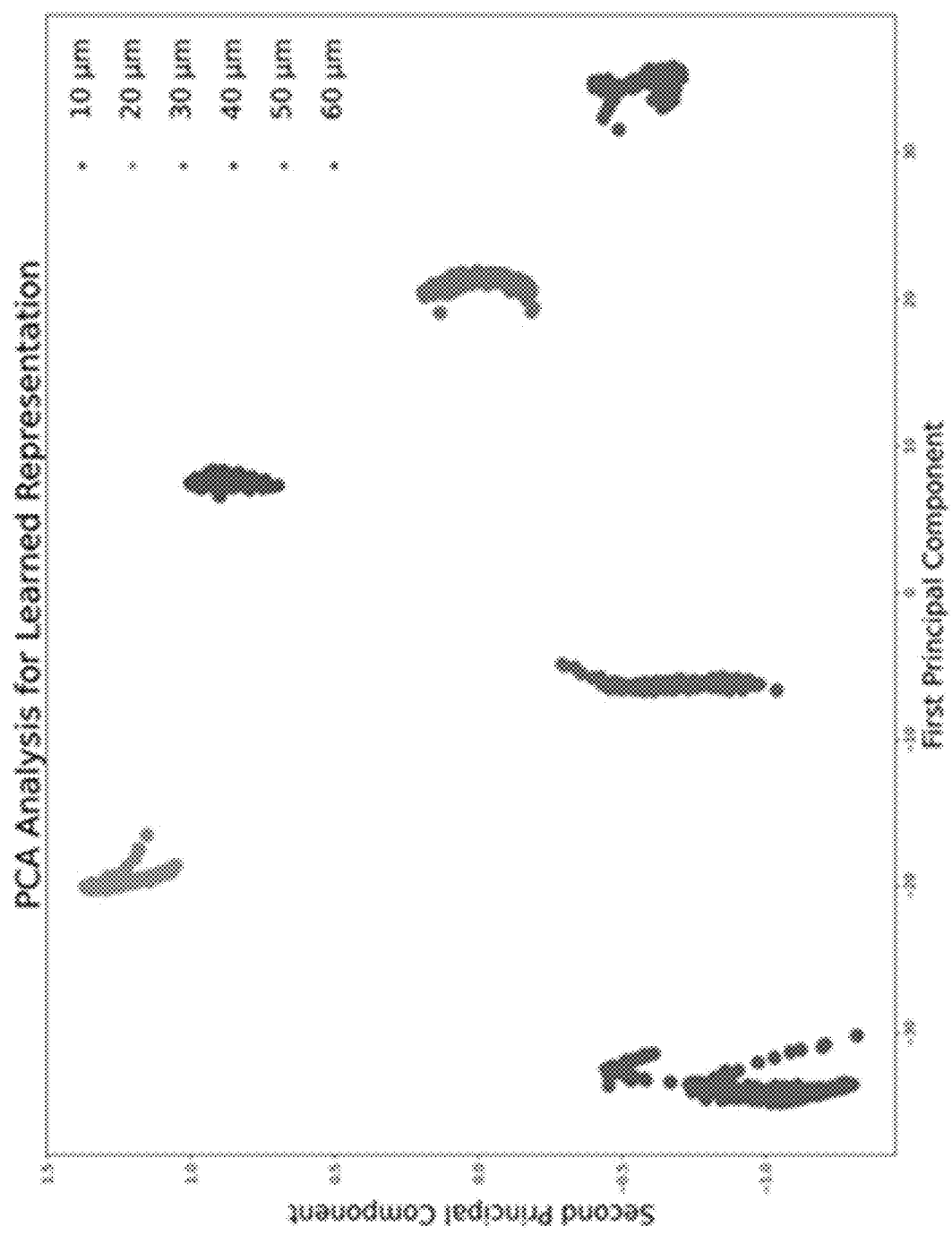
FIG. 21B illustrates a feature captured by ANN model for displacement.

FIGS. 21A and 21B illustrate PCA visualization on Raw spectrum of different displacement (FIG. 21A) and the feature captured by ANN model for displacement (FIG. 21B).

As illustrated in FIG. 11A, the measurement of individual sensors in the multi-sensor array W can be achieved by controlling the input port x and collecting the signal u from the corresponding photodetector (PD). For instance, the signal from sensor $S_{13}$ can be extracted by inputting light into port 3 and detected via PD1, whereas $S_{21}$ can be obtained by inputting light in port 1 and measured from PD2. In the disclosed multimode sensor, each mode exhibits a distinct sensing capability, due to its unique modal profile (spatial distribution). When monitored simultaneously via one PD, the distinct sensing hot spots as well as other optical properties of different modes can provide a comprehensive response and capture multi-faceted information of the sensing target. Therefore, the WGM sensor effectively becomes an array of sensors in one device, by integrating these individual modes into a single sensor. Each mode of resonance can be used to sense a different variable or to pinpoint the location of the perturbation, effectively performing the same function as the individual sensors in the array.

To demonstrate this concept, the microsensor can be embedded in a micro-keyboard with 9 digits, and each digit corresponds to one position on the micro-keyboard. When a "click" perturbation is applied, the effective refractive indexes of modes in the microsensor can be affected, leading to varying responses, depending on their "sensing hotspots" and coupling conditions. As shown in FIG. 11B, when a perturbation from a microtip is applied, the transmission spectrum of the microsensor is recorded, and a hyper-information barcode is subsequently generated, which captures the comprehensive responses from various modes. By analyzing its collective pattern via machine learning models, the location and amplitude of the perturbation can be determined simultaneously.

The optical microbubble resonator (MBR) is presented as an optimal platform for multimodal sensing. A first validation of its comprehensive responses of different modes to localized disturbances is conducted. As shown in FIG. 12A, modes with different axial order q exhibit various turning points along the axial direction, resulting in distinct sensing hot spots. Moreover, modes with different radial order p exhibit different sensitivity levels as they extend differently into the core, which can be used for multiparameter analysis. The disclosed multimode sensor was created by packaging an MBR coupled with a tapered fiber using polydimethylsiloxane (PDMS). This packaging technique offers protection to the device, allowing for surface displacement without the risk of damage. As shown in the inset of FIG. 12B, a microtip connected to a nano-positioning stage is employed to apply perturbations. Here, the focus is on two specific positions for perturbation: position 0 at the center of the MBR, and position 1, approximately 60 μm from the center. FIG. 12C shows the unique spectra resulting from a perturbation amplitude of 10 μm at positions 1 and 2, respectively. Notably, the overall spectrum displays varying responses depending on the location of the perturbation, as observed in the two modes highlighted by rectangles. When the perturbation occurs at position 0, both modes exhibit a blue shift, though with varying amplitudes. Conversely, when the perturbation is at position 1, mode B marked in the blue rectangle undergoes a larger shift, while mode A in the red rectangle shows no significant shift. This distinct behavior can be explained by their different modal profiles: mode B marked in the blue rectangle has a higher axial order and extends away from the center. As a result, this extended mode can detect perturbations at both positions. In contrast, mode A in the red rectangle has a relatively lower axial order and is more concentrated near the center. Consequently, it is not influenced by the perturbation applied at position 1, which is away from the center. In addition to resonance shift, other spectral features, such as coupling depth, modal spacing, bandwidths, and lineshape also show unique dependence on the perturbation position, although the perturbation amplitudes are the same. By utilizing the additional information present in the multimode spectrum, which contains rich spectral features and distinct responses, multiparameter sensing can be achieved. For instance, in this case, both the perturbation amplitude and its position can be determined.

B. Hyper-Information Barcode Sensing Framework

To analyze the comprehensive response from multimode and multi-faceted information in the hyper-information barcodes, machine learning algorithms are explored to model the response of individual modes and extract the sensing information automatically. In this experiment, perturbations can be applied at different positions on the micro-keyboard, each spaced 20 μm apart and representing one digit. The hyper-information barcodes are collected when the perturbation is applied at each position with a certain amplitude.

Particularly, the barcode is represented as a feature vector $I(\lambda)=[I\lambda 1, I\lambda 2, \ldots, I\lambda d]$ with a dimension of d. The individual feature value $I\lambda$ corresponds to the intensity of a specific wavelength within the measured spectrum range. One objective is to determine the perturbation position p as well as perturbation amplitude d of the barcode data. The sensing task is divided into two separate problems: (1) predicting the discrete perturbation position is a classification problem, and predicting the perturbation amplitude is a regression problem. Different machine-learning models can be applied to capture the features and derive sensing information. Then features in the data and decisions made by models are visualized.

To show how the hyper-information barcodes capture details about size and position, principal component analysis (PCA) can be applied, which is a statistical method to reduce a cases-by-variables data table to its principal components, to the barcode data. This helps us easily see how these barcodes group together based on their characteristics. As shown in FIG. 13B, barcode data forms different clusters depending on the perturbation amplitude. A clear spatial order on the first PCA axis for various amplitudes is evident. This indicates that machine learning models could quantitatively capture the significant dependencies for perturbation amplitude. FIG. 13C depicts PCA analysis results for position prediction. Similarly, nine different clusters can be found with significant decision boundaries. However, some overlap exists between positions 1 and position 2, which indicates certain similarities in these barcode data, and they may lead to potential misclassifications. Despite this, the clear clustering pattern in the PCA analysis indicates that there are inherent, distinguishable groupings within the dataset. This suggests that by capturing key variations and patterns in the data, a meaningful differentiation or segmentation of the samples based on their characteristics can be achieved.

C. Results and Model Performance

Three different models are implemented in the classification task: random forest (RF), an ensemble learning algorithm that combines the predictions of multiple decision trees; support vector machine (SVM), a supervised learning algorithm that searches for the optimal hyperplane that best separates the data points into different classes; and artificial neural network (ANN), a machine learning algorithm that takes inspiration from the structure and function of biological neural networks, like those found in the human brain. After identifying the perturbation position, the spectrum can be used to estimate the amplitude of perturbation using linear regression. The details of these models are described herein.

The evaluation results on the testing data are demonstrated in the following tables (Table 1 and Table 2). To adequately evaluate the model performance, multiple metrics like accuracy, macro recall, macro precision and macro F1 score for the classification task on position prediction can be employed, and also the use of the rooted metric of rooted mean squared error (RMSE) and R square ($R^2$) for the regression task on amplitude prediction. More detailed description of evaluation metrics are provided herein. Table 1 lists accuracy and other information of various models:

TABLE 1

The overall result of classification on perturbation prediction on various models and metrics.

| Model | Accuracy | Macro Recall | Macro Precision |
|---|---|---|---|
| RF | 0.9088 | 0.9098 | 0.9105 |
| SVM | 0.7506 | 0.7603 | 0.7506 |
| ANN | 0.9712 | 0.9717 | 0.9713 |

From Table 1, the ANN model achieved the best performance, the possible reason could be ANN provides a more complicated structure for capturing non-linear relations from data. While vanilla SVM only works if the data is linearly separable, leading to the worst performance.

Further details of the classification result, and model architectures are provided herein. Model Details where the confusion matrices demonstrated the classification result of each position, indicating that the models are easily misclassify between the position 1 and 2. Table 2 lists results of linear regression and ANN (Regression):

TABLE 2

The overall result of regression on perturbation prediction on various models and metrics

| Model | RMSE | $R^2$ |
|---|---|---|
| Linear Regression | 0.1493 | 0.9999 |
| ANN(Regression) | 0.2572 | 0.9997 |

As for the regression task on amplitude prediction, both linear regression and ANN could achieve extremely high performance on the testing set with $R^2$ closing to 1. However, the linear regression model slightly outperforms the complicated neural network model.

FIG. 17 shows the predicted amplitude versus the expected amplitude (ground truth) based on the testing data. The proximity of each predicted amplitude to its corresponding ground truth value suggests that the predictions are highly accurate. The level of prediction accuracy can be quantified by calculating the mean squared error (MSE) between the predicted values and the ground truth. The $R^2$ (R-squared) value of 0.9999 is close to 1, indicating a high degree of correlation between the predicted values and the ground truth.

D. Assessing Model Performance with Sparse-sampled Data and Noise Levels.

Assessment of model performance with sparse-sampled data and noise levels are described below.

(i) Sparse-sampled Data

In low-resource measurements or edge-sensing applications where fast analysis is crucial, a lower data sampling rate is often employed to reduce computational load, data storage requirements, and power consumption. However, it's important to note that a lower sampling rate might compromise the resolution or accuracy of the data collected, potentially impacting the effectiveness of the measurement.

To simulate limited data acquisition rates, sparse-sampled data can be obtained by down-sampling the spectra in the disclosed database with down-sampling factors with the stride of 10, 20, 50, 100, 500, and 1000. The representative resonant spectra after down-sampling are shown in FIG. 18A. When the original spectrum including multiple resonance dips is down-sampled, it will appear as if the dips have been broadened and merged together, resulting in a loss of resolution and detail. The degree of broadening and merging will depend on the specific down-sampling factor stride used and the shape and spacing of the resonance dips in the original spectrum. In this case, it was observed that when the down-sampling stride is below 20, the majority of the spectral features are preserved. However, when the factor reaches 50, part of the spectral features is lost, and the resonance broadening becomes apparent. When the factor becomes larger than 100, most of the spectral features are lost, with only a limited number of prominent resonance dips remaining in the spectrum.

The down-sampling factor can have a significant impact on the accuracy of machine-learning models. When the down-sampling factor is too high, the loss of spectral features can result in a reduction of the amount of useful information available to the model, leading to a decrease in accuracy. As shown in FIG. 18B, the overall test accuracy drops for all the machine learning models when the down-sampling factor on stride increases. Especially for ANN models, the accuracy drops significantly when the down-sampling factor is higher than 100. They are highly sensitive to the input data and any changes in the input data can significantly affect the model's output. Thus, the effect of down-sampling is more apparent in ANN models compared to other models that may not be as sensitive to changes in the input data. Models that are more complex and sensitive to subtle changes in the data are likely to be more affected by down-sampling, whereas simpler models may perform more robustly in such scenarios. Therefore, it is important to carefully consider the down-sampling factor when training and evaluating AI models on down-sampled data, and to select models that are suitable for the specific down-sampling factor and application. Additionally, in situations where resources are limited, choosing simpler and more robust models may be a better option to avoid potential performance degradation (ii) Noises in Data To simulate noise in the measurements, Additive White Gaussian Noise (AWGN) to the spectra in the disclosed database at various signal-to-noise ratios (SNRs) of 100 dB, 60 dB, 50 dB, 40 dB, 30 dB, 20 dB, and 10 dB was applied. AWGN is a basic noise model used in information theory to mimic the effect of many random processes that occur in nature. A randomized sample with white noise can be generated for each spectral data. The representative resonant spectra after adding noise are shown in FIG. 19A. The noise will be distributed randomly across the entire spectrum, including the resonant dips. The noise may obscure some of the smaller dips or cause them to blend into the noise, making them more difficult to distinguish. The level of noise (determined by SNR) determines the degree to which the dips will be affected. In this case, it can be observed that when the SNR is above 30 dB, the majority of the spectral features remain distinguishable and resolvable. As the SNR decreases to 20 dB, the amplitude of the noise starts to affect the accurate determination of smaller resonance dips. Finally, when the SNR drops to 10 dB, the noise level becomes so high that the majority of the resonances in the spectrum become indistinguishable, making it difficult to accurately analyze the data.

E. Continuous Tracking of Inputs on a Micro-Keyboard

With the capability to robustly decipher the multiparameter from the hyper-information barcodes, the disclosed sensor can be employed to continuously track the inputs on the micro-keyboard. Two sets of input sequences including combinations of different perturbation positions and amplitudes may be applied. The continuously measured spectrum is transformed into barcodes and analyzed by the machine learning models. As shown in FIGS. 20A-20C, three different sequences are tested by sequentially placing the tip on a certain position on the micro-keyboard, with varying amplitude. Using the trained model to analyze the dynamics of the barcoded from the sensor, it can be determined the trajectory of the tip and the force amplitude with high accuracy. Both simple and complex sequences show high prediction accuracy, showcasing its proficiency in tracking multiple dynamic inputs concurrently. The prediction time for tacking the entire trajectory is 0.86 s, with an average time of 4.3 ms to analyze a single barcode. The results show great potential in tactile sensing applications while only one sensor is implemented.

In security and encryption, this sensing capability transforms into a powerful tool for secure access systems. The sensor's ability to discern not just the correct password or code, but also the unique manner of its entry, incorporating elements such as pressure and speed, introduces an additional layer of security. This dual recognition system-identifying both the code and the specific input method—provides a sophisticated approach to security, greatly enhancing protection against unauthorized access.

The performance of machine learning models trained on spectra with different levels of noise can be affected. As the noise level increases, the accuracy of the model can decrease, particularly for small resonance dips or features that are close to the noise level. As shown in FIG. 19B, the overall test accuracy drops for all the machine-learning models when the SNR decreases. However, the accuracy of SVM is less affected by the presence of noise in the data compared to other models. This is because SVM does not consider all the training samples equally in the process of finding the decision boundary. Instead, it only focuses on a subset of samples called support vectors that are closest to the decision boundary. This property of SVM makes it more robust to the presence of noise in the data, as noise is often far away from the decision boundary and hence does not have a significant impact on the position of the decision boundary. In addition, SVM has regularization parameters that can help to control overfitting and improve its generalization performance. This makes SVM less affected by noise and more stable robust in its predictions, resulting in less significant drops in accuracy compared to other models when dealing with noisy data. Therefore, it is important to consider the noise level when training and evaluating models on spectral data, and to select models that are robust to noise or implement noise reduction techniques to improve model performance.

F. Conclusion.

Disclosed herein is the concept of hyper-information barcode using a multimode sensor as an effective sensor array to capture comprehensive data and multi-faceted information for multiparameter sensing. Each mode of resonance can sense different variables or pinpoint the location of perturbation, thus performing the same functionality as individual sensors in a sensor array. Machine learning models are employed to analyze the hyper-information barcodes generated from multimode spectra, enabling multiparameter measurements in one sensing device with high accuracy. RF, SVM, ANN, and linear regression models can be employed to predict the position and amplitude of perturbation. In the blind test, the trained models achieved a prediction accuracy of over 90% for the position and an MSE of only 0.0223 μm2 for the amplitude, with a high R2 value of 0.9999. The performance variance of the models in dealing with sparse-sampled data and noise levels can also be evaluated. Some of the models perform well even when dealing with sparse-sampled data and noise levels. Furthermore, the continuous tracking of varying perturbation positions and amplitudes applied on the sensor can be demonstrated. These inputs on the micro-keyboard can be predicted by the model with high accuracy, showing potential applications in human-micro-robot interaction, tactile sensing, as well as security and encryption. The results demonstrate the potential of AI-empowered multimode sensing as a powerful tool and sensing framework for high-precision and multiparameter measurement.

The high accuracy and robustness of the models in handling noisy and sparse-sampled data suggest that this approach could be applied in a wide range of practical applications, such as chemical and biological sensing, environmental monitoring, and structural health monitoring. The training time required for the models is remarkably short, with the longest time recorded at only 19.90 seconds. The average time to analyze a single barcode is 4.3 ms. This rapid analysis time allows for the potential of real-time analysis and monitoring, enabling the models to be used in dynamic and time-sensitive environments. Additionally, the low computational requirements of the models make them suitable for deployment on low-power devices. For instance, the trained algorithm can be implemented within an embedded AI system with remote control via a customized application/"app" (e.g., an iOS app), enabling real-time sensing and analysis, which further expands their potential applications.

Overall, the synergy between multimode sensing and AI algorithms offers numerous advantages, including high-precision multiparameter sensing, automated analysis and component identification, and robustness against downsampling and SNR reduction, all in a single sensing device, with a simple and compact structure. This sensing framework could also work for other sensors supporting multimode. The vast amounts of data generated by multimode sensors can be efficiently analyzed by AI algorithms, which can recognize intricate patterns and correlations that could be difficult for humans to detect, or time-consuming, and resource-intensive. Additionally, the rapid training and analysis time as well as low computational requirement make the integration of multimode sensing and AI models more appealing for diverse sensing and monitoring applications. This promising combination has the potential to revolutionize multiple fields, enabling real-time, accurate, and reliable multiparameter sensing and monitoring, and opening up new possibilities for various applications.

G. Methods (i) Training of ML Models

Collecting a large amount of data is important in building a robust and accurate model. To ensure sufficient data for training and testing, 10,800 frames of spectra, with 1,200 spectra recorded at each position and amplitude were collected. Each spectrum in the datasets is labeled with 36 attributes that encoded the displacement amplitudes of the nine positions (1-9), with 6 attributes (10 μm-60 μm) for each position. The data is divided into a training set including 70% of the library and a testing set including 30%. The spectrum samples in these two datasets are selected randomly from the data library without overlap, ensuring that the trained model does not receive any information about the testing dataset. The training set is used to optimize the model parameters, while L2 regularizations are introduced to avoid overfitting. The resonant spectra in the training set are transformed into matrices as the input of the AI model, which is set up using, for example, Scikit-learn (Sklearn) over an Ubuntu 16.04 server with one Intel® Core™ i7-8700K CPU @ 3.70 GHz×12 (memory 15.5 GiB, without GPU acceleration). The AI model is subsequently trained to decompose the resonant spectrum of the mixture into resonant spectra of individual components and predict the respective position and amplitude of the perturbation. After training, the AI model is evaluated using a separate testing set, which is disjoint from the training set and is not allowed to be used in the training process. This approach allowed us to assess the model's ability to generalize to new data and estimate its accuracy in real-world scenarios. Algorithms and data of the various models disclosed herein may be stored, for example, in a database such as algorithm database 710 (shown in FIG. 7).

(ii) Hyperparameter Tuning

To obtain the optimal hyperparameters of a model with high accuracy and fast computation without overfitting, grid search is employed to exhaustively search through a specified parameter grid. The best parameters for each model are chosen based on the highest validation accuracy and low mean fit time.

(iii) Measurement of WGM Spectrum and Generation of Hyper-Information Barcodes

To capture the spectrum, a tunable laser source within the 780 nm wavelength band is utilized to scan across multiple modes. The transmission spectrum is then captured by a photodetector. To optimize the light intensity, an optical attenuator, and a polarization controller is used to manage the light's polarization can be employed. By carefully adjusting the coupling position of the resonator, high-order modes can be effectively excited. The output from the photodetector is displayed on an oscilloscope for real-time observation and is also fed into a computer via a data acquisition card for detailed analysis. The transmission intensity in the spectrum is divided into 10000 pieces to form a one-dimensional array. Each element of the array corresponds to a rectangular area in the hyper-information barcode image, whose color is determined by the value of the element through a colormap. The colormap used here is the Parula colormap, which can maintain a smooth color gradient even when plotted in greyscale.

H. Supporting Information

Additional (e.g., supporting) information is provided below.

(i) Sensing Framework Based on Machine Learning

Our objective is to determine the perturbation position p as well as perturbation amplitude d of the barcode data, represented by $p=f_1(I)$ and $d=f_2(I)$, respectively. These parameters differ in nature: the perturbation position is a discrete variable and can take any one of the positions tested in the experiment, while the perturbation amplitude is a continuous variable that depends on the magnitude of the displacement applied. Therefore, the sensing task is divided into two separate problems: (1) determine the relationship between the barcode data and the discrete perturbation position as a classification problem, and the other is to determine the relationship between the barcode data and the continuous perturbation amplitude as a regression problem. Once these relationships are known, the perturbation position and its amplitude directly from the measured spectrum by $p=f_1(I)$ and $d=f_2(I)$, respectively, can be determined. To achieve this, a large number of barcodes at various perturbations are first measured. This step serves as the calibration step for the multimode sensor. The collected dataset D, which contains N examples in the form of $(I_i, p_i, d_i)$, i=1 . . . N, is employed to train the disclosed machine learning models and learn the relationships between the spectrum data I and the parameters p and d ($f_1$ and $f_2$). This underlying relationship is obtained via a parametric model in the form of y=g (I, w), where w is the weight vector. A loss function L is then defined to estimate the error or mismatch between the predicted output y and the true value of p (d). The learning algorithms aim to find the optimal parameter vector w that minimizes the loss function L and best fits the data by using optimization techniques. By minimizing the loss function L, the disclosed model can improve the accuracy and performance in predicting the output parameter p (d) for new data inputs.

(ii) Model Details (1) PCA Analysis

PCA functions as an orthogonal linear transformation that converts features into a new coordinate system, such that the largest variance by a scalar projection of the data comes to lie on the first coordinate (the first principal component), the second largest variance on the second coordinate (the second principal component), and so on. Given a dataset with matrix $X \in R^{(n \times d)}$, where n denotes the number of samples in the dataset and d denotes the dimensionality of the features, the covariance matrix $X^T X$ of the data can be computed and the eigenvalues and corresponding eigenvectors to establish the new coordinate can be calculated.

However, calculating the covariance matrix and its eigenvalues could be computationally consuming. Thus, PCA can be associated with matrix factorization methods like the singular value decomposition (SVD) instead of computing the covariance matrix, the SVD of matrix X can be written as equation 1:

$$X = U \sum W^T \quad (\text{eq. 1})$$

Here $\Sigma$ is a rectangular diagonal matrix of $R^{(n \times d)}$ with entries being the positive number considered as singular value of X, and U, W are both matrices whose columns are orthogonal unit vectors while W is also the same as the eigenvectors of $X^T X$. Then the transformation T=XW could map the data from the original space to a new coordinator system. To reduce the dimension, only the first L principal components (columns in W) could be kept, so that the transformed data T is truncated as equation 2:

$$T_L = XW_L \quad (\text{eq. 2})$$

PCA analysis was implemented on both displacement prediction (regression) and position prediction (classification). The results revealed distinct decision boundaries for features extracted by the machine learning model, capturing the desired relationships across the samples. Specifically, one can take the output of the hidden layer j of the Artificial Neural Network (ANN) denoted in FIG. 16A which is used as the machine-learned features (learned representation), then apply PCA on the learned features and keep L=2 principal components for visualization purposes.

From FIG. 21A, the displacement data clusters well with the raw spectrum, however, the relationships among displacement remain elusive. In contrast, FIG. 21B shows that the well-trained machine learning model could capture the significant dependencies for the displacement: on the first principal component, all the clusters not only are arranged in the order corresponding to the value of the displacement but also the constant intervals on the first component (e.g. the interval between 10 µm and 30 µm is about double than that between 10 µm and 20 µm).

(2) Random Forest Classifier

In the disclosed model, the number of trees in the forest is 200 with a maximum depth of 6 for individual trees. FIGS. 14A-14C display the results of training the RF model on input datasets with a training time of 4.35 seconds, represented by a confusion matrix. Each row of the matrix corresponds to the instances of the perturbation position applied during the experiment while each column represents the instances in the prediction. In other words, the (i, j) element of the confusion matrix represents the number of instances from the actual class i that are predicted to belong to class j. For instance, the first row represents the prediction of perturbations applied at position 1. Out of 840 datasets in this category, 616 are correctly classified as position 1, while 142 are misclassified as position 2, 22 as position 3, 50 as position 7, 7 as position 8, and 3 as position 9. The misclassifications between position 1 and position 2 are larger than other positions, which is expected, since the similarity in these positions is large, as indicated in FIG. 13C. Similarly, for all the predictions saying that the position is position 0, i.e., the first column, 616 out of 840 data sets are actually from position 0. Thus, the precision of the model's prediction for position 0 is 0.85, which means that out of all the predicted instances where the model classifies the perturbation position as position 0, 85% of them are correct. The recall of the model for position 0 is 0.73, which means that out of all the instances where the true perturbation position is position 0, the model correctly predicted it in 73% of the cases. The confusion matrix provides a comprehensive overview of the RF model's accuracy in classifying the input datasets into different perturbation positions. An average prediction accuracy of 92% is obtained for the task of identifying the perturbation positions using the training dataset. A blind test on the testing samples can be unknown to the trained model, and the result is shown in FIG. 14B. An average prediction accuracy of 89% is obtained in the testing data. The accuracy of a machine learning model on the training data is typically higher than on the testing data since the model is trained on the training data and it has already read and learned from those data points. In other words, the model is already familiar with the training data and has learned to recognize patterns in the training process. The better evaluation of a model's performance is how well it can generalize to new, unseen data. Hence, only the accuracy based on the testing data in the following sessions is presented.

(3) Support Vector Machine (SVM)

Kernel functions in SVMs are used to transform the data features into a higher-dimensional space, where it becomes easier to separate the data into classes using a linear boundary. Different types of kernel functions have different characteristics and are suitable for different types of datasets. The choice of kernel function can greatly affect the accuracy and speed of the SVM. In this case, the WGM spectra contain multiple resonance dips and are therefore more suitable for nonlinear kernel functions. Specifically, using the radial basis function kernel (RBF kernel) in SVM results in a higher average accuracy of 91% compared to the sigmoid kernel (75%). The RBF kernel also has a shorter training time of 9.63 seconds, compared to the sigmoid kernel's training time of 16.74 seconds.

(4) Artificial Neural Network (ANN)

In the disclosed settings, a shallow ANN (with a single hidden layer) is constructed with 10 neurons in the hidden layer. The rectified linear unit (ReLU) function, f(x)=max (0, x), is used as the activation function for the hidden layer. The learning rate scheduled for weight updates is 0.1. The training time is 19.90 seconds. The results show an average accuracy of 96%, indicating that the ANN model is very effective for identifying the perturbation positions.

I. Evaluation Metrics

To evaluate the performance of classifying the perturbation position, predictions were made on the testing data and measured these prediction outcomes with various metrics:

Accuracy: The proportion of correct predictions out of all predictions from the testing set.

Macro Recall: The metric of recall is originally applied to binary classifications, which calculates the ratio of covered positive samples by the model:

$$\frac{True\_Positive}{True\_Positive + False\_negative}$$

For classifications of multiple categories in the disclosed experiments, the macro recall defined as the mean value of recall in each class where the corresponding class is considered the positive label can be used.

Macro Precision: Similarly, the metric of precision is originally applied for the binary classification, which calculates the ratio of correctly predicted positive samples by the model:

$$\frac{True\_Positive}{True\_Positive + False\_negative}$$

For classifications of multiple categories in the disclosed experiments, the macro precision defined as the mean value of precision in each class where the corresponding class is considered the positive label can be used.

To evaluate the regression performance on amplitude prediction, the rooted mean square error and R square score are used for evaluating the performance.

Rooted Mean Square Error (RMSE): it is a measure of the differences between values predicted by a model and the values actually observed from the environment that is being modeled. It is a standard way to measure the error of a model in predicting quantitative data:

$$RMSE = \sqrt{\frac{1}{n}\sum_{i=1}^{} (y_i - \hat{y}_i)^2}$$

R Squared ($R^2$): it is a statistical measure of how close the data are to the fitted regression line. As R Squared is closer to 1, the model fits better.

$$R^2 = 1 - \frac{\sum_{i=1}^{} (y_i - \hat{y}_i)^2}{\sum_{i=1}^{} (y_i - \bar{y})^2}$$

where $\hat{y}_i$ is the predicted value on sample i, $\bar{y}$ is the mean value of the observed data.

For all of the above-described embodiments and usages, any code and/or data or other information may be stored in a memory of the above-described system, and/or in a remote (e.g., cloud) storage system (e.g., in a dedicated database or other centralized storage mechanism). Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable code/instructions embodied in one or more computer-executable components stored on one or more computer-readable media to implement aspects of the invention described and/or illustrated herein. Code can include application source code, application object code, configuration data, additional input events, application states, assertion statements, validation results, and/or any other type of data. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

The raw and/or processed data and/or any related graphical or other representations of the data may be processed by the above-described computer system or the like and output for display on a display device such as a TV, monitor, mobile device (e.g., mobile phone or tablet) and the like such that a technician/practitioner/evaluator/therapist/user can view and/or manipulate the data (e.g., the data may be presented in a visual format for presenting certain aspects of the test results, for example as shown in the applicable above-noted figures). For example, a display monitor may be connected (e.g., wired or wirelessly) to the above-described computer system to provide a visual output on the computer system. The computer system may have an operating system with a graphical user interface capable of being used by a user to (i) input, view, execute and/or manipulate the above-described computer code and/or (ii) process the obtained sensor data and any related graphical representations of such data in the manners described above. The operating system may be capable of running software applications such as those described above (e.g., MatLab and the like) for carrying out the above-described techniques and also any necessary post-processing and/or outputting of the obtained sensor data for viewing, such as for viewing by a therapist that is treating/diagnosing a patient/test subject. Additional software for other code/data manipulations and/or for generating other visuals relating to the data may also be present on the computer system.

In the present disclosure, all or part of the units or devices of any system and/or apparatus, and/or all or part of functional blocks in any block diagrams and flow charts may be executed by one or more electronic circuitries including a semiconductor device, a semiconductor integrated circuit (IC) (e.g., such as a processor), or a large-scale integration (LSI). The LSI or IC may be integrated into one chip and may be constituted through combination of two or more chips. For example, "processor" as used herein refers generally to any programmable system including systems and microcontrollers, reduced instruction set circuits (RISC), application specific integrated circuits (ASIC), programmable logic circuits (PLC), and any other circuit or processor capable of executing the functions described herein. The functional blocks other than a storage element may be integrated into one chip. The integrated circuitry that is called LSI or IC in the present disclosure is also called differently depending on the degree of integrations, and may be called a system LSI, VLSI (very large-scale integration), or ULSI (ultra large-scale integration). For an identical purpose, it is possible to use an FPGA (field programmable gate array) that is programmed after manufacture of the LSI, or a reconfigurable logic device that allows for reconfiguration of connections inside the LSI or setup of circuitry blocks inside the LSI. Furthermore, part or all of the functions or operations of units, devices or parts or all of devices can be executed by software processing (e.g., coding, algorithms, etc.). In this case, the software is recorded one or more non-transitory computer-readable recording media, such as one or more ROMs, RAMs (e.g., DRAM, SRAM), optical disks, hard disk drives, solid-state memory, servers, cloud storage, and so on and so forth, having stored thereon executable instructions which can be executed to carry out the desired processing functions and/or circuit operations. For example, when the software is executed by a processor, the software causes the processor and/or a peripheral device to execute a specific function within the software. The system/method/device of the present disclosure may include (i) one or more non-transitory computer-readable recording mediums that store the software, (ii) one or more processors (e.g., for executing the software or for providing other functionality), and (iii) a necessary hardware device (e.g., a hardware interface). Artificial intelligence in any and all types and formats may be utilized in any of the steps, techniques, protocols, analyses, and/or any other manipulation, generation, or other creation of data, results and/or any information described herein. This includes but is not limited to computer visions, machine learning, deep learning, neural networks, algorithms, and any data, models, and training needed for such. The above examples are example only, and thus are not intended to limit in any way the definitions and/or meanings of the terms.

Data conduits and any other communication or data transfer as described herein may include wired or wireless connections. For example, a wired network connection (e.g., Ethernet or an optical fiber), a wireless communication means, such as radio frequency (RF), e.g., FM radio and/or digital audio broadcasting, WiFi (e.g., IEEE 802.11 standards), WIMAX, a short-range wireless communication channel such as BLUETOOTH, a cellular phone technology (e.g., GSM), a satellite communication link, and/or any other suitable communication means. Such data conduits, in particular wired versions, can also be referred to as a system bus.

The embodiments were chosen and described in order to best explain the principles of the disclosure and its practical application to thereby enable others skilled in the art to best utilize the disclosure in various embodiments and with various modifications as are suited to the particular use contemplated. Aspects of the disclosed embodiments may be mixed to arrive at further embodiments within the scope of the invention.

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described example embodiments, but should be defined only in accordance with the following claims appended hereto and their equivalents.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects describe in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "example" is used herein to mean serving as an example, instance, or illustration. Any embodiment, implementation, process, feature, etc. described herein as example should therefore be understood to be an illustrative example and should not be understood to be a preferred or advantageous example unless otherwise indicated.

It should be noted that, as used herein, the term "couple" is not limited to a direct mechanical, electrical, and/or communication connection between components, but may also include an indirect mechanical, electrical, and/or communication connection between multiple components.

Having thus described several aspects of at least one embodiment, it is to be appreciated that various alternations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

What is claimed is:

1. A displacement sensor, comprising:
   an optical whispering gallery mode (WGM) microresonator; and
   a package encasing at least a portion of the WGM microresonator, the package comprising polydimethylsiloxane (PDMS),
   wherein the WGM microresonator is configured to capture information encoded in multimode spectra of the WGM microresonator for multiparameter sensing of perturbations and for generation of hyper-information barcodes, and wherein each mode of resonance of the WGM microresonator can sense different variables and/or pinpoint the location of perturbations.

2. The displacement sensor of claim 1, wherein the displacement sensor has a Q-factor of $10^7$ at 780 nm.

3. The displacement sensor of claim 1, wherein the displacement sensor has a detection limit of about 600 nm.

4. The displacement sensor of claim 1, wherein the package encases all of the WGM microresonator.

5. The displacement sensor of claim 1, wherein the package consists of PDMS only.

6. The displacement sensor of claim 1, wherein the WGM microresonator is configured as part of a sensor system, and the sensor system is configured to:
   generate the hyper-information barcodes using the WGM microresonator;
   analyze, via machine learning models, the hyper-information barcodes generated from the multimode spectra; and
   output from the machine learning models a multiparameter prediction.

7. The displacement sensor of claim 6, wherein the multiparameter sensing of perturbations includes position and amplitude of perturbations, and wherein the sensor system is further configured to simultaneously track both the position and amplitude of perturbations.

8. An optical whispering gallery mode (WGM) device comprising:
   a WGM microresonator; and
   a package encasing at least a portion of the WGM microresonator, the package comprising polydimethylsiloxane (PDMS),
   wherein the WGM microresonator is configured to capture information encoded in multimode spectra of the WGM microresonator for multiparameter sensing of perturbations and for generation of hyper-information barcodes, wherein each mode of resonance of the WGM microresonator can sense different variables and/or pinpoint the location of perturbations.

9. The WGM device of claim 8, wherein the WGM microresonator has a Q-factor of $10^7$ at 780 nm.

10. The WGM device of claim 8, wherein the WGM microresonator has a detection limit of about 600 nm.

11. The WGM device of claim 8, wherein the package encases all of the WGM microresonator.

12. The WGM device of claim 8, wherein the package comprises polydimethylsiloxane (PDMS).

13. A non-transitory computer-readable recording medium having computer executable instructions stored thereon, which when executed by a processor of a sensor system, cause the sensor system to:
    generate hyper-information barcodes using a multimode sensor, the multimode sensor configured to capture information encoded in multimode spectra of the multimode sensor for multiparameter sensing of perturbations;
    analyze, via machine learning models, the hyper-information barcodes generated from the multimode spectra; and
    output from the machine learning models a multiparameter prediction;
    wherein each mode of resonance of the multimode sensor can sense different variables and/or pinpoint the location of perturbations.

14. The non-transitory computer-readable recording medium of claim 13, wherein the instructions, when executed by the processor, further cause the sensor system to conduct real-time analysis and monitoring in dynamic and time-sensitive environments.

15. The non-transitory computer-readable recording medium of claim 13, wherein the multimode sensor comprises an optical whispering gallery mode (WGM) microresonator encased in a package comprising polydimethylsiloxane (PDMS).

16. The non-transitory computer-readable recording medium of claim 15, wherein the WGM microresonator has a Q-factor of $10^7$ at 780 nm.

17. The non-transitory computer-readable recording medium of claim 15, wherein the WGM microresonator has a detection limit of about 600 nm.

18. The non-transitory computer-readable recording medium of claim 15, wherein a package encases all of the WGM microresonator.

19. The non-transitory computer-readable recording medium of claim 18, wherein the package comprises polydimethylsiloxane (PDMS).

20. The non-transitory computer-readable recording medium of claim 13, wherein the instructions, when executed by the processor, further cause the sensor system to simultaneously track both the position and amplitude of perturbations.

* * * * *